(12) United States Patent
Kuwano et al.

(10) Patent No.: US 8,981,620 B2
(45) Date of Patent: Mar. 17, 2015

(54) DRIVING MECHANISM, LENS BARREL, AND CAMERA

(75) Inventors: Kunihiro Kuwano, Kawasaki (JP); Satoshi Kariya, Yokohama (JP)

(73) Assignee: Nikon Corporation, Tokyo (JP)

( * ) Notice: Subject to any disclaimer, the term of this patent is extended or adjusted under 35 U.S.C. 154(b) by 274 days.

(21) Appl. No.: 13/377,267

(22) PCT Filed: Jun. 10, 2010

(86) PCT No.: PCT/JP2010/003875
§ 371 (c)(1),
(2), (4) Date: Feb. 28, 2012

(87) PCT Pub. No.: WO2010/143438
PCT Pub. Date: Dec. 16, 2010

(65) Prior Publication Data
US 2012/0163787 A1 Jun. 28, 2012

(30) Foreign Application Priority Data

Jun. 10, 2009 (JP) .................................. 2009-139564
Nov. 9, 2009 (JP) .................................. 2009-256371

(51) Int. Cl.
*H02N 2/12* (2006.01)
*H02N 2/10* (2006.01)
*G02B 7/10* (2006.01)
*G03B 3/02* (2006.01)
*G03B 3/10* (2006.01)

(52) U.S. Cl.
CPC ................ *H02N 2/101* (2013.01); *G02B 7/102* (2013.01); *G03B 3/02* (2013.01); *G03B 3/10* (2013.01); *G03B 2205/0061* (2013.01)

USPC .................................................. 310/323.16

(58) Field of Classification Search
USPC ........................ 310/323.01–323.21
See application file for complete search history.

(56) References Cited

U.S. PATENT DOCUMENTS

| | | | |
|---|---|---|---|
| 5,656,769 A * | 8/1997 | Nakano et al. ................... 73/105 |
| 6,262,515 B1 * | 7/2001 | Yerganian ................ 310/323.06 |
| 7,785,947 B2 | 8/2010 | Isobe et al. | |
| 2006/0066177 A1 * | 3/2006 | Sugahara ................. 310/323.17 |
| 2006/0246644 A1 | 11/2006 | Isobe et al. | |

FOREIGN PATENT DOCUMENTS

| | | |
|---|---|---|
| CN | 1855399 A | 11/2006 |
| JP | A-59-230473 | 12/1984 |
| JP | A-1-174280 | 7/1989 |

(Continued)

OTHER PUBLICATIONS

Japanese Office Action issued in Japanese Patent Application No. 2009-139564 dated Jul. 9, 2013 (w/translation).
International Search Report issued in International Application No. PCT/JP2010/003875 dated Sep. 14, 2010 (w/translation).
Written Opinion of the International Searching Authority issued in International Application No. PCT/JP2010/003875 dated Sep. 14, 2010 (w/translation).

(Continued)

*Primary Examiner* — Derek Rosenau
(74) *Attorney, Agent, or Firm* — Oliff PLC

(57) ABSTRACT

A driving mechanism driving a first member and a second member relative to each other which includes a piezoelectric element that drives the first member, a base member that movably supports the first member with the piezoelectric element interposed therebetween, and an electrode portion that is supplied with a driving voltage of the piezoelectric element. The electrode portion includes an exposed portion exposed from the base member.

22 Claims, 25 Drawing Sheets

(56) References Cited

FOREIGN PATENT DOCUMENTS

| | | |
|---|---|---|
| JP | A-2-87981 | 3/1990 |
| JP | A-2003-259667 | 9/2003 |
| JP | A-2007-236138 | 9/2007 |
| JP | A-2007-264095 | 10/2007 |
| JP | A-2007-274790 | 10/2007 |

OTHER PUBLICATIONS

Oct. 22, 2013 Office Action issued in Japanese Patent Application No. 2009-256371 (with English translation).

Nov. 5, 2013 Office Action issued in Chinese Patent Application No. 201080025258.7 (with English translation).

* cited by examiner (a)

(b)

DRIVING MECHANISM, LENS BARREL, AND CAMERA

TECHNICAL FIELD

The present invention relates to a driving mechanism, a lens barrel, and a camera.

Priority is claimed on Japanese Patent Application No. 2009-139564 filed Jun. 10, 2009, and Japanese Patent Application No. 2009-256371 filed Nov. 9, 2009, the contents of which are incorporated herein by reference.

BACKGROUND ART

Driving mechanisms employing a piezoelectric element have been disclosed. As such a type of driving mechanism, for example, Patent Document 1 discloses a driving mechanism that drives a driving target member by driving plural piezoelectric elements to cause a tip member coming in contact with the driving target member to move elliptically. In Patent Document 1, when an XYZ orthogonal coordinate system is set up, the driving target member is driven in the X axis direction with the elliptical movement of the tip member parallel to the XZ plane.

BACKGROUND ART DOCUMENT

Patent Document

[Patent Document 1] JP-A-2007-236138

SUMMARY OF INVENTION

Problems to be Solved by the Invention

However, such a type of driving mechanism has a problem in that vibrations in two different directions could not be taken out as independent vibrations. In Patent Document 1, since the vibrations of the tip member in the X axis direction and the Z axis direction could not be taken out as independent vibrations, plural piezoelectric elements may interfere with their movements. When plural piezoelectric elements are driven to interfere with their movements, the output power of the driving mechanism driving a driving target member is lowered.

In the driving mechanism, a base member supporting the piezoelectric element is formed of WC (Tungsten Carbide) or the like having electric conductivity. When the base member has electric conductivity, the base member serves as a common electrode and electrodes of plural piezoelectric elements coming in contact with the base member have the same potential. Accordingly, there is a problem in that it is difficult to apply different voltages to plural piezoelectric elements.

A purpose of some aspects of the invention is that it provides a driving mechanism which can take out vibrations in two different directions as independent vibrations, and a lens barrel and a camera employing the driving mechanism.

Another purpose of some aspects of the invention is that it provides that it provides a driving mechanism which can easily apply different voltages to piezoelectric elements even when a member supporting the piezoelectric elements has electric conductivity, and a lens barrel and a camera employing the driving mechanism.

Means for Solving the Problem

According to an aspect of the invention, there is provided a driving mechanism driving a first member and a second member relative to each other, including: a piezoelectric element that drives the first member; a base member that movably supports the first member with the piezoelectric element interposed therebetween; and an electrode portion that is supplied with a driving voltage of the piezoelectric element, wherein the electrode portion includes an exposed portion exposed from the base member.

According to another aspect of the invention, there is provided a driving mechanism including: a piezoelectric element; a first member that is driven by the piezoelectric element; a second member that is disposed in contact with the first member and that moves relatively to the first member with the driving of the first member; and a base member that is conductive and that movably supports the first member with the piezoelectric element, wherein the driving mechanism includes a plurality of sets each having the first member and the piezoelectric element and an insulating film is disposed between the piezoelectric element of at least one set and the base member.

According to still another aspect of the invention, there is provided a lens barrel including the driving mechanism.

According to still another aspect of the invention, there is provided a camera including the driving mechanism.

Advantage of the Invention

By employing a driving mechanism according to aspects of the invention, it is possible to take out vibrations in two different directions as independent vibrations.

In a driving mechanism according to aspects of the invention, since the piezoelectric element of at least one set is electrically insulated from the base member by the insulating film, it is possible to easily apply different voltages to the piezoelectric element of the corresponding set and the piezoelectric element of another set.

DESCRIPTION OF EMBODIMENTS (1) First Embodiment

Hereinafter, a driving mechanism according to a first embodiment of the invention will be described with reference to the accompanying drawings. A driving mechanism 1 according to this embodiment performs a relative driving operation of displacing a second member such as a rotor and a first member such as a driving member relative to each other to drive an optical device or an electronic device such as a lens barrel of a camera.

Figure 1:
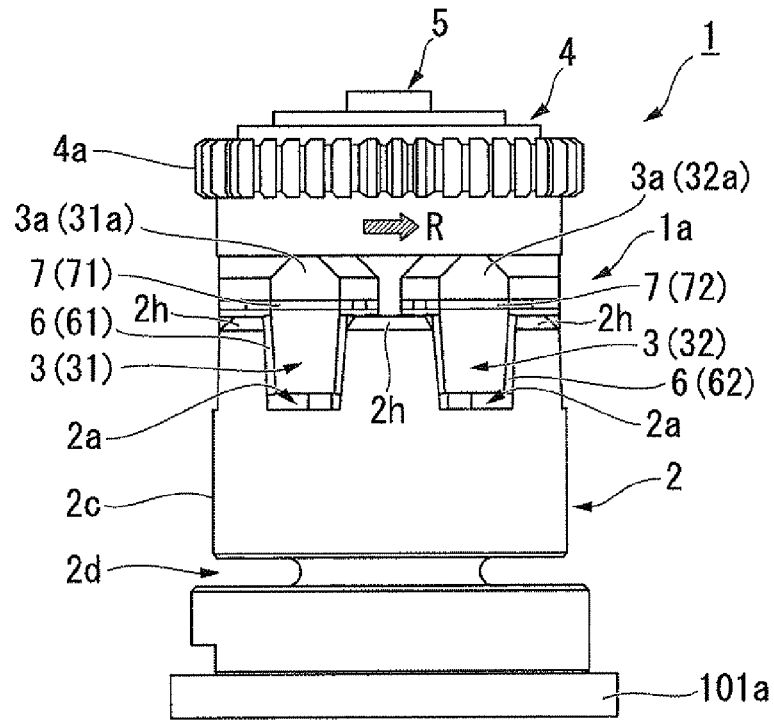
FIG. 1 is a front view illustrating a driving mechanism according to a first embodiment of the invention.
Figure 2:
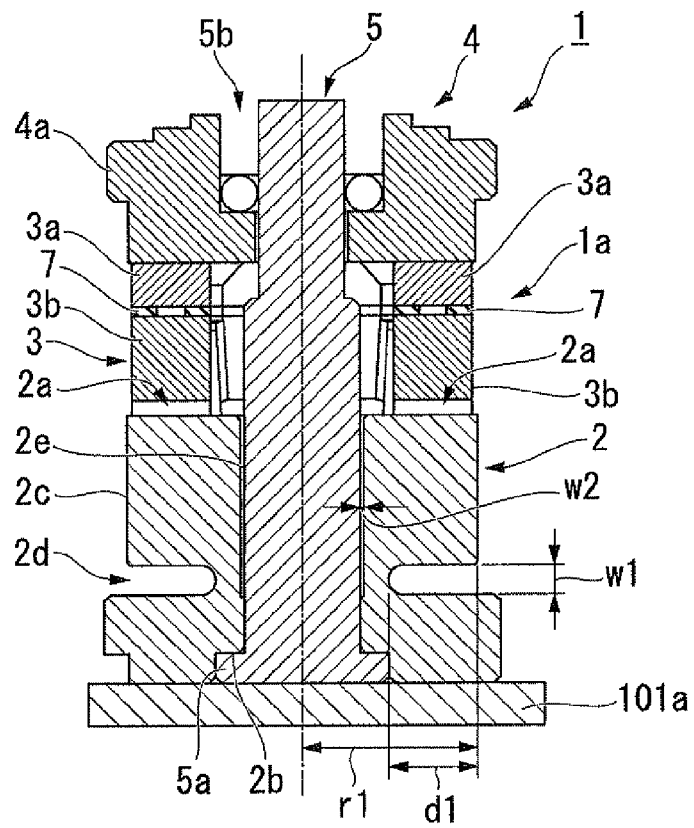
FIG. 2 is a sectional view of the driving mechanism.

FIG. 1 is a front view of the driving mechanism 1 according to this embodiment and FIG. 2 is a sectional view thereof.

As shown in FIGS. 1 and 2, the driving mechanism 1 includes a base member (the base member) 2 having plural holding portions 2a formed therein, driving members (the first member) 3 held in the respective holding portions 2a, a rotor (the second member) 4 disposed adjacent to the driving members 3, and a support shaft 5 inserted into the base member 2.

The base member 2 is formed in a hollow cylindrical shape out of a metal material such as stainless steel and surrounds the support shaft 5 by inserting the support shaft 5 therethrough. The surface of the base member 2 is subjected to insulation treatment and, for example, an insulating film is formed thereon.

The rotor 4 is axially supported by the support shaft 5 with bearings 5b interposed therebetween and is disposed to be rotatable about the support shaft 5. A gear 4a used for driving a camera lens barrel or the like is formed on the outer circumferential surface of the rotor 4. The surface of the rotor 4 facing the base member 2 is supported by plural driving members 3.

An end of the base member 2 is fixed to a mounting section 101a, for example, by the use of bolts not shown in the drawings. A concave portion 2b is formed at the center of the surface of the base member 2 facing the mounting section 101a. A large-diameter portion 5a formed at the base end of the support shaft 5 is inserted (fitted) into the concave portion 2b. The support shaft 5 is fixed to the base member 2 and the mounting section 101a by fixing the base member 2 to the mounting section 101a in this state.

Plural holding portions 2a having a concave shape are disposed at the other end of the base member 2 in the circumferential direction of the base member 2, that is, in the rotation direction R of the rotor 4. Each holding portion 2a supports the corresponding driving member 3 from both sides in the direction (the first direction) perpendicular to the support shaft 5 and parallel to the rotation direction R of the rotor 4 and holds the corresponding driving member 3 so as to drive the driving member in the direction (the second direction) parallel to the support shaft 5. As shown in FIG. 1, chamfered portions (exposing portions) 2h are formed at the corners of the base member 2 close to the rotor 4. The chamfered portions 2h are formed over the entire circumference of the base member 2 at both the outer circumferential corners and the inner circumferential corners of the end of the base member 2 close to the rotor 4.

As shown in FIG. 2, the side surface 2c of the base member 2 is disposed to be substantially parallel to the support shaft 5. A groove 2d as a vibration-suppressing portion suppressing the transmission of the vibration from the mounting section 101a to the holding portions 2a is formed in the side surface 2c between the holding portions 2a and an end of the mounting section 101a. That is, the groove 2d is disposed in the side surface 2c of the base member 2 so as to intersect the direction (the first direction) parallel to the rotation direction R of the rotor 4 and substantially perpendicular to the support shaft 5. The groove 2d is continuously formed in the circumferential direction of the base member 2 and is located at a position closer to the end of the mounting section 101a than the middle between the holding portions 2a and the end of the mounting section 101a.

The depth d1 of the groove 2d is, for example, in the range of 40% to 80% of the radius r1 of the base member 2. This numerical range is only an example and the invention is not limited to the range. The depth d1 of the groove 2d can be set, for example, to 10%, 20%, 30%, 40%, 50%, 60%, 70%, 80%, or 90% of the radius r1 of the base member 2. The width w1 of the groove 2d in the direction (the second direction) parallel to the support shaft 5 is set to be greater than the amplitude of the vibration of the base member 2 and greater than the amplitude of the resonant vibration of a supporting and driving section (structure) 1a, which is described later, including the first piezoelectric elements 6, the second piezoelectric elements 7, the driving members 3, and the base member 2. For example, the width w1 of the groove 2d can be set to be smaller than the radius of the base member 2.

As shown in FIG. 2, a gap (vibration-suppressing portion) 2e serving to suppress the vibration from the mounting section 101a to the holding portions 2a is disposed between the base member 2 and the support shaft 5. The gap 2e is formed from the end of the base member 2 close to the holding portions 2a to the same position as the edge of the groove 2d close to the mounting section 101a in the direction parallel to the support shaft 5. The width w2 of the gap 2e is set to be greater than the amplitude of the vibration of the base member 2 and greater than the amplitude of the resonant vibration of the supporting and driving section 1a to be described later, similarly to the width w1 of the groove 2d.

Figure 3:
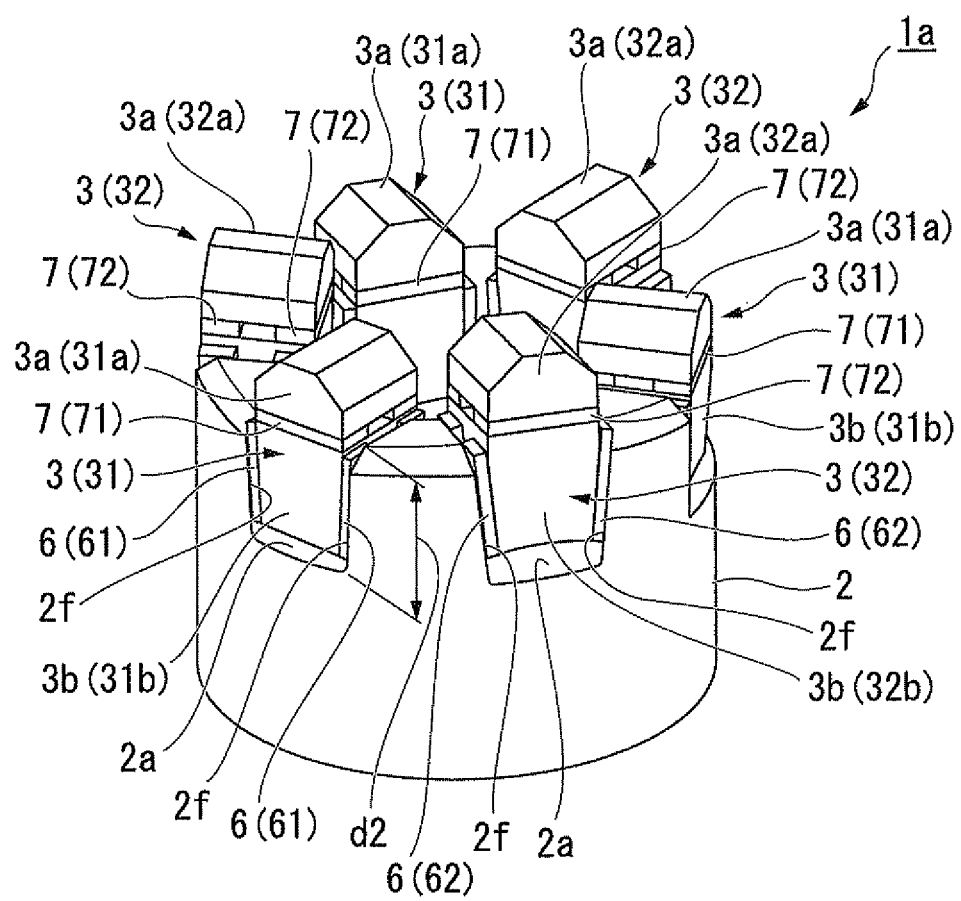
FIG. 3 is a perspective view illustrating a supporting and driving section of the driving mechanism shown in FIG. 1.
Figure 4:
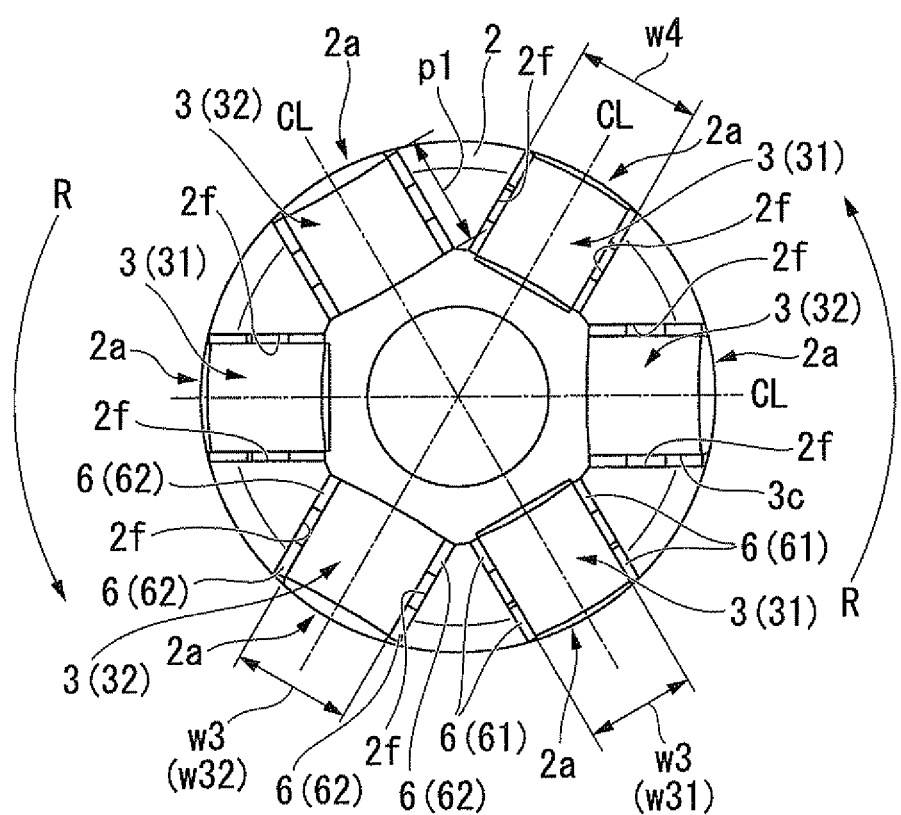
FIG. 4 is a plan view of the driving mechanism.

FIG. 3 is a perspective view of the supporting and driving section 1a of the driving mechanism 1 shown in FIG. 1 and FIG. 4 is a plan view thereof.

As shown in FIGS. 3 and 4, each driving member 3 includes a tip portion 3a having a hexagonal prism shape with a mountain-like section and a base portion 3b having a substantially rectangular parallelepiped shape. The tip portion 3a is formed of, for example, stainless steel. The base portion 3b is formed of, for example, light metal alloy. Both the tip portion 3a and the base portion 3b have conductivity. The base portion 3b is supported by the corresponding holding portion 2a so as to be driven in the direction parallel to the support shaft 5. The tip portion 3a protrudes from the corresponding holding portion 2a so as to support the rotor 4. The tip portion 3a has a tapered shape in which the area of the top surface coming in contact with the rotor 4 is smaller than the area of the bottom surface of the base portion 3b.

As shown in FIG. 4, two pairs of first piezoelectric elements 6 and 6 of which each pair interposes the base portion 3b of the driving member 3 from both sides in the width w3 direction are disposed in the width w3 direction (the first direction) of the driving member 3. The width w3 direction of the driving member 3 is a direction perpendicular to the support shaft 5 and parallel to the rotation direction R of the rotor 4 and is a direction substantially perpendicular to the center lines CL of the base member 2 in a plan view. Each first piezoelectric element 6 is formed in a long and narrow rectangular shape extending in the depth d2 direction of the corresponding holding portion 2a and is interposed between the base portion 3b and the holding portion 2a. Accordingly, the first piezoelectric elements 6 are disposed between the groove 2d (see FIGS. 1 and 2) formed in the base member 2 and the rotor 4.

The first piezoelectric elements 6 are bonded to the base portion 3b of each driving member 3 and the corresponding holding portion 2a, for example, by the use of a conductive adhesive. Two first piezoelectric elements 6 and 6 arranged in the depth p1 direction of each driving member 3 substantially parallel to the center line CL passing through the center of the base member 2 are substantially parallel to each other. The shapes and sizes of the first piezoelectric elements 6 are substantially the same.

As shown in FIG. 3, a pair of second piezoelectric elements 7 and 7 is disposed between the base portion 3b and the tip portion 3a of each driving member 3 so as to be substantially parallel to each other. Each second piezoelectric element 7 is formed in a long and narrow rectangular shape extending in the width w3 direction of the corresponding driving member 3. The second piezoelectric elements 7 are interposed between the bottom surface of the tip portion 3a and the top surface of the base portion 3b and are bonded to the bottom surface of the tip portion 3a and the top surface of the base portion 3b, for example, by the use of a conductive adhesive. The shapes and sizes of the second piezoelectric elements 7 are substantially the same.

The first piezoelectric elements 6 and the second piezoelectric elements 7 are formed of for example, piezoelectric zirconate titanate (PZT) and the vibration mode thereof is a thickness-shear vibration mode. That is, the first piezoelectric elements 6 drive the corresponding driving member 3 relative to the base member 2 in the depth d2 direction of the holding portion 2a substantially parallel to the support shaft 5. The second piezoelectric elements 7 drive the tip portion 3a of the corresponding driving member 3 relative to the base portion 3b and the base member 2 in the width w3 (the third direction) of the driving member 3. That is, in this embodiment, the direction (the first direction) in which the first piezoelectric elements 6 interpose the corresponding driving member 3 and the direction (the third direction) in which the second piezoelectric elements 7 drive the tip portion 3a of the corresponding driving member 3 are substantially parallel to each other.

The first piezoelectric elements 6, the second piezoelectric elements 7, the driving members 3, and the base member 2 constitute the supporting and driving section 1a supporting the rotor 4 and driving the rotor 4 relative to the driving members 3 and the base member 2.

As shown in FIG. 3, the holding portions 2a are formed at an end of the base member 2 so as to form a crown-like unevenness in the base member 2. As shown in FIG. 4, the holding portions 2a are uniformly formed substantially every 60° in the circumferential direction of the base member 2. Each holding portion 2a has a pair of support faces 2f and 2f disposed substantially parallel to the center line CL passing through the center of the base member 2 in a plan view. The support faces 2f hold the base portion 3b of the corresponding driving member 3 so as to interpose the base portion from both ends in the width w4 direction (the first direction) of the holding portion 2a substantially perpendicular to the center line CL of the base member 2 with a pair of first piezoelectric elements 6 and 6 interposed therebetween.

Figure 5A:
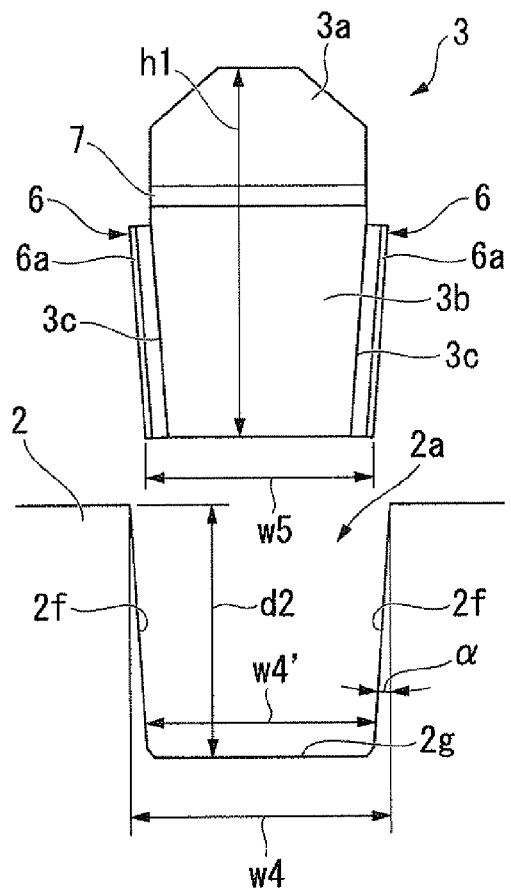
FIG. 5A is a front view illustrating a holding portion and a driving member of the driving mechanism shown in FIG. 1.
Figure 5B:
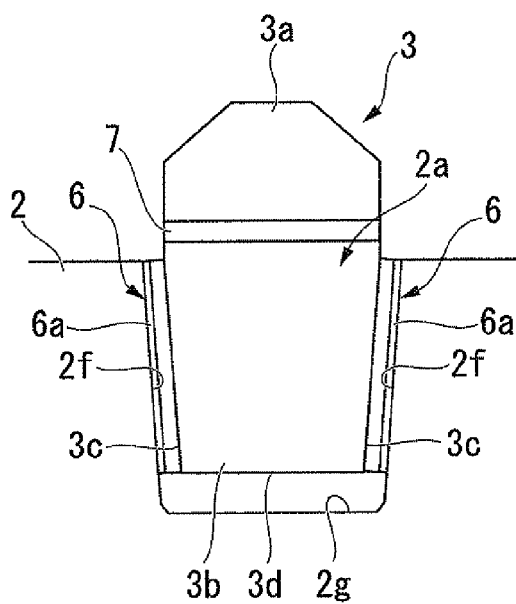
FIG. 5B is a front view illustrating a holding portion and a driving member of the driving mechanism shown in FIG. 1.

FIG. 5A is an enlarged front view illustrating an assembly of the holding portion 2a and the driving member 3 and FIG. 5B is an enlarged front view of the holding portion 2a and the driving member 3.

As shown in FIGS. 5A and 5B, the support faces 2f of each concave holding portion 2a formed in the base member 2 are tilted about the depth d2 direction (the second direction) of the holding portion 2a substantially parallel to the support shaft 5 shown in FIG. 2.

The support faces 2f are tilted so that the distance between the opposed support faces 2f and 2f becomes smaller as the distance from the rotor 4 supported by the tip portions 3a of the driving members 3 shown in FIG. 1 becomes greater. In other words, the width w4 of the holding portion 2a becomes smaller as it gets closer to the bottom 2g. The tilt angle α of each support face 2f about the depth d2 direction of the holding portion 2a is preferably in the range of 2° to 6°, in view of the sizes or tolerance of the members. In this embodiment, the tilt angle α of the support faces is 4°.

As shown in FIGS. 5A and 5B, side surfaces 3c of the base portion 3b of the driving member 3 facing the support faces 2f are tilted about the height h1 direction (the second direction) of the driving member 3 substantially parallel to the support shaft 5, similarly to the support faces 2f. Accordingly, the side surfaces 3c of the base portion 3b of the driving member 3 are substantially parallel to the support faces 2f. The first piezoelectric elements 6 having an electrode portion 6a are bonded in advance to the side surfaces 3c with a conductive adhesive interposed therebetween. The electrode portions 6a are not shown in FIGS. 1 to 4.

Here, the total width w5 of the base portion 3b and the pair of first piezoelectric elements 6 and 6 at the end of the base portion 3b close to the bottom 2g of the holding portion 2a is smaller than the width w4 at the opening of the holding portion 2a and is greater than the width w4' midway in the depth d2 direction of the holding portion 2a.

Accordingly, when the base portion 3b of the driving member 3 and a pair of first piezoelectric elements 6 and 6 are held in the holding portion 2a, the base portion 3b is supported by the support faces 2f from both ends in the width w4 direction of the holding portion 2a with the pair of first piezoelectric elements 6 and 6 interposed therebetween in a state where the bottom surface 3d of the driving member 3 is separated from the bottom 2g of the holding portion 2a, as shown in FIG. 5B. That is, the support faces 2f are tilted about the depth d2 direction so as to support the driving member 3 from both ends in the width w4 direction (the first direction) of the holding portion 2a and to position the driving member in the depth d2 direction (the second direction) of the holding portion 2a substantially parallel to the support shaft 5.

Figure 6:
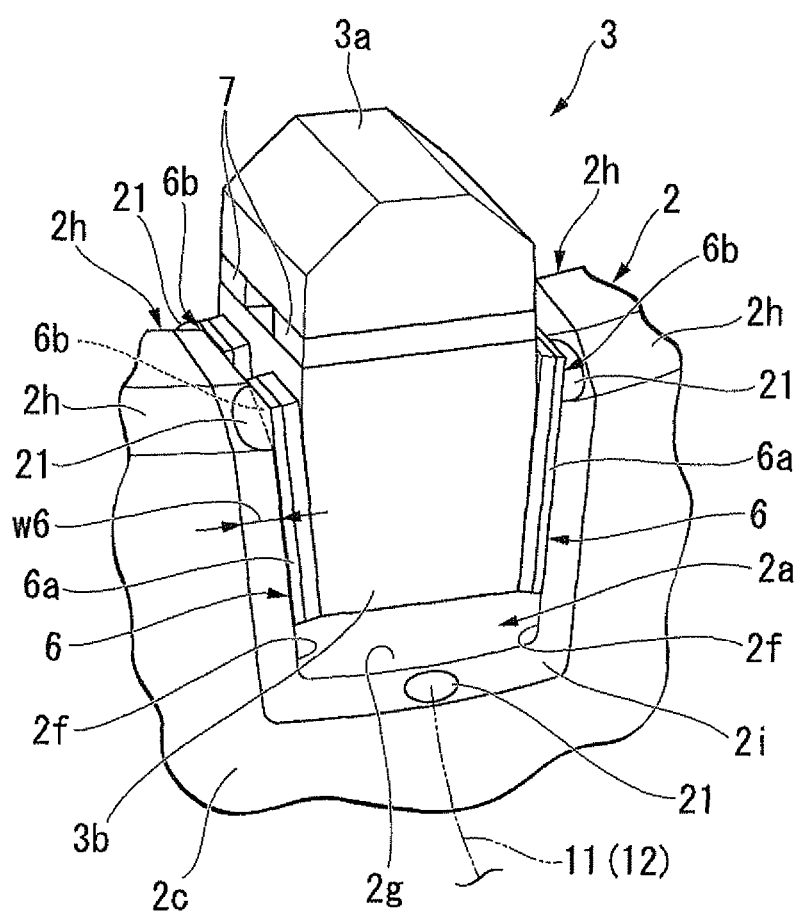
FIG. 6 is a perspective view illustrating a holding portion and a driving member of the driving mechanism shown in FIG. 1.

FIG. 6 is a partially-enlarged perspective view of the driving member 3 and the holding portion 2a shown in FIG. 3.

As shown in FIG. 6, the first piezoelectric elements 6 are disposed between the base portion 3b of each driving member 3 and the support faces 2f of the corresponding holding portion 2a of the base member 2. The electrode portion 6a is formed on the surface of each first piezoelectric element 6 facing the corresponding support face 2f and a part thereof is exposed from the base member 2 by the chamfered portions 2h formed at the corners of the end of the base member 2. In this embodiment, a part of the electrode portion 6a exposed from the base member 2 by the chambered portions 2h serves as the exposed portion 6b connected to the power supply unit to be described later.

An electrode face 2i is formed on the side surface 2c of the outer circumference of the base member 2 having been subjected to surface insulating treatment out of a conductive material such as a copper foil. The electrode face 2i is disposed along the edges of the holding portions 2a and is continuously formed around the holding portion 2a with a predetermined width w6. The electrode face 2i is also formed on the side surface (not shown) of the inner circumference of the base member 2, similarly to the side surface 2c of the outer circumference. The electrode face 2i is continuously formed along the edges of the holding portion 2a on the chamfered portion 2h of the outer circumference, the end face facing the rotor 4, and the chamfered portion 2h of the inner circumference. That is, all the electrode faces 2i on the surfaces of the base member 2 are formed continuously.

The exposed portion 6b of the electrode portion 6a exposed from the base member 2 by each chamfered portion 2h is electrically connected to the electrode face 2i formed on the chamfered portion 2h with a conductive adhesive 2l. Accordingly, the electrode portions 6a of four first piezoelectric elements 6 disposed between the base portion 3b of each driving member 3 and the support faces 2f of the corresponding holding portion 2a are all electrically connected to each other.

A first line 11 (the second line 12) is connected to the center of the electrode face 2i formed along the edge of the bottom 2g of the holding portion 2a via the conductive adhesive 2l. Accordingly, the electrode portions 6a of four first piezoelectric elements 6 are electrically connected to the first line 11 (the second line 12) via the conductive adhesive 2l connected to the exposed portions 6b and the electrode face 2i. That is, the electrode portions 6a are supplied with a predetermined driving voltage via the first line 11 (the second line 12).

Although not shown, a third line (a fourth line) to be described later is connected to the tip portions 3a of the driving members 3, for example, with a conductive adhesive interposed therebetween and a predetermined driving voltage is applied thereto. A ground line is connected to the base portions 3b, for example, with a conductive adhesive. Accordingly, the base portions 3b are grounded.

In this embodiment, each driving member 3 includes a pair of second piezoelectric elements 7 and 7 between the tip portion 3a and the base portion 3b and includes two pairs of first piezoelectric elements 6 and 6 on the side faces of the base portion 3b. As shown in FIGS. 3 and 4, the driving mechanism 1 includes two groups of a first group and a second group, each group having three sets of a driving member 3 and two pairs of first piezoelectric elements 6. The driving members 31 of the first group and the driving members 32 of the second group are arranged in the same circumference. The driving members 31 and 32 of the respective groups are uniformly arranged in the rotation direction R of the rotor 4 and the driving members 31 and 32 of different groups are alternately (sequentially) arranged in the rotation direction R.

Figure 7A:
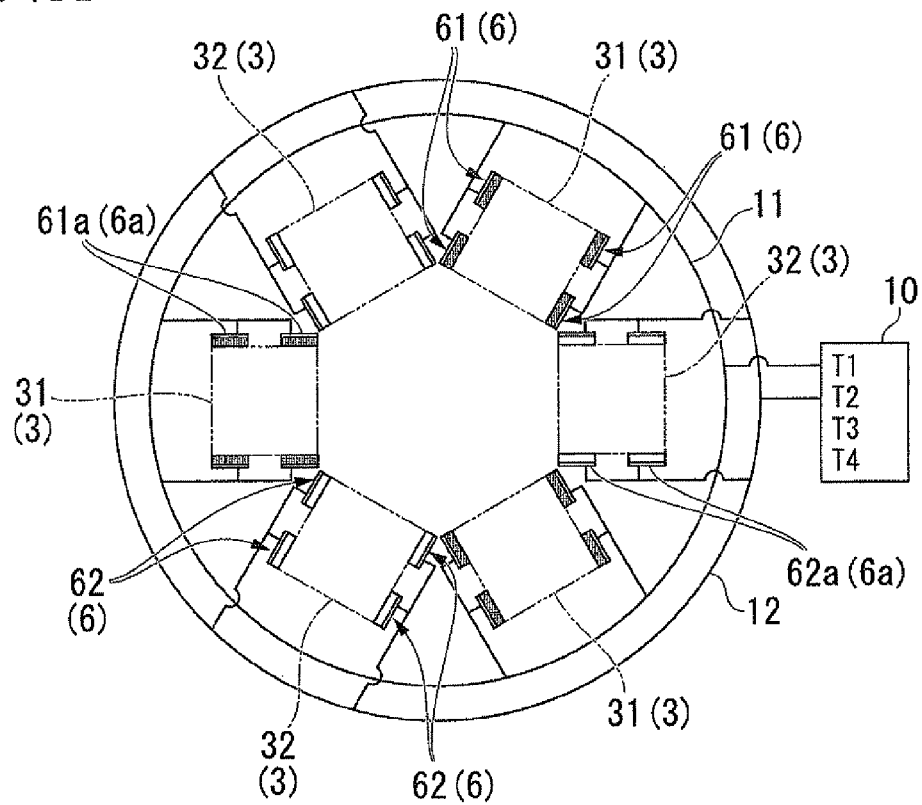
FIG. 7A is a circuit diagram illustrating the driving mechanism shown in FIG. 1.
Figure 7B:
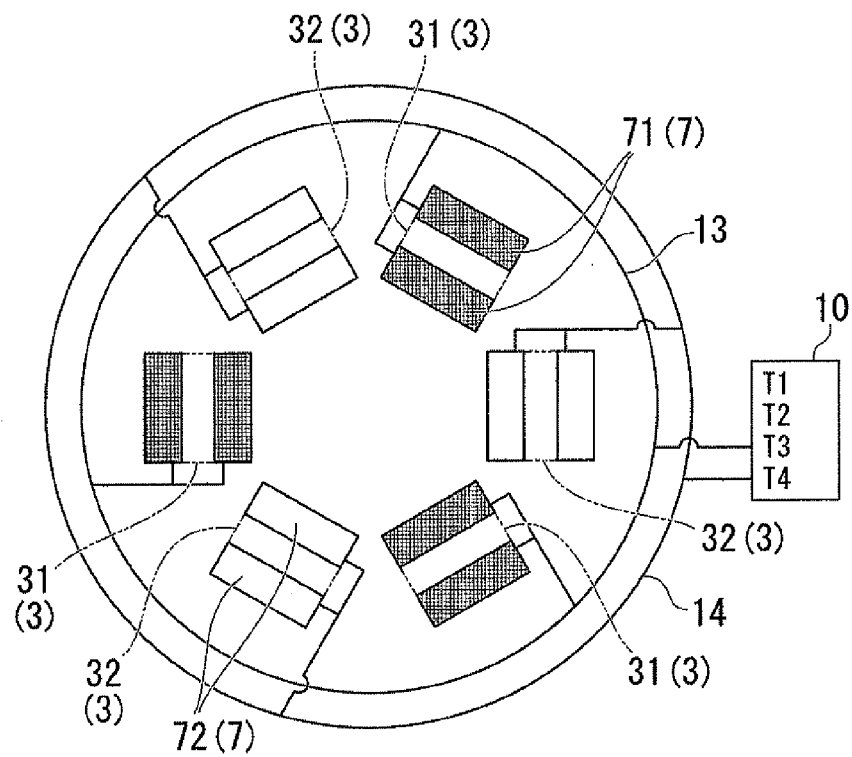
FIG. 7B is a circuit diagram of the driving mechanism.

FIG. 7A is a schematic wired diagram of the first piezoelectric elements 6 and FIG. 7B is a schematic wired diagram of the second piezoelectric elements 7. As shown in FIG. 6, the respective electrode portions 6a are electrically connected to the first line 11 (the second line 12) via the conductive adhesive 2l and the electrode face 2i, which is not shown in FIG. 7A.

As shown in FIGS. 7A and 7B, the driving mechanism 1 according to this embodiment includes a power supply unit 10 supplying voltages to the first piezoelectric elements 6 and the second piezoelectric elements 7. The power supply unit 10 supplies the voltages to the first piezoelectric elements 6 and the second piezoelectric elements 7 so that the tip portions 31a and 32a of the driving members 31 and 32 of the first group and the second group shown in FIGS. 3 and 4 repeatedly perform the contact with the rotor 4 shown in FIGS. 1 and 2, the feed in the rotation direction R of the rotor 4, the separation from the rotor 4, and the return in the opposite direction of the rotation direction R of the rotor 4.

As shown in FIG. 7A, the electrode portions 61a of the first piezoelectric elements 61 of the driving members 31 of the first group are connected to a first terminal T1 of the power supply unit 10 via the first line 11. The electrode portions 62a of the first piezoelectric elements 62 of the driving members 32 of the second group are connected to a second terminal T2 of the power supply unit 10 via the second line 12.

As shown in FIG. 7B, the second piezoelectric elements 71 of the driving members 31 of the first group are connected to a third terminal T3 of the power supply unit 10 via the third line 13 connected to the tip portions 31a of the driving members 31. The second piezoelectric elements 72 of the driving members 32 of the second group are connected to a fourth terminal T4 of the power supply unit 10 via the fourth line 14 connected to the tip portions 32a of the driving members 32.

Although not shown in FIGS. 7A and 7B, the base portions 31b and 32b of the driving members 31 and 32 are grounded.

According to this configuration, the exposed portions 6b of the electrode portions 6a of the first piezoelectric elements 6 shown in FIG. 6 are electrically connected to the power supply unit 10 shown in FIGS. 7A and 7B via the conductive adhesive 2l, the electrode face 2i, and the first line 11 (the second line 12). Accordingly, a predetermined driving voltage for driving the first piezoelectric elements 6 is applied between the electrode portions 6a of the first piezoelectric elements and the base portions 3b of the driving members 3. A predetermined driving voltage for driving the second piezoelectric elements 7 is applied between the tip portions 3a and the base portions 3b of the driving members 3.

Figure 8:
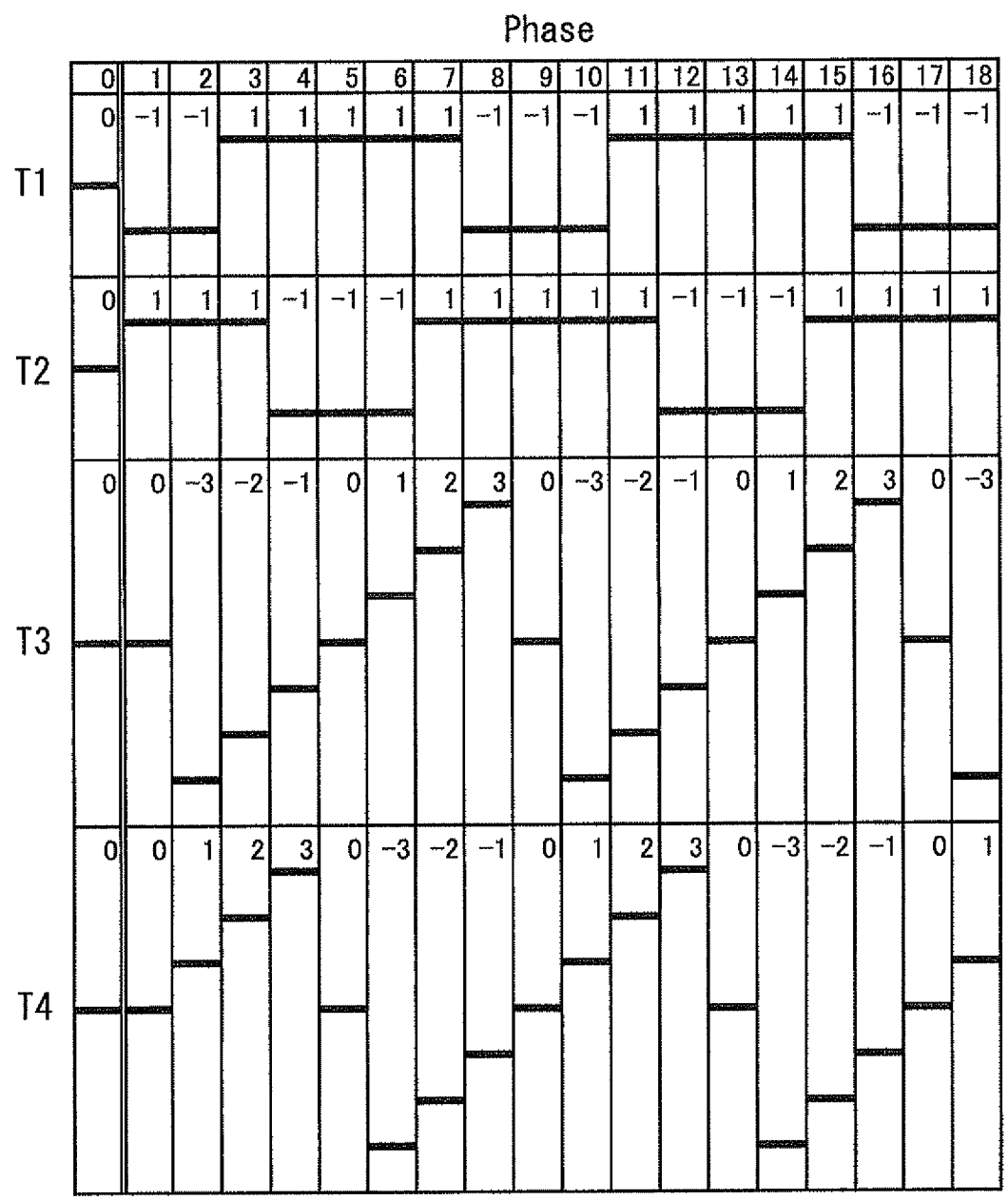
FIG. 8 is a timing diagram illustrating voltages supplied from a power supply unit of the driving mechanism shown in FIG. 1.

FIG. 8 is a timing diagram illustrating the voltages generated at the terminals T1, T2, T3, and T4 by the power supply unit 10.

As shown in FIG. 8, the power supply unit 10 generates a voltage of −1.0 V at the first terminal T1 in Phase 1 to Phase 2, generates a voltage of 1.0 V in five phases of Phase 3 to Phase 7, and generates a voltage of −1.0 V in three phases of Phase 8 to Phase 10. In the subsequent phases, the generation of the voltage of 1.0 V in five phases and the generation of the voltage of −1.0 V in three phases are repeated. That is, the power supply unit 10 generates a voltage having eight phases as a cycle at the first terminal.

The power supply unit 10 generates a voltage, which has a phase difference of 180° from the voltage generated at the first terminal T1 and has eight phases as a cycle similarly to the voltage generated at the first terminal T1, at the second terminal T2. That is, the voltage generated at the first terminal and the voltage generated at the second terminal have a phase difference of four phases corresponding to a half cycle.

The power supply unit 10 maintains the voltage of 0 V at the third terminal T3 in Phase 1, generates a voltage of −3.0 V in Phase 2, and raises the voltage by 1.0 V in the phases of Phase 3 to Phase 8. In the subsequent phases, this voltage generation pattern in Phase 1 to Phase 8 is repeated. That is, the power supply unit 10 generates a voltage having eight phases as a cycle at the third terminal T3.

The power supply unit 10 generates a voltage, which has a phase difference of 180° from the voltage generated at the third terminal T3 and has eight phases as a cycle similarly to the voltage generated at the third terminal T3, at the fourth terminal T4. That is, the voltage generated at the third terminal and the voltage generated at the fourth terminal have a phase difference of four phases corresponding to a half cycle.

In this embodiment, the frequencies of the voltages supplied to the first piezoelectric elements 6 and the second piezoelectric elements 7 from the power supply unit 10 are substantially equal to the frequency of the resonant vibration of the supporting and driving section (structure) 1a including the first piezoelectric elements 6, the second piezoelectric elements 7, the driving members 3, and the base member 2.

The operation of the driving mechanism 1 according to this embodiment will be described with reference to FIGS. 9 to 12.

Figure 9:
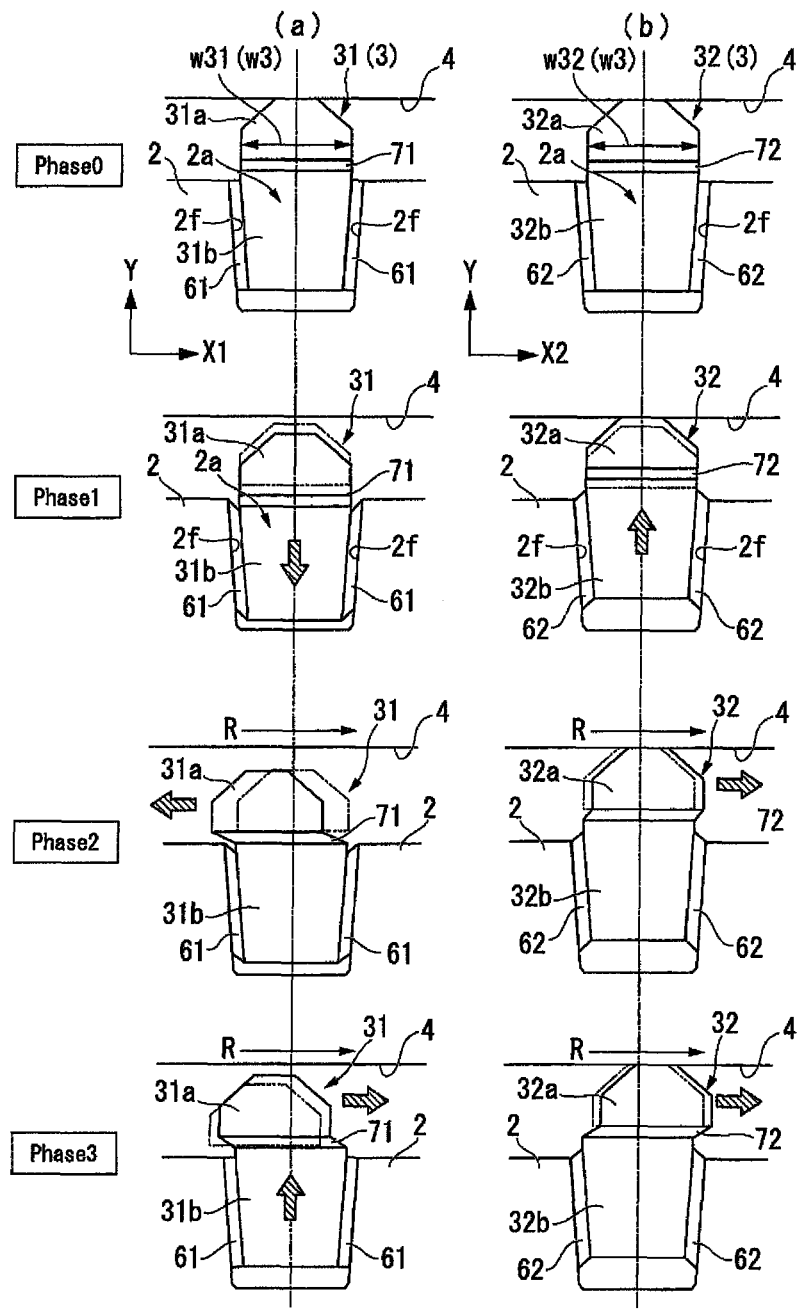
FIG. 9 is a front view illustrating the operation of a driving member of the driving mechanism shown in FIG. 1.
Figure 10:
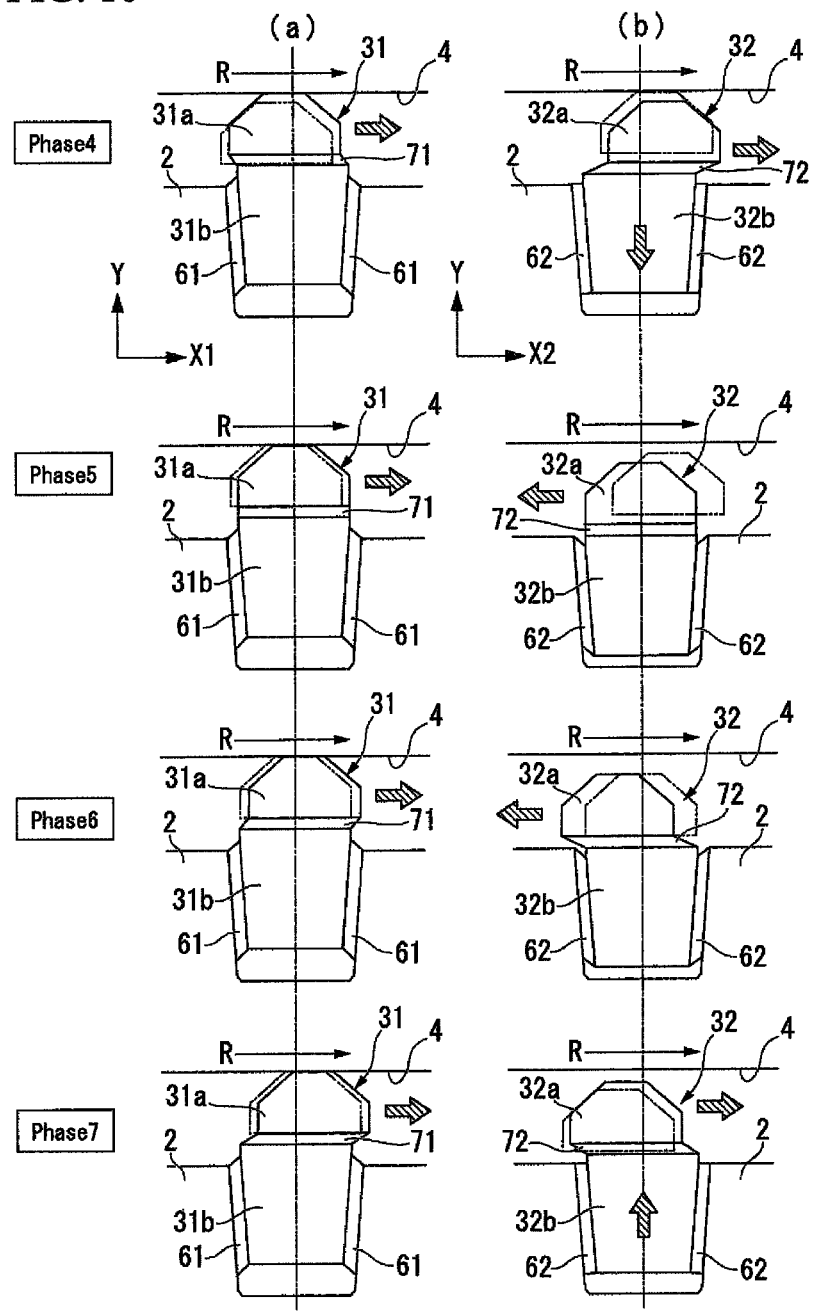
FIG. 10 is a front view of a driving member of the driving mechanism.
Figure 11:
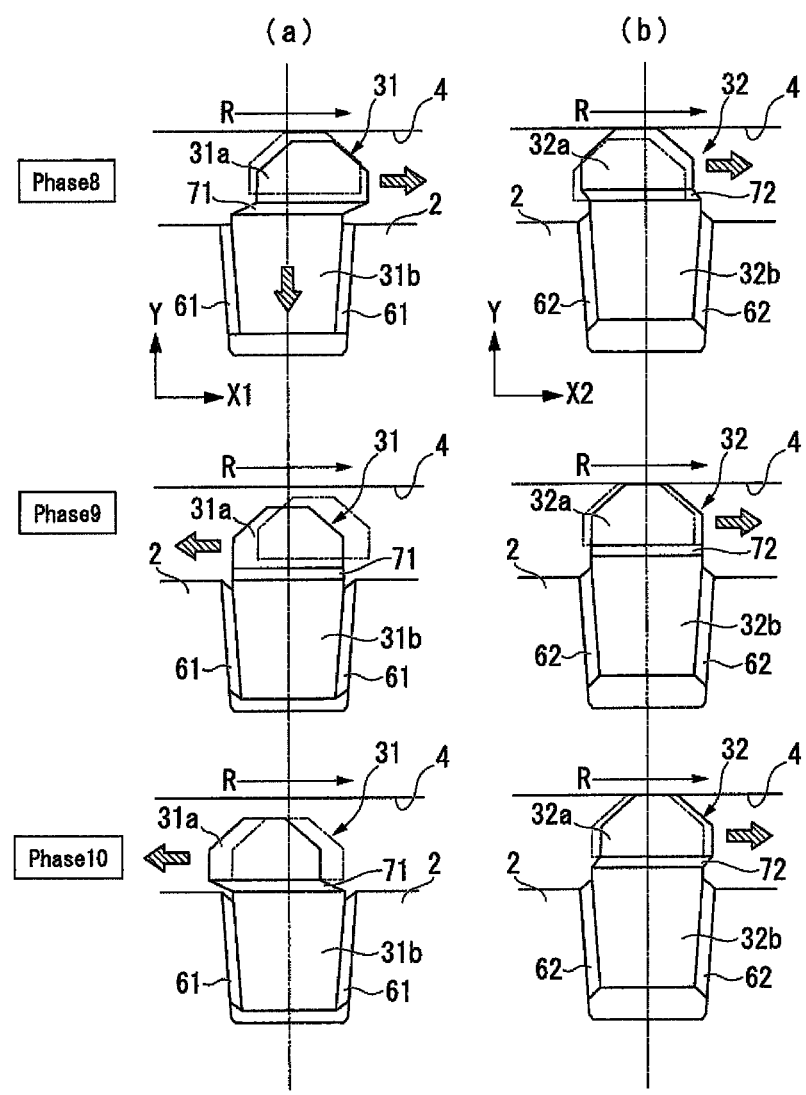
FIG. 11 is a front view of a driving member of the driving mechanism.

FIGS. 9 to 11 are enlarged front views illustrating the operation of the driving members 31 and 32 of the first group and the second group and the operation of the rotor 4.

Figure 12:
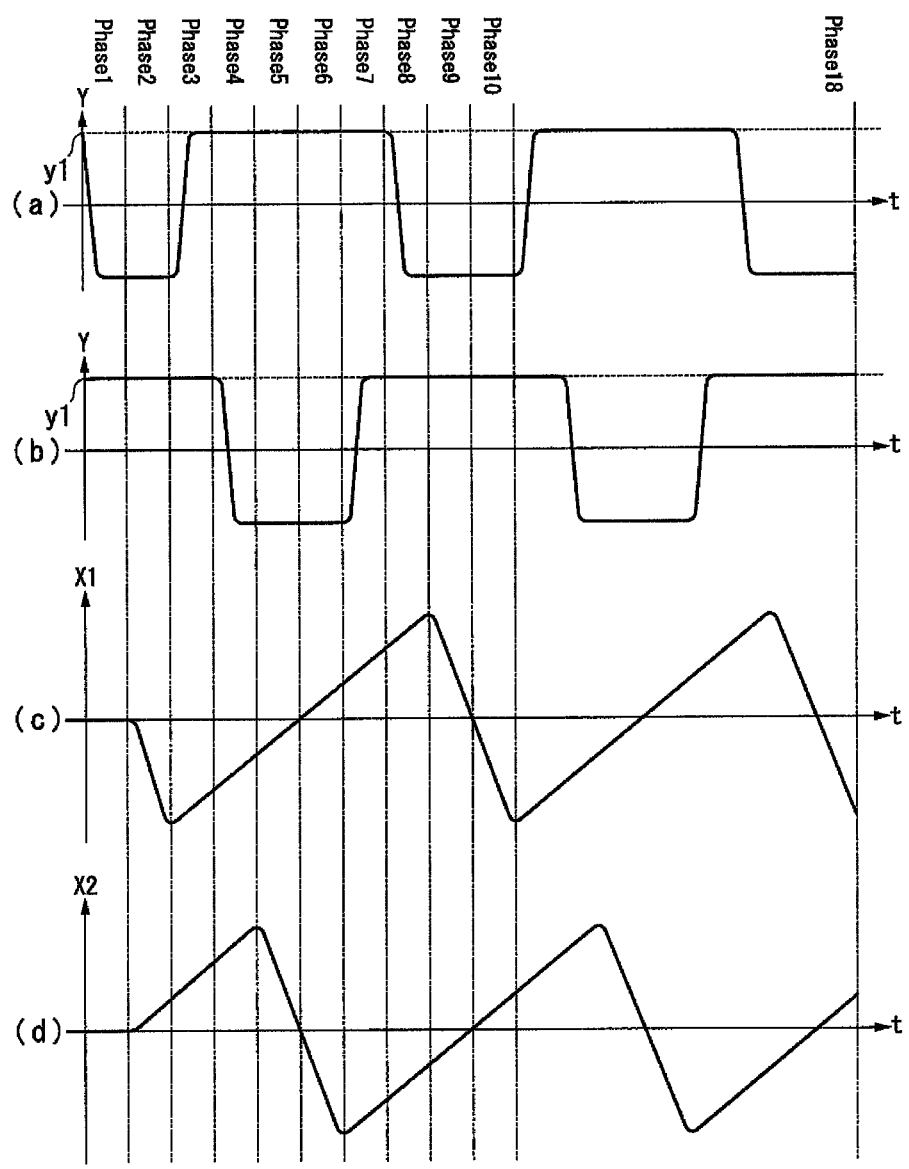
FIG. 12 is a graph illustrating a temporal variation in displacement of a tip portion of a driving member of the driving mechanism shown in FIG. 1.

FIG. 12 is a graph illustrating the relationship between the displacements in the axis directions of the tip portions 31a and 32a of the driving members 31 and 32 of the first group and the second group and the time t. In (a) and (b) of FIG. 12, the contact position y1 with the rotor 4 in the Y axis direction is indicated by a dotted line.

In (a) of FIG. 9 to (a) of FIG. 11, the operations will be described using an orthogonal coordinate system in which the width w31 direction (the first direction) of each driving member 31 of the first group along the rotation direction R (see FIG. 4) of the rotor 4 is defined as an X1 direction and the direction (the second direction) parallel to the support shaft 5 (see FIG. 2) is defined as the Y direction. In (b) of FIG. 9 to (b) of FIG. 11, the operations will be described using an orthogonal coordinate system in which the width w32 direction (the first direction) of each driving member 32 of the second group along the rotation direction R of the rotor 4 is defined as an X2 direction and the direction (the second direction) parallel to the support shaft 5 is defined as the Y direction.

Phase 0

In Phase 0, as shown in FIG. 8, the power supply unit 10 does not generate a voltage at the terminals T1, T2, T3, and T4 (0 V) and supplies a voltage of 0 V (supplies no voltage) to the first piezoelectric elements 6 and the second piezoelectric elements 7 shown in FIGS. 7A and 7B.

As shown in (a) and (b) of FIG. 9, in Phase 0, the driving members 31 of the first group and the driving members 32 of the second group are stopped in the state where the top surfaces of the top portions 31a and 32a are in contact with the rotor 4. The rotor 4 is stopped in the state where it is supported by the tip portions 31a and 32a of the driving members 31 and 32.

Phase 1

In Phase 1, as shown in FIG. 8, the power supply unit 10 generates a voltage of −1.0 V at the first terminal T1 and supplies the voltage to the electrode portions 61a of the first piezoelectric elements 61 of the driving members 31 of the first group shown in FIG. 7A via the first line 11. In Phase 1, as shown in FIG. 8, the power supply unit 10 maintains the voltage of 0 V at the third terminal T3 and supplies the voltage of 0 V to the second piezoelectric elements 71 of the driving members 31 of the first group shown in FIG. 7B via the third line 13.

Then, in Phase 1, as shown in (a) of FIG. 9, the first piezoelectric elements 61 driving the driving members 31 of the first group are deformed in a thickness-shear vibration mode and cause the base portions 31b of the driving members 31 to move toward the base member 2 in the Y direction (in the negative Y axis direction) relative to the support faces 2f of the holding portions 2a (see Phase 1 in (a) of FIG. 12). In Phase 1, as shown in (a) of FIG. 9, the second piezoelectric elements 71 are not deformed and the tip portion 31a does not move in the X1 direction (see Phase 1 in (c) of FIG. 12). Accordingly, the tip portions 31a of the driving members 31 move in the negative Y axis direction) and are separated from the rotor 4.

In Phase 1, as shown in FIG. 8, the power supply unit 10 generates a voltage of 1.0 V at the second terminal T2 and supplies the voltage to the electrode portions 62a of the first piezoelectric elements 62 of the driving members 32 of the second group shown in FIG. 7A via the second line 12. In Phase 1, as shown in FIG. 8, the power supply unit 10 maintains the voltage of 0 V at the fourth terminal T4 and supplies the voltage of 0 V to the second piezoelectric elements 72 of the driving members 32 of the second group shown in FIG. 7B via the fourth line.

Then, in Phase 1, as shown in (b) of FIG. 9, the first piezoelectric elements 62 driving the driving members 32 of the second group are deformed in a thickness-shear vibration mode and cause the base portion 32b of the driving members 32 to move toward the rotor 4 in the Y direction (in the positive Y axis direction) relative to the support faces 2f of the holding portions 2a (see Phase 1 in (b) of FIG. 12). In Phase 1, as shown in (b) of FIG. 9, the second piezoelectric elements 72 are not deformed and the tip portion 32a does not move in the X2 direction (see Phase 1 in (d) of FIG. 12). Accordingly, the driving members 32 move in the positive Y axis direction) and the tip portion 32a pushes up the rotor 4 in the positive Y axis direction.

That is, in Phase 1, as shown in (a) of FIG. 9, the tip portions 31a of the driving members 31 of the first group move in the negative Y axis direction and are thus separated from the rotor 4. At the same time, as shown in (b) of FIG. 9, the tip portions 32a of the driving members 32 of the second group come in contact with the rotor 4 to support the rotor 4 and push up the rotor 4 in the positive Y axis direction.

Phase 2

In Phase 2, as shown in FIG. 8, the power supply unit 10 maintains the voltage of −1.0 V at the first terminal T1 and maintains the voltage supplied to the electrode portions 61a of the first piezoelectric elements 61 of the driving members 31 of the first group shown in FIG. 7A via the first line 11. In Phase 2, as shown in FIG. 8, the power supply unit 10 generates a voltage of −3.0 V at the third terminal T3 and supplies the voltage to the second piezoelectric elements 71 of the driving members 31 of the first group shown in FIG. 7B via the third line 13.

Then, in Phase 2, as shown in (a) of FIG. 9, the deformation of the first piezoelectric elements 61 driving the driving members 31 of the first group in the Y axis direction is maintained and the state where the tip portions 31a are separated from the rotor 4 is maintained (see Phase 2 in (a) of FIG. 12). In Phase 2, as shown in (a) of FIG. 9, the second piezoelectric elements 71 in this state are deformed in the thickness-shear vibration mode and the tip portions 31a move in the negative X1 axis direction relative to the base portions 31b and the base member 2 (see (c) of FIG. 12). The movement of the tip portions 31a at this time is proportional to the absolute value of the voltage supplied to the second piezoelectric elements 71.

In Phase 2, as shown in FIG. 8, the power supply unit 10 maintains the voltage of 1.0 V at the second terminal T2 and maintains the voltage supplied to the electrode portions 62a of the first piezoelectric elements 62 of the driving members 32 of the second group shown in FIG. 7A via the second line 12. In Phase 2, as shown in FIG. 8, the power supply unit 10 generates a voltage of 1.0 V at the fourth terminal T4 and supplies the voltage to the second piezoelectric elements 72 of the driving members 32 of the second group shown in FIG. 7B via the fourth line 14.

Then, in Phase 2, as shown in (b) of FIG. 9, the deformation of the first piezoelectric elements 62 driving the driving members 32 of the second group in the Y axis direction is maintained and the state where the tip portions 32a come in contact with the rotor 4 is maintained (see Phase 2 in (b) of FIG. 12). In Phase 2, as shown in (b) of FIG. 9, the second piezoelectric elements 72 in this state are deformed in the thickness-shear vibration mode and the tip portions 32a move in the positive X2 axis direction relative to the base portions 32b and the base member 2 (see Phase 2 in (d) of FIG. 12). Since the movement of the tip portions 32a at this time is proportional to the absolute value of the voltage, the movement is smaller than the movement of the tip portions 31a of the first group in the negative X1 axis direction.

That is, in Phase 2, as shown in (b) of FIG. 9, a frictional force acts on the bottom surface of the rotor 4 from the top surfaces of the tip portions 32a due to the movement of the tip portions 32a of the driving members 32 of the second group in the positive X2 axis direction. Here, as shown in FIGS. 3 and 4, the driving members 32 of the second group are arranged around the base member 2 in the rotation direction R of the rotor 4. The tip portions 32a are deformed in the width w32 direction of the driving members 32 (in the X2 direction) parallel to the rotation direction R of the rotor 4. Accordingly, the rotor 4 is driven in the rotation direction R by the tip portions 32a of the driving member 32 and starts its rotation about the support shaft 5 shown in FIGS. 1 and 2.

Phase 3

In Phase 3, as shown in FIG. 8, the power supply unit 10 generates a voltage of 1.0 V, which is inverted in plus (+) and minus (−) signs, at the first terminal T1 and supplies the voltage to the electrode portions 61a of the first piezoelectric elements 61 of the driving members 31 of the first group shown in FIG. 7A via the first line 11. In Phase 3, as shown in FIG. 8, the power supply unit 10 generates a voltage of −2.0 V at the third terminal T3 and supplies the voltage to the second piezoelectric elements 71 of the driving members 31 of the first group shown in FIG. 7B via the third line 13.

Then, in Phase 3, as shown in (a) of FIG. 9, the first piezoelectric elements 61 driving the driving member 31 of the first group are reversely deformed in the thickness-shear vibration mode and cause the base portions 31b of the driving members 31 to move in the positive Y direction (see Phase 3 in (a) of FIG. 12). At the same time, in Phase 3, as shown in (a) of FIG. 9, the movement of the second piezoelectric elements 71 in the negative X1 axis direction decreases and the tip portions 31a move in the positive X1 direction relative to the base portions 31b and the base member 2 (see Phase 3 in (c) of FIG. 12). The movement at this time is proportional to the voltage difference between −2.0 V newly supplied in Phase 3 and −3.0 V supplied in Phase 2.

In Phase 3, as shown in FIG. 8, the power supply unit 10 maintains the voltage at the second terminal T2 and maintains the voltage supplied to the electrode portions 62a of the first piezoelectric elements 62 of the driving members 32 of the second group shown in FIG. 7A via the second line 12. In Phase 3, as shown in FIG. 8, the power supply unit 10 generates a voltage of 2.0 V at the fourth terminal T4 and supplies the voltage to the second piezoelectric elements 72 of the driving members 32 of the second group shown in FIG. 7B via the fourth line 14.

Then, in Phase 3, as shown in (b) of FIG. 9, the deformation of the first piezoelectric elements 62 driving the driving members 32 of the second group is maintained and the state where the tip portions 32a come in contact with the rotor 4 is maintained (see Phase 3 in (b) of FIG. 12). In Phase 3, as shown in (b) of FIG. 9, the second piezoelectric elements 72 in this state are deformed in the thickness-shear vibration mode and the tip portions 32a move in the positive X2 axis direction relative to the base portions 32b and the base member 2 (see Phase 3 in (d) of FIG. 12). The movement at this time is proportional to the absolute value of the voltage difference between 2.0 V newly supplied in Phase 3 and 1.0 V supplied in Phase 2.

That is, in Phase 3, as shown in (a) of FIG. 9, the tip portions 31a of the driving members 31 of the first group move in the positive Y axis direction while moving in the positive X1 axis direction parallel to the rotation direction R of the rotor 4 and get close to and come in contact with the rotor 4. At the same time, as shown in (b) of FIG. 9, the tip portions 32a of the driving members 32 of the second group come in contact with the rotor 4 to support the rotor 4 and drive the rotor 4 in the rotation direction R.

Phase 4

In Phase 4, as shown in FIG. 8, the power supply unit 10 maintains the voltage of 1.0 V at the first terminal T1 and maintains the voltage supplied to the electrode portions 61a of the first piezoelectric elements 61 of the driving members 31 of the first group shown in FIG. 7A via the first line 11. In Phase 4, as shown in FIG. 8, the power supply unit 10 generates a voltage of −1.0 V at the third terminal T3 and supplies the voltage to the second piezoelectric elements 71 of the driving members 31 of the first group shown in FIG. 7B via the third line 13.

Then, in Phase 4, as shown in (a) of FIG. 10, the deformation of the first piezoelectric elements 61 driving the driving members 31 of the first group in the positive Y axis direction is maintained and the state where the tip portion 31a is in contact with the rotor 4 is maintained (see Phase 4 in (a) of FIG. 12). At the same time, in Phase 4, as shown in (a) of FIG. 10, the movement of the second piezoelectric elements 71 in the negative X1 axis direction decreases and the tip portions 31a move in the positive X1 axis direction relative to the base portions 31b and the base member 2 (see Phase 4 in (c) of FIG. 12). The movement at this time is proportional to the absolute value of the voltage difference between −1.0 V newly supplied in Phase 4 and −2.0 V supplied in Phase 3.

In Phase 4, as shown in FIG. 8, the power supply unit 10 generates a voltage of −1.0 V, which is inverted in plus (+) and minus (−) signs, at the second terminal T2 and supplies the voltage to the electrode portions 62a of the first piezoelectric elements 62 of the driving members 32 of the second group shown in FIG. 7A via the second line 12. In Phase 4, as shown in FIG. 8, the power supply unit 10 generates a voltage of 3.0 V at the fourth terminal T4 and supplies the voltage to the second piezoelectric elements 72 of the driving members 32 of the second group shown in FIG. 7B via the fourth line 14.

Then, in Phase 4, as shown in (b) of FIG. 10, the first piezoelectric elements 62 driving the driving members 32 of the second group are deformed in the thickness-shear vibration mode and the base portions 32b of the driving members 32 are made to move in the negative Y axis direction (see Phase 4 in (b) of FIG. 12). At the same time, in Phase 4, as shown in (b) of FIG. 10, the movement of the second piezoelectric elements 72 in the positive X2 axis direction increases and the tip portions 32a move in the positive X2 axis direction relative to the base portions 32b and the base member 2 (see Phase 4 in (d) of FIG. 12). The movement at this time is proportional to the absolute value of the voltage difference between 3.0 V newly supplied in Phase 4 and 2.0 V supplied in Phase 2.

That is, in Phase 4, as shown in (a) of FIG. 10, the tip portions 31a of the driving members 31 of the first group move in the positive X1 axis direction parallel to the rotation direction R of the rotor 4 in the state where they are in contact with the rotor 4 and support and drive the rotor 4 in the rotation direction R. At the same time, as shown in (b) of FIG. 10, the tip portions 32a of the driving members 32 of the second group move in the negative Y axis direction while moving in the positive X2 axis direction parallel to the rotation direction R of the rotor 4 and are separated from the rotor 4. Accordingly, the rotor 4 is driven in the rotation direction R by the tip portions 31a and 32a of the driving members 31 and 32 of the first and second groups and the rotor 4 is handed over from the tip portions 32a of the driving members 32 of the second group to the tip portions 31a of the driving members 31 of the first group.

At this time, in Phase 4, both driving members 31 and 32 may be separated from the rotor 4 for a very short time. In this case, the rotor 4 is not displaced in the Y direction due to its inertia but stays at the position at which it is supported by the tip portions 32a of the driving members 32 of the second group. Accordingly, in the state where the rotor 4 is maintained at a substantially constant position in the Y direction and is driven in the rotation direction R, the rotor 4 is supported in the Y direction and is driven in the rotation direction R by the tip portions 31a of the driving members 31 of the first group. As a result, the rotor 4 continuously rotates about the support shaft 5 at a substantially constant position in the Y direction.

Phase 5

In Phase 5, as shown in FIG. 8, the power supply unit 10 maintains the voltage of 1.0 V at the first terminal T1 and maintains the voltage supplied to the electrode portions 61a of the first piezoelectric elements 61 of the driving members 31 of the first group shown in FIG. 7A via the first line 11. In Phase 5, as shown in FIG. 8, the power supply unit 10 generates a voltage of 0 V at the third terminal T3 and supplies the voltage of 0 V to the second piezoelectric elements 71 of the driving members 31 of the first group shown in FIG. 7B via the third line 13.

Then, in Phase 5, as shown in (a) of FIG. 10, the deformation of the first piezoelectric elements 61 driving the driving members 31 of the first group in the Y axis direction is maintained and the state where the tip portions 31a are in contact with the rotor 4 is maintained (see Phase 5 in (a) of FIG. 12). In Phase 5, as shown in (a) of FIG. 10, the second piezoelectric elements 71 in this state are returned to the original shape and the tip portions 31a move in the positive X1 axis direction relative to the base portions 31b and the base member 2 (see Phase 5 in (c) of FIG. 12). The movement of the tip portions 31a at this time is proportional to the absolute value of the voltage supplied to the second piezoelectric elements 71 in Phase 4.

In Phase 5, as shown in FIG. 8, the power supply unit 10 maintains the voltage of −1.0 V at the second terminal T2 and maintains the voltage supplied to the electrode portions 62a of the first piezoelectric elements 62 of the driving members 32 of the second group shown in FIG. 7A via the second line 12. In Phase 5, as shown in FIG. 8, the power supply unit 10 generates the voltage of 0 V at the fourth terminal T4 and supplies the voltage of 0 V to the second piezoelectric elements 72 of the driving members 32 of the second group shown in FIG. 7B via the fourth line 14.

Then, in Phase 5, as shown in (b) of FIG. 10, the deformation of the first piezoelectric elements 62 driving the driving members 32 of the second group in the Y direction is maintained and the state where the tip portions 32a are separated from the rotor 4 is maintained (see Phase 5 in (b) of FIG. 12). At the same time, in Phase 5, as shown in (b) of FIG. 10, the second piezoelectric elements 72 are returned to the original shape and the tip portions 32a move in the negative X2 axis direction relative to the base portions 32b and the base member 2 (see Phase 5 in (d) of FIG. 12). The movement of the tip portions 32a at this time is proportional to the absolute value of the voltage supplied to the second piezoelectric elements 72 in Phase 4.

That is, in Phase 5, as shown in (a) of FIG. 10, the tip portions 31a of the driving members 31 of the first group move in the positive X1 axis direction while maintaining the state where they are in contact with the rotor 4 and supporting the rotor 4 and drive the rotor 4 in the rotation direction R. At the same time, as shown in (b) of FIG. 10, the tip portions 32a of the driving members 32 of the second group move in the negative Y axis direction and move in the negative X2 axis direction which is opposite to the rotation direction R of the rotor 4 relative to the base portions 32b and the base member 2 while maintaining the state where they are separated from the rotor 4.

Phase 6

In Phase 6, as shown in FIG. 8, the power supply unit 10 maintains the voltage of 1.0 V at the first terminal T1 and maintains the voltage supplied to the electrode portions 61a of the first piezoelectric elements 61 of the driving members 31 of the first group shown in FIG. 7A via the first line 11. In Phase 6, as shown in FIG. 8, the power supply unit 10 generates a voltage of 1.0 V at the third terminal T3 and supplies the voltage to the second piezoelectric elements 71 of the driving members 31 of the first group shown in FIG. 7B via the third line 13.

Then, in Phase 6, as shown in (a) of FIG. 10, the deformation of the first piezoelectric elements 61 driving the driving members 31 of the first group in the Y direction is maintained and the state where the tip portions 31a are in contact with the rotor 4 is maintained (see Phase 6 in (a) of FIG. 12). In Phase 6, as shown in (a) of FIG. 10, the second piezoelectric elements 71 in this state are deformed in the thickness-shear vibration mode and the tip portions 31*a* move in the positive X1 axis direction relative to the base portions 31*b* and the base member 2 (see Phase 6 in (c) of FIG. 12). The movement at this time is proportional to the absolute value of the voltage newly supplied in Phase 6.

In Phase 6, as shown in FIG. 8, the power supply unit 10 maintains the voltage of −1.0 V at the second terminal T2 and maintains the voltage supplied to the electrode portions 62*a* of the first piezoelectric elements 62 of the driving members 32 of the second group shown in FIG. 7A via the second line 12. In Phase 6, as shown in FIG. 8, the power supply unit 10 generates a voltage of −3.0 V at the fourth terminal T4 and supplies the voltage to the second piezoelectric elements 72 of the driving members 32 of the second group shown in FIG. 7B via the fourth line 14.

Then, in Phase 6, as shown in (b) of FIG. 10, the deformation of the first piezoelectric elements 62 driving the driving members 32 of the second group is maintained and the state where the tip portions 32*a* are separated from the rotor 4 is maintained (see Phase 6 in (b) of FIG. 12). In Phase 6, as shown in (b) of FIG. 10, the second piezoelectric elements 72 in this state are deformed in the thickness-shear vibration mode and the tip portions 32*a* move in the negative X2 axis direction relative to the base portions 32*b* and the base member 2 (see Phase 6 in (d) of FIG. 12). The movement of the tip portions 32*a* at this time is proportional to the absolute value of the voltage supplied to the second piezoelectric elements 72.

That is, in Phase 6, as shown in (a) of FIG. 10, the tip portions 31*a* of the driving members 31 of the first group move in the positive X1 axis direction while maintaining the state where they are in contact with the rotor 4 and supporting the rotor 4 and drive the rotor 4 in the rotation direction R. At the same time, as shown in (b) of FIG. 10, the tip portions 32*a* of the driving members 32 of the second group move in the negative X2 axis direction, which is opposite to the rotation direction R of the rotor 4, relative to the base portions 32*b* and the base member 2 while maintaining the state where they are separated from the rotor 4.

Phase 7

In Phase 7, as shown in FIG. 8, the power supply unit 10 maintains the voltage of 1.0 V at the first terminal T1 and maintains the voltage supplied to the electrode portions 61*a* of the first piezoelectric elements 61 of the driving members 31 of the first group shown in FIG. 7A via the first line 11. In Phase 7, as shown in FIG. 8, the power supply unit 10 generates a voltage of 2.0 V at the third terminal T3 and supplies the voltage to the second piezoelectric elements 71 of the driving members 31 of the first group shown in FIG. 7B via the third line 13.

Then, in Phase 7, as shown in (a) of FIG. 10, the deformation of the first piezoelectric elements 61 driving the driving members 31 of the first group is maintained and the state where the tip portions 31*a* are in contact with the rotor 4 is maintained (see Phase 7 in (a) of FIG. 12). In Phase 7, as shown in (a) of FIG. 10, the second piezoelectric elements 71 in this state are deformed in the thickness-shear vibration mode and the tip portions 31*a* move in the positive X1 axis direction relative to the base portions 31*b* and the base member 2 (see Phase 7 in (c) of FIG. 12). The movement at this time is proportional to the absolute value of the voltage difference between 2.0 V newly supplied in Phase 7 and 1.0 V supplied in Phase 6.

In Phase 7, as shown in FIG. 8, the power supply unit 10 generates the voltage of 1.0 V, which is inverted in plus (+) and minus (−) signs, at the second terminal T2 and supplies the voltage supplied to the electrode portions 62*a* of the first piezoelectric elements 62 of the driving members 32 of the second group shown in FIG. 7A via the second line 12. In Phase 7, as shown in FIG. 8, the power supply unit 10 generates the voltage of −2.0 V at the fourth terminal T4 and supplies the voltage to the second piezoelectric elements 72 of the driving members 32 of the second group shown in FIG. 7B via the fourth line 14.

Then, in Phase 7, as shown in (b) of FIG. 10, the first piezoelectric elements 62 driving the driving members 32 of the second group are deformed in the thickness-shear vibration mode and the base portions 32*b* of the driving members 32 are made to move in the positive Y axis direction (see Phase 7 in (b) of FIG. 12). At the same time, in Phase 7, as shown in (b) of FIG. 10, the movement of the second piezoelectric elements 72 in the negative X2 axis direction decreases and the tip portions 32*a* move in the positive X2 axis direction relative to the base portions 32*b* and the base member 2 (see Phase 7 in (d) of FIG. 12). The movement at this time is proportional to the absolute value of the voltage difference between −2.0 V newly supplied in Phase 7 and −3.0 V supplied in Phase 6.

That is, in Phase 7, as shown in (a) of FIG. 10, the tip portions 31*a* of the driving members 31 of the first group drive the rotor 4 in the rotation direction R while maintaining the state where they are in contact with the rotor 4 and supporting the rotor 4. At the same time, as shown in (b) of FIG. 10, the tip portions 32*a* of the driving members 32 of the second group move in the positive Y axis direction while moving in the positive X2 axis direction parallel to the rotation direction R of the rotor 4 and come in contact with the rotor 4.

Phase 8

In Phase 8, as shown in FIG. 8, the power supply unit 10 generates a voltage of −1.0 V, which is inverted in plus (+) and minus (−) signs, at the first terminal T1 and supplies the voltage to the electrode portions 61*a* of the first piezoelectric elements 61 of the driving members 31 of the first group shown in FIG. 7A via the first line 11. In Phase 8, as shown in FIG. 8, the power supply unit 10 generates a voltage of 3.0 V at the third terminal T3 and supplies the voltage to the second piezoelectric elements 71 of the driving members 31 of the first group shown in FIG. 7B via the third line 13.

Then, in Phase 8, as shown in (a) of FIG. 11, the first piezoelectric elements 61 driving the driving member 31 of the first group are reversely deformed in the thickness-shear vibration mode and cause the base portions 3*b* of the driving members 3 to move in the negative Y direction (see Phase 8 in (a) of FIG. 12). At the same time, in Phase 8, as shown in (a) of FIG. 11, the movement of the second piezoelectric elements 71 in the positive X1 axis direction increases and the tip portions 31*a* move in the positive X1 direction relative to the base portions 31*b* and the base member 2 (see Phase 8 in (c) of FIG. 12). The movement at this time is proportional to the voltage difference between 3.0 V newly supplied in Phase 8 and 2.0 V supplied in Phase 7.

In Phase 8, as shown in FIG. 8, the power supply unit 10 maintains the voltage of 1.0 V at the second terminal T2 and maintains the voltage supplied to the electrode portions 62*a* of the first piezoelectric elements 62 of the driving members 32 of the second group shown in FIG. 7A via the second line 12. In Phase 8, as shown in FIG. 8, the power supply unit 10 generates a voltage of −1.0 V at the fourth terminal T4 and supplies the voltage to the second piezoelectric elements 72 of the driving members 32 of the second group shown in FIG. 7B via the fourth line 14.

Then, in Phase 8, as shown in (b) of FIG. 11, the deformation of the first piezoelectric elements 62 driving the driving members 32 of the second group in the Y direction is maintained and the state where the tip portions 32a come in contact with the rotor 4 is maintained (see Phase 8 in (b) of FIG. 12). In Phase 8, as shown in (b) of FIG. 11, the movement of the second piezoelectric elements 72 in the negative X2 axis direction decreases and the tip portions 32a move in the positive X2 axis direction relative to the base portions 32b and the base member 2 (see Phase 8 in (d) of FIG. 12). The movement at this time is proportional to the absolute value of the voltage difference between −1.0 V newly supplied in Phase 8 and −2.0 V supplied in Phase 7.

That is, in Phase 8, as shown in (a) of FIG. 11, the tip portions 31a of the driving members 31 of the first group move in the negative Y axis direction while moving in the positive X1 axis direction parallel to the rotation direction R of the rotor 4 and are separated from the rotor 4. At the same time, as shown in (b) of FIG. 11, the tip portions 32a of the driving members 32 of the second group move in the positive X2 axis direction parallel to the rotation direction R of the rotor 4 in the state where they are in contact with the rotor 4 and support and drive the rotor 4 in the rotation direction R. Accordingly, the rotor 4 is driven in the rotation direction R by the tip portions 31a and 32a of the driving members 31 and 32 of the first and second groups and the rotor 4 is handed over from the tip portions 31a of the driving members 31 of the first group to the tip portions 32a of the driving members 32 of the second group.

At this time, in Phase 8, both driving members 31 and 32 may be separated from the rotor 4 for a very short time. In this case, the rotor 4 is not displaced in the Y direction due to its inertia but stays at the position at which it is supported by the tip portions 31a of the driving members 31 of the first group. Accordingly, in the state where the rotor 4 is maintained at a substantially constant position in the Y direction and is driven in the rotation direction R, the rotor 4 is supported in the Y direction and is driven in the rotation direction R by the tip portions 32a of the driving members 32 of the second group. As a result, the rotor 4 continuously rotates about the support shaft 5 at a substantially constant position in the Y direction.

Phase 9

In Phase 9, as shown in FIG. 8, the power supply unit 10 maintains the voltage of −1.0 V at the first terminal T1 and maintains the voltage supplied to the electrode portions 61a of the first piezoelectric elements 61 of the driving members 31 of the first group shown in FIG. 7A via the first line 11. In Phase 9, as shown in FIG. 8, the power supply unit 10 generates a voltage of 0 V at the third terminal T3 and supplies the voltage of 0 V to the second piezoelectric elements 71 of the driving members 31 of the first group shown in FIG. 7B via the third line 13.

Then, in Phase 9, as shown in (a) of FIG. 11, the deformation of the first piezoelectric elements 61 driving the driving members 31 of the first group in the Y axis direction is maintained and the state where the tip portions 31a are separated from the rotor 4 is maintained (see Phase 9 in (a) of FIG. 12). At the same time, in Phase 9, as shown in (a) of FIG. 11, the second piezoelectric elements 71 are returned to the original shape and the tip portions 31a move in the negative X1 axis direction relative to the base portions 31b and the base member 2 (see Phase 9 in (c) of FIG. 12). The movement of the tip portions 31a at this time is proportional to the absolute value of the voltage supplied to the second piezoelectric elements 7 in Phase 8.

In Phase 9, as shown in FIG. 8, the power supply unit 10 maintains the voltage of 1.0 V at the second terminal T2 and maintains the voltage supplied to the electrode portions 62a of the first piezoelectric elements 62 of the driving members 32 of the second group shown in FIG. 7A via the second line 12. In Phase 9, as shown in FIG. 8, the power supply unit 10 generates the voltage of 0 V at the fourth terminal T4 and supplies the voltage of 0 V to the second piezoelectric elements 72 of the driving members 32 of the second group shown in FIG. 7B via the fourth line 14.

Then, in Phase 9, as shown in (b) of FIG. 11, the deformation of the first piezoelectric elements 62 driving the driving members 32 of the second group in the Y direction is maintained and the state where the tip portions 32a are in contact with the rotor 4 is maintained (see Phase 9 in (b) of FIG. 12). In Phase 9, as shown in (b) of FIG. 11, the second piezoelectric elements 72 in this state are returned to the original shape and the tip portions 32a move in the positive X2 axis direction relative to the base portions 32b and the base member 2 (see Phase 9 in (d) of FIG. 12). The movement of the tip portions 32a at this time is proportional to the absolute value of the voltage supplied to the second piezoelectric elements 72 in Phase 8.

That is, in Phase 9, as shown in (a) of FIG. 11, the tip portions 31a of the driving members 31 of the first group move in the negative X1 axis direction which is opposite to the rotation direction R of the rotor 4 while maintaining the state where they move in the negative Y axis direction and are separated from the rotor 4. At the same time, as shown in (b) of FIG. 11, the tip portions 32a of the driving members 32 of the second group move in the positive X1 axis direction parallel to the rotation direction R of the rotor 4 and drive the rotor 4 in the rotation direction R while maintaining the state where they are in contact with the rotor 4 and supporting the rotor 4.

Phase 10

In Phase 10, as shown in FIG. 8, the power supply unit 10 maintains the voltage of −1.0 V at the first terminal T1 and maintains the voltage supplied to the electrode portions 61a of the first piezoelectric elements 61 of the driving members 31 of the first group shown in FIG. 7A via the first line 11. In Phase 10, as shown in FIG. 8, the power supply unit 10 generates a voltage of −3.0 V at the third terminal T3 and supplies the voltage to the second piezoelectric elements 71 of the driving members 31 of the first group shown in FIG. 7B via the third line 13.

Then, in Phase 10, as shown in (a) of FIG. 11, the deformation of the first piezoelectric elements 61 driving the driving members 31 of the first group in the Y direction is maintained and the state where the tip portions 31a are separated from the rotor 4 is maintained (see Phase 10 in (a) of FIG. 12). In Phase 10, as shown in (a) of FIG. 11, the second piezoelectric elements 71 in this state are deformed in the thickness-shear vibration mode and the tip portions 31a move in the negative X1 axis direction relative to the base portions 31b and the base member 2 (see Phase 10 in (c) of FIG. 12). The movement of the tip portions 31a at this time is proportional to the absolute value of the voltage supplied to the second piezoelectric elements 71.

In Phase 10, as shown in FIG. 8, the power supply unit 10 maintains the voltage of 1.0 V at the second terminal T2 and maintains the voltage supplied to the electrode portions 62a of the first piezoelectric elements 62 of the driving members 32 of the second group shown in FIG. 7A via the second line 12. In Phase 10, as shown in FIG. 8, the power supply unit 10 generates a voltage of 1.0 V at the fourth terminal T4 and supplies the voltage to the second piezoelectric elements 72 of the driving members 32 of the second group shown in FIG. 7B via the fourth line 14.

Then, in Phase 10, as shown in (b) of FIG. 11, the deformation of the first piezoelectric elements 62 driving the driving members 32 of the second group in the Y direction is maintained and the state where the tip portions 32a are in contact with the rotor 4 is maintained (see Phase 10 in (b) of FIG. 12). In Phase 10, as shown in (b) of FIG. 11, the second piezoelectric elements 72 in this state are deformed in the thickness-shear vibration mode and the tip portions 32a move in the positive X2 axis direction relative to the base portions 32b and the base member 2 (see Phase 10 in (d) of FIG. 12). The movement at this time is proportional to the absolute value of the voltage newly supplied in Phase 10.

That is, in Phase 10, as shown in (a) of FIG. 11, the tip portions 31a of the driving members 31 of the first group further move in the negative X1 axis direction relative to the base portions 31b and the base member 2 while maintaining the state where they are separated from the rotor 4. At the same time, as shown in (b) of FIG. 11, the tip portions 32a of the driving members 32 of the second group move in the positive X2 axis direction parallel to the rotation direction R of the rotor 4 and drive the rotor 4 in the rotation direction R, while maintaining the state where they are in contact with the rotor 4 and supporting the rotor 4.

In Phase 11 and the phases subsequent thereto, the same operations as the operations of Phase 3 to Phase 10 are repeatedly performed and the rotor 4 continuously rotates. Accordingly, by the tip portions 31a of the driving members 31 of the first group and the tip portions 32a of the driving members 32 of the second group, the rotor 4 is alternately (sequentially) supported in the Y axis direction and is driven in the rotation direction R and the rotor 4 continuously rotates about the support shaft 5.

In the driving mechanism 1 according to this embodiment, the first piezoelectric elements 6 driving the driving members 3 in the direction (the second direction) parallel to the support shaft 5 and the second piezoelectric elements 7 driving the tip portions 3a of the driving members 3 in the width w3 direction (the first direction) of the corresponding driving member 3 parallel to the rotation direction R of the rotor 4 are independently disposed. Accordingly, it is possible to take out the vibrations in the directions as independent vibrations.

Therefore, when causing the rotor 4 to rotate by the use of the driving members 3 and relatively driving the rotor 4 and the driving members 3, it is possible to cause the rotor 4 to rotate more stably. Compared with the case where the first piezoelectric elements 6 interposing the base portion 3b therebetween drive the base portion 3b in different directions, it is difficult to cause the loss and it is possible to improve the energy efficiency, thereby enhancing the output of the driving mechanism 1.

The electrode portion 6a of each first piezoelectric element 6 includes the exposed portion 6b exposed from the base member 2. Therefore, when the first piezoelectric elements 6 having the electrode portion 6a are assembled into the base member 2, it is possible to prevent the electrode portions 6a from being covered with the base member 2 to make the electrical connection difficult. Accordingly, it is possible to easily and satisfactorily assemble the driving mechanism 1, thereby enhancing productivity and yield.

In this embodiment, the electrode portion 6a is formed in a rectangular shape and the part exposed from the base member 2 is defined as the exposed portion 6b, That is, it is not necessary to form the electrode portion 6a in any special shape. The electrode portion 6a of the first piezoelectric element 6 is incorporated into the first piezoelectric element 6. Accordingly, compared with the case where the electrode portion 6a and the first piezoelectric element 6 are independently prepared and are assembled into the base member 2, it is possible to reduce the number of processes, thereby facilitating the assembly.

As shown in FIGS. 5A and 5B and FIG. 6, the electrode portion 6a of each first piezoelectric element 6 is disposed on the surface facing the support face 2f of the holding portion 2a of the base member 2. Therefore, it is possible to expose the exposed portion 6b as a part of the electrode portion 6a from the base member 2.

When assembling the driving mechanism 1, the positions of the end of each first piezoelectric element 6 and the electrode portion 6a thereof facing the rotor 4 may depart from the end face of the base member 2 facing the rotor 4 toward the bottom 2g of the corresponding holding portion 2a facing the rotor 4 due to an error in the manufacturing process.

In this embodiment, the chamfered portions 2h are formed as the exposing portion for exposing the exposed portions 6b of the electrode portion 6a in the base member 2. Therefore, even when an error occurs at the time of manufacturing, it is possible to satisfactorily expose the exposed portions 6b from the base member 2.

The chamfered portions 2h are formed at the corners of the end of the base member 2 facing the rotor 4. Therefore, for example, compared with the case where a concave notch or recess is formed in the end face between the corner of the outer circumference and the corner of the inner circumference or the case where a concave notch or recess is formed in a part of the support face 2f of the holding portion 2a, it is possible to enhance the rigidity of the base member 2 and the holding portions 2a. Accordingly, it is possible to independently take out the vibrations in the width w3 direction (the first direction) of the driving members 3 and the direction (the second direction) parallel to the support shaft 5.

By forming the chamfered portion 2h as the exposing portion, it is possible to easily form the exposing portion in the typical manufacturing process. Therefore, it is possible to prevent the manufacturing process from being complicated and to prevent the number of manufacturing processes from increasing, thereby preventing the lowering in productivity.

Since the exposed portion 6b is electrically connected to the power supply unit 10, the voltage generated from the power supply unit 10 can be applied to the electrode portion 6a via the exposed portion 6b. By applying the voltage between the electrode portions 6a and the base portion 3b of the driving member 3, it is possible to drive the first piezoelectric element 6.

The first piezoelectric elements 6 interpose the base portion 3b of the driving member 3 in the width w3 direction and the first piezoelectric elements 6 drive the driving member 3 in the direction different from the width w3 direction and parallel to the support shaft 5. The sizes and shapes of a pair of first piezoelectric elements 6 and 6 interposing the base portion 3b therebetween are substantially the same. Accordingly, it is possible to make the rigidity of the driving member 3 in the width w3 direction uniform. Therefore, it is possible to suppress the vibration of the base portion 3b of the driving member 3 in the width w3 direction. By setting all the first piezoelectric elements 6 and the second piezoelectric elements 7 to the same shape and size, it is possible to facilitate the manufacturing, thereby enhancing the productivity.

The holding portions 2a holding the corresponding driving members 3 so as to move in the direction parallel to the support shaft 5 are formed in the base member 2. The support faces 2f supporting the base portion 3b of the driving member 3 in the width w3 direction of the driving member 3 are formed in the holding portions 2a. Accordingly, it is possible to support the first piezoelectric elements 6 through the use of the support faces 2f and to support the base portion 3b of each driving member 3 in the width w3 direction with the first piezoelectric elements 6 interposed therebetween. As a result, it is possible to raise the rigidity of the driving member 3 in the width w3 direction, thereby suppressing the vibration of the base portion 3b of the driving member 3 in the width w3 direction.

Here, in each first piezoelectric element 6, the ratio of the elastic coefficient in the thickness direction (the longitudinal elastic coefficient) and the elastic coefficient in the deformation direction (the transverse elastic coefficient) is about 3:1. Therefore, it is possible to raise the rigidity of the driving member 3 in the width w3 direction and to lower the rigidity of the base portion 3b in the driving direction. As a result, it is possible to prevent the movement of the base portion 3b in the width w3 direction, thereby suppressing the vibration thereof. It is also possible to facilitate the displacement of the base portion 3b in the driving direction.

As shown in FIGS. 5A and 5B, the support faces 2f of the holding portion 2a are tilted about the direction of the driving member 3 parallel to the support shaft 5, and the width w4 between the support faces 2f and 2f becomes smaller as it gets closer to the bottom 2g of the holding portion 2a from the rotor 4. The width w4' between the support faces 2f and 2f at a position closer to the rotor 4 than the bottom 2g becomes smaller than the width w5 of the base portion 3b of the driving member 3 and a pair of first piezoelectric elements 6.

Accordingly, when the base portion 3b of the driving member 3 and the first piezoelectric elements 6 and 6 interposing the base portion therebetween are inserted to the bottom 2g of the holding portion 2a from the side of the rotor 4 in the direction parallel to the support shaft 5, the base portion 3b and the first piezoelectric elements 6 middle in the support faces 2f are interposed between and supported by the support faces 2f in the width w4 direction. Accordingly, it is possible to position the driving member 3 in the direction parallel to the support shaft 5. Since the support faces 2f do not regulate the driving of the driving member 3 toward the rotor 4, the driving member 3 can be kept movable toward the rotor 4.

The side surfaces 3c of the base portion 3b of the driving member 3 facing the support faces 2f are tilted similarly to the support faces 2f and are substantially parallel to the support faces 2f. Accordingly, when the base portion 3b of the driving member 3 and the first piezoelectric elements 6 and 6 interposing the base portion 3b therebetween are inserted toward the bottom 2g of the holding portion 2a in the direction parallel to the support shaft 5 from the rotor 4, it is possible to bring the first piezoelectric elements 6 into contact with the support faces 2f of the holding portion 2a without any gap and to closely press the first piezoelectric elements 6 on the support faces 2f. As a result, it is possible to suppress the vibration of the base portion 3b of the driving member 3 in the width w3 direction.

Sine the tilt angle α of the support faces 2f about the direction parallel to the support shaft 5 is in the range of 2° to 6°, the positioning error of the driving member 3 in the direction parallel to the support shaft 5 can be limited to a margin of error. Here, when the tilt angle α is smaller than 2°, the positioning precision is lowered and it is difficult to form the support faces. When the tilt angle α is greater than 6°, the driving of the driving member 3 in the direction parallel to the support shaft 5 is detrimentally influenced. In this embodiment, by setting the tilt angle α to 4°, it is possible to improve the positioning precision, the formation ability, and the driving ability.

At a neutral position where the driving member 3 is positioned by the support faces 2f of the holding portion 2a, the bottom surface 3d of the base portion 3b of the driving member 3 and the bottom 2g of the holding portion 2a are separated from each other in the direction, which is the driving direction of the base portion 3b of the driving member 3, parallel to the support shaft 5. Therefore, it is possible to drive the driving member 3 from the neutral position to the base member 2. In this embodiment, even when the driving member 3 is driven from the neutral position to the base member 2, the bottom surface 3d of the base portion 3b and the bottom 2g of the holding portion 2a are separated from each other. Therefore, when the driving member 3 is driven toward the base member 2, it is possible to prevent the bottom surface 3d of the base portion 3b from colliding with the bottom 2g of the holding portion 2a, thereby preventing the collision from detrimentally influencing the driving of the driving member 3.

The driving member 3 includes the tip portion 3a supporting and driving the rotor 4 in the rotation direction R and the base portion 3b held by the holding portion 2a of the base member 2 in the state where it is interposed between a pair of first piezoelectric elements 6. The driving member 3 includes the second piezoelectric element 7 driving the tip portion 3a in the width w3 direction of the holding portion 2a and the driving member 3 along the rotation direction R of the rotor 4 between the tip portion 3a and the base portion 3b.

Accordingly, by driving the driving member 3 in the width w3 direction, a frictional force in the tangential direction of the rotation direction R acts between the bottom surface of the rotor 4 and the tip portion 3a of the driving member 3, whereby it is possible to drive the rotor 4 in the rotation direction R. It is also possible to independently control the first piezoelectric elements 6 and the second piezoelectric elements 7. Accordingly, it is possible to independently control the driving of the tip portion 3a of the driving member 3 in the direction parallel to the support shaft 5 and the driving in the rotation direction R of the rotor 4.

By simultaneously activating the first piezoelectric elements 6 and the second piezoelectric elements 7, it is possible to simultaneously achieve the driving of the tip portions 3a of the driving member 3 in the direction parallel to the support shaft 5 and the driving in the direction along the rotation direction R of the rotor 4.

Therefore, as shown in FIGS. 9 to 11, when the rotor 4 and the tip portions 3a are contacted with and separated from each other, the tip portions 3a of the driving members 3 can be made to move in the rotation direction R of the rotor 4 and the rotor 4 can be handed over from the driving members 31 of the first group to the driving members 32 of the second group without interfering with the rotation of the rotor 4.

Two groups of the first group and the second group are provided, each group of which includes three sets of the driving member 3 and two pairs of first piezoelectric elements 6 and 6 interposing the driving member 3 and the base portion 3b thereof. Therefore, it is possible to drive the groups at different times. It is also possible to support the rotor 4 at three points by the use of the tip portions 31a and 32a of the driving members 31 and 32 of the groups. Therefore, it is possible to stably support the rotor 4, compared with the case where the rotor is supported at two points or four or more points.

The driving members 31 and 32 of the groups are arranged uniformly in the rotation direction R of the rotor 4. The driving members 31 and the 32 of the first group and the second group are alternately sequentially arranged in the rotation direction R. Therefore, it is possible to support the rotor 4 through the use of the driving members 31 and 32 of the groups with a good balance and thus to efficiently drive the rotor in the rotation direction R.

The direction in which the tip portion 3a of each driving member 3 is driven is the same as the direction in which the base portion 3b of the driving member 3 is interposed between the first piezoelectric elements 6 and the support faces 2f of the holding portion 2a. Therefore, when the tip portions 3a of the driving members 3 perform a feed driving operation and a return driving operation, it is possible to support the base portion 3b of the driving member 3 from the front and rear sides in the driving direction. As a result, it is possible to suppress the departure of the driving member 3 from the direction parallel to the support shaft 5, thereby preventing the detrimental influence on the driving of the rotor 4.

By allowing the power supply unit 10 to supply the voltages having a phase difference to the driving members 31 and 32 of the first group and the second group, it is possible to drive the rotor 4 through the use of the driving members 31 and 32 of the groups.

By setting the phase difference between the voltages to be supplied to the first piezoelectric elements 6 and the second piezoelectric elements 7 of the groups from the power supply unit 10 to 180°, it is possible to drive the rotor 4 alternately and sequentially through the use of the driving members 31 of the first group and the driving members 32 of the second group.

By allowing the power supply unit 10 to supply the voltages to the first piezoelectric elements 6 and the second piezoelectric elements 7 of the groups so that the tip portions 3a of the driving members 3 sequentially and repeatedly perform the contact with the rotor 4, the feed in the width w3 direction of the driving members 3, the separation from the rotor 4, and the return in the width w3 direction of the driving members 3, it is possible to continuously rotationally drive the rotor 4.

As can be seen in Phases 3, 7, and 14 of FIG. 8, the power supply unit 10 causes the voltage supplied to the first terminal T1 and the voltage supplied to the second terminal T2 to overlap with each other. Accordingly, it is possible to continuously and smoothly perform the handover of the rotor 4 from the driving members 31 of the first group to the driving members 32 of the second group.

As shown in FIG. 8, the power supply unit 10 sets the increasing rates (slopes) of the voltages to be supplied to the third terminal T3 and the fourth terminal T4 when driving the tip portions 3a of the driving members 3 to perform the feeding operation in the width w3 direction and the decreasing rates (slopes) of the voltages when driving the tip portions to perform the returning operation to be different from each other. For example, at the third terminal T3, the voltage is made to increase by 1.0 V in the respective phases of Phase 2 to Phase 8 in which the tip portions 3a are driven to perform the feeding operation, and the voltage is made to decrease by 3.0 V in the respective phases of Phase 9 to Phase 10 in which the tip portions 3a are driven to perform the returning operation. Accordingly, the feeding operation time of the tip portions 3a of the driving members 3 can be set to be longer than the returning operation time, thereby elongating the contact time between the tip portions 3a of the driving members 3 and the rotor 4. Therefore, it is possible to more efficiently transmit the power of the driving members 3 to the rotor 4.

The frequencies of the voltages supplied to the first piezoelectric elements 6 and the second piezoelectric elements 7 from the power supply unit 10 are substantially equal to the frequency of the resonant vibration of the supporting and driving section 1a constituted by the first piezoelectric element 6, the second piezoelectric elements 7, the driving members 3, and the base member 2. Accordingly, the amplitudes of the feed driving of the rotor 4 through the use of the tip portions 3a of the driving members 3 and the returning driving can be made to be greater. The frequency of the resonant vibration of the supporting and driving section 1a can be adjusted by appropriately selecting the materials of the base member 2, the piezoelectric elements, and the tip portions 3a and the base portions 3b of the driving members 3.

In this embodiment, as shown in FIG. 8, the period of the voltages supplied to the first piezoelectric elements 61 and 62 of the driving members 31 and 32 of the groups from the first terminal T1 and the second terminal T2 are equal to the period of the voltages supplied to the second piezoelectric elements 71 and 72 of the groups from the third terminal T3 and the fourth terminal T4. Therefore, the frequency of the driving of the driving members 31 and 32 in the direction parallel to the support shaft 5 is equal to the frequency of the driving of the tip portions 31a and 32a in two directions of the widths w31 and w32 of the driving members 31 and 32. Accordingly, the amplitude of the driving members 31 and 32 in the direction parallel to the support shaft 5 and the amplitude of the tip portions 31a and 32a in two directions of the widths w31 and w32 of the driving members 31 and 32 can be set to the maximum amplitude.

The tip portion 3a of each driving member 3 is formed in a tapered shape so that the sectional area along the rotation direction R of the rotor 4 becomes smaller as it gets closer to the rotor 4. Therefore, compared with the case where the tip portion 3a is formed in a rectangular parallelepiped shape, it is possible to reduce the contact area between the tip portion 3a and the rotor 4 and to reduce the volume variation of the tip portion 3a due to the abrasion of the tip portion 3a. Accordingly, it is possible to reduce the weight variation of the tip portion 3a due to the abrasion of the tip portion 3a and to reduce the variation in resonance frequency of the driving member 3. By forming the tip portion 3a in the hexagonal prism shape, it is possible to raise the rigidity of the tip portion 3a, compared with other shapes.

The groove 2d is formed in the side surface 2c of the base member 2 substantially parallel to the support shaft 5 and substantially perpendicular to the width w3 direction of the driving members 3. That is, the groove 2d is formed to substantially perpendicularly intersect the vibration transmitted in the base member 2 in the direction substantially parallel to the support shaft 5. Accordingly, it is possible to absorb the vibration through the use of the groove 2d and thus to reduce the transmission of the vibration in the base member 2.

The first piezoelectric elements 6 are disposed between the rotor 4 and the groove 2d. Therefore, it is possible to reduce the vibration transmitted over the groove 2d from the side of the base member 2 opposite to the rotor 4.

The opposite end of the holding portion 2a, which holds the driving member 3, of the base member 2 is fixed to the mounting section 101a and the groove 2d is disposed at the position closer to the mounting section 101a than the driving members 3. Accordingly, even when the vibration of the mounting section 101a is transmitted to the base member 2, it is possible to reduce the vibration at the position relatively apart from the driving members 3 and thus to prevent the vibration of the mounting section 101a from detrimentally influencing the driving of the driving members 3.

The width w1 of the groove 2d in the direction parallel to the support shaft 5 is greater than the amplitude of the vibration of the base member 2. Accordingly, it is possible to prevent both sides of the base member 2 about the groove 2d from colliding with each other.

The width w1 of the groove 2d in the direction parallel to the support shaft 5 is greater than the amplitude of the resonant vibration of the supporting and driving section 1a constituted by the base member 2, the driving members 3, the first piezoelectric elements 6, and the second piezoelectric elements 7. Therefore, even when the supporting and driving section 1a vibrates in a resonant state, it is possible to prevent both sides of the base member 2 about the groove 2d from colliding with each other.

By setting the depth d1 of the groove 2d to the range of 40% to 80% of the radius of the base member 2, it is possible to satisfactorily guarantee the strength of the base member 2 and to satisfactorily suppress the transmission of the vibration.

Since the gap 2e is formed between the base member 2 and the support shaft 5, it is possible to reduce the vibration transmitted from the base member 2 of the support shaft 5. It is also possible to reduce the vibration transmitted from the support shaft 5 to the base member 2. Therefore, it is possible to prevent the driving of the driving members 3 and the rotor 4 from being detrimentally influenced.

An example of a lens barrel and a camera including the driving mechanism 1 according to this embodiment will be described below. An interchangeable lens according to this example forms a camera system along with a camera body. The interchangeable lens can be switched between an AF (Auto Focus) mode in which a focusing operation is performed under a known AF control and an MF (Manual Focus) mode in which the focusing operation is performed in response to a manual input from a photographer.

Figure 13:
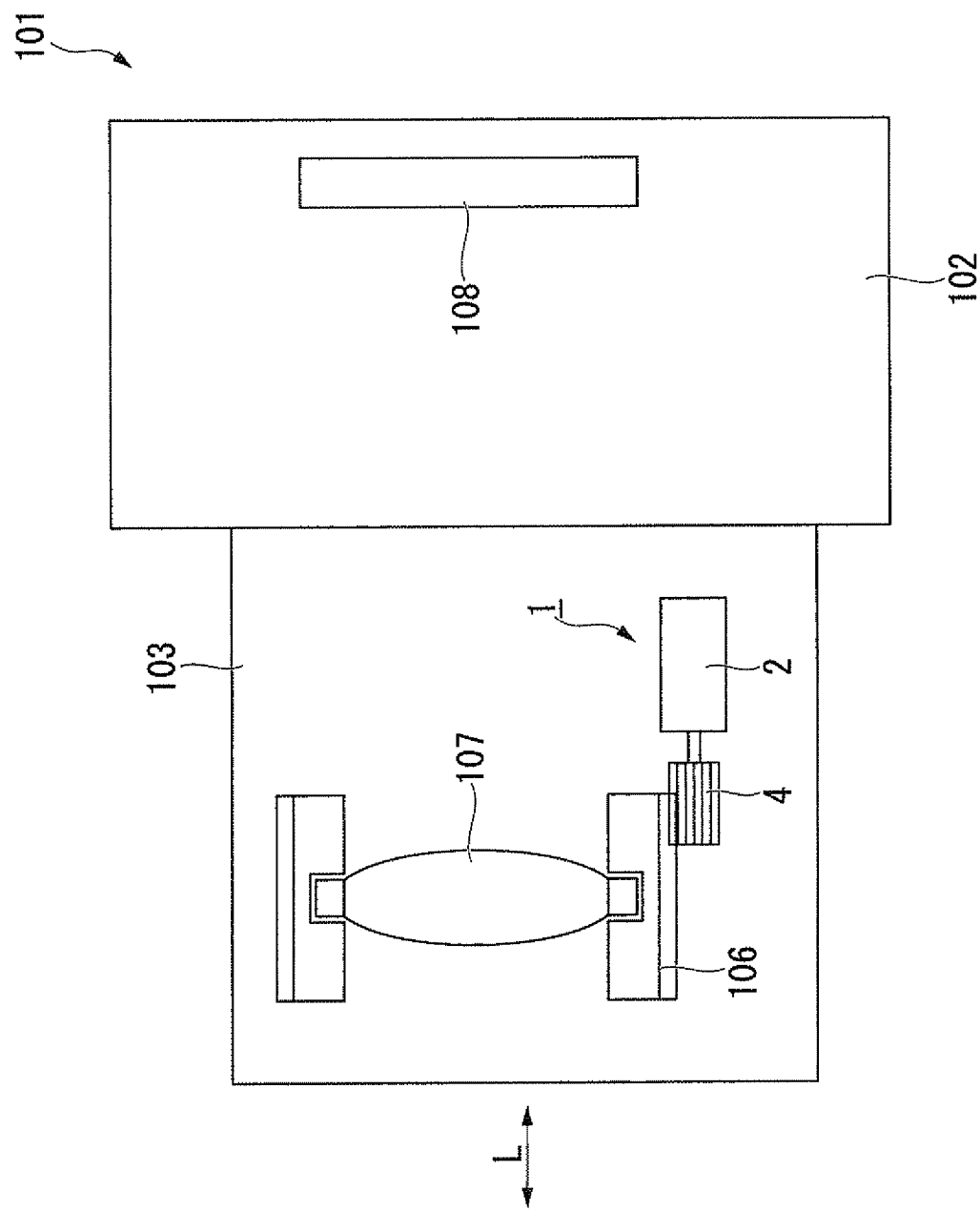
FIG. 13 is a diagram schematically illustrating the configuration of a camera having the driving mechanism shown in FIG. 1.

FIG. 13 is a diagram schematically illustrating the configurations of a camera 101 according to this embodiment.

As shown in FIG. 13, the camera 101 includes a camera body 102 having an imaging device 108 built therein and a lens barrel 103 having a lens 107.

The lens barrel 103 is an interchangeable lens that can be attached to and detached from the camera body 102. The lens barrel 103 includes the lens 107, a cam box 106, and the driving mechanism 1. The driving mechanism 1 is used as a drive source driving the lens 107 in the focusing operation of the camera 101. The driving force acquired from the rotor 4 of the driving mechanism 1 is transmitted directly to the cam box 106. The lens 107 is held in the cam box 106 and is a focusing lens that moves substantially in parallel to the optical axis direction L to adjust the focus through the use of the driving force of the driving mechanism 1.

When using the camera 101, a subject image is formed on the imaging plane of the imaging device 108 through the use of a lens group (including the lens 107) disposed in the lens barrel 103. The formed subject image is converted into an electrical signal by the imaging device 108 and image data is acquired by A/D converting the electric signal.

As described above, the camera 101 and the lens barrel 103 according to this embodiment include the driving mechanism 1 according to this embodiment. Accordingly, it is possible to cause the rotor 4 to more stably rotate and thus to directly drive the cam box 106 by the use of the driving mechanism 1 with an enhanced output. Therefore, it is possible to reduce the energy loss and to save the energy. It is also possible to reduce the number of components.

Although it has been stated in this embodiment that the lens barrel 103 is an interchangeable lens, the invention is not limited to this example and the lens barrel may be incorporated into a camera body.

The invention is not limited to the above-mentioned embodiment but may be modified in various forms without departing from the concept of the invention. For example, the electrode portion of the first piezoelectric element may not be incorporated into the first piezoelectric element. That is, the electrode portion may be separated from the first piezoelectric element and the electrode portion and the first piezoelectric element may be bonded to each other when holding the driving member into the holding portion. The electrode portion may include an ear piece-like (tab-like) exposed portion exposed from the base member by protruding from the base member. When the driving member is held by the holding portion in the state where the first piezoelectric elements are bonded to the side surfaces of the driving member, the size of the first piezoelectric elements, the size of the electrode portion, and the bonding position may be adjusted in advance so that the electrode portion protrudes from the end surface of the base member facing the rotor or the side surface of the base member, and the part in which the electrode portion protrudes from the base member to be exposed therefrom may be used as the exposed portion.

The exposing portion for exposing the exposed portion of the electrode portion is not limited to the chamfered portion described in the above-mentioned embodiment. For example, when the exposing portion is formed at the corner of the end of the base member similarly to the chamfered portion, a chamfered portion, a notch, or a recess may be formed only at the corner of both sides of the holding portion to expose the exposed portion. When the exposing portion is formed at the end of the base member facing the rotor, a groove-like chamfered portion, a notch, or a recess may be formed between the corner of the outer circumference and the corner of the inner circumference. A chamfered portion, a notch, or a recess may be formed in the side surface of the base member between the end of the base member facing the rotor and the bottom of the holding portion to expose the exposed portion.

Although it has been stated in the above-mentioned embodiment that a conductive adhesive is used as the conductive material electrically connecting the exposed portion of the electrode portion to the electrode face, the conductive material is not limited to the conductive adhesive. Other conductive materials such as a conductive paste, a solder, and a brazing filler metal may be used.

Although it base been stated in the above-mentioned embodiment that the first piezoelectric elements and the second piezoelectric elements are deformed in the thickness-shear vibration mode, the piezoelectric element may be deformed in the thickness direction. In this case, the driving member is made to move in the width direction (the first direction) of the holding portion by the first piezoelectric elements and the tip portion of the driving member is made to move in the direction (the second direction) parallel to the rotation axis by the second piezoelectric elements.

As long as it is formed to surround the support shaft, the base member may be divided into plural parts or may not completely surround the support shaft. For example, the base member may be disposed in only a half of the circumference surrounding the support shaft or may be disposed to interpose the support shaft from both sides.

Although it has been stated in the above-mentioned embodiment that a pair of first piezoelectric elements driving the driving member in the direction parallel to the support shaft are provided to interpose the driving member, the first piezoelectric element may be disposed on only one side surface of the driving member. A piezoelectric element that is deformed in the thickness direction may be used as the first piezoelectric element and the first piezoelectric element may be disposed between the bottom of the holding portion of the base member and the bottom surface of the driving member. In this case, the base portion is directly supported by the support faces of the holding portion formed in the base member without the piezoelectric element being interposed therebetween from both sides in the width direction of the holding portion parallel to the rotation direction of the rotor. The support faces may be made to serve as a guide portion holding the base portion so as to be slidable in the direction parallel to the support shaft.

Although it has been stated in the above-mentioned embodiment that two groups of driving members each having the first piezoelectric elements and the second piezoelectric elements are provided, the number of groups of the driving members may be three or more. The number of driving members of each group may be one, two, four, or more. For example, in the above-mentioned embodiment, three groups of driving members each including two driving members disposed in the diagonal of the base member as a group may be constituted. In this case, the phase difference between the voltages of the groups may be set, for example, to 120 degrees. Accordingly, it is possible to always support and cause the rotor to rotate through the use of two groups of driving members. The phase difference between the voltages of the groups of driving members may be set to a value (that is, 180 degrees in case of two groups and 120 degrees in case of three groups) obtained by dividing 360 degrees by the number of groups.

Although it has been stated in the above-mentioned embodiment that the direction (the first direction) in which the first piezoelectric elements interpose the base portion of the driving member and the direction (the third direction) in which the tip portion of the driving member is driven by the second piezoelectric elements are equal to each other, the directions may be different from each other. For example, by setting the third direction to the direction intersecting the width w3 direction of the driving member and parallel to the rotation direction, the rotor may be made to easily rotate.

Figure 14A:
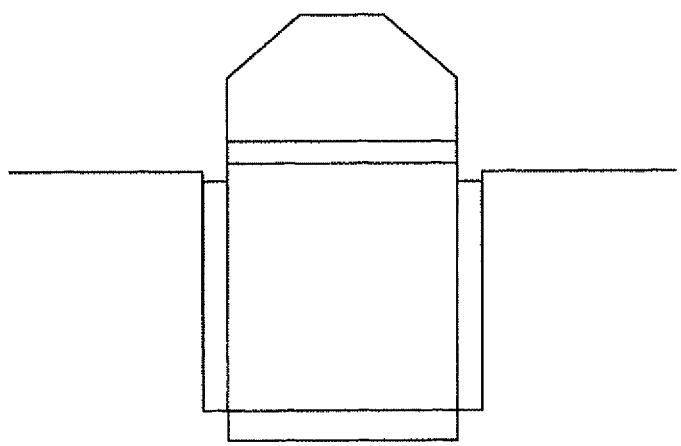
FIG. 14A is a front view illustrating a holding portion and a driving member in a modification of the driving mechanism shown in FIG. 1.
Figure 14B:
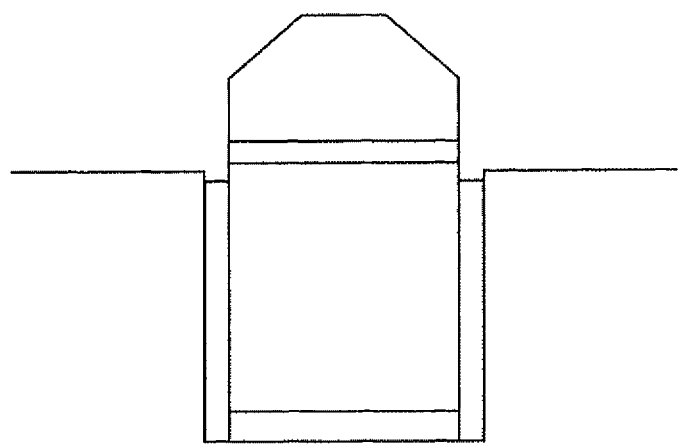
FIG. 14B is a front view illustrating a holding portion and a driving member in a modification of the driving mechanism shown in FIG. 1.

The support faces of the base member may not be tilted about the direction (the second direction) parallel to the support shaft. For example, as shown in FIG. 14A, a protrusion-like locking portion locking an end of the first piezoelectric element facing the bottom of the holding portion may be disposed in the holding portion. As shown in FIG. 14B, the positioning may be carried out by causing the end of the first piezoelectric element facing the bottom of the holding portion to protrude from the bottom surface of the base portion and to serve as a positioning portion and causing the positioning portion to collide with the bottom of the holding portion.

The gap between the base member and the support shaft may be formed up to the edge of the groove facing the holding portion, in view of the rigidity of the base member.

The voltages supplied to the first piezoelectric elements and the second piezoelectric elements from the terminals of the power supply unit may be a sinusoidal wave or a sinusoidal voltage waveform.

An example where two groups of the first group and the second group of driving members are provided similarly to the above-mentioned embodiment, the phase difference between the sinusoidal voltage waveforms generated at the first terminal and the second terminal of the power supply unit is 180°, and the phase difference between the sinusoidal voltage waveforms generated at the third terminal and the fourth terminal is 180° will be described below with reference to FIG. 15.

Figure 15:
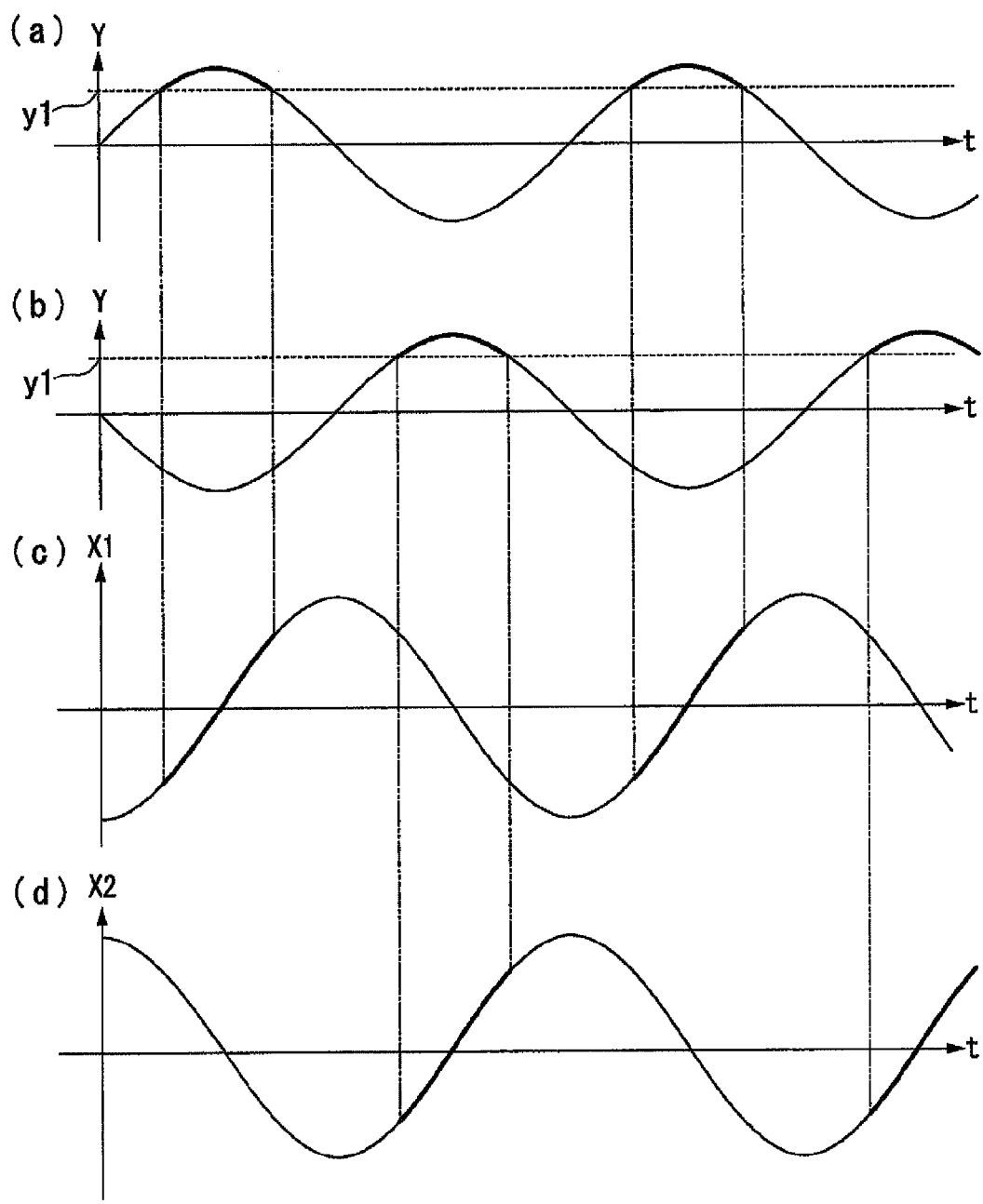
FIG. 15 is a graph illustrating a temporal variation in displacement of a tip portion of a driving member of the driving mechanism shown in FIG. 1.

Similarly to (a) to (d) of FIG. 12, (a) of FIG. 15 shows the displacement of the tip portions of the driving members of the first group in the Y direction. (b) of FIG. 15 shows the displacement of the driving members of the second group in the Y direction. (c) of FIG. 15 shows the displacement of the driving members of the first group in the X1 direction, (d) of FIG. 15 shows the displacement of the second group in the X2 direction (see FIGS. 9 to 11).

When the phase difference between the sinusoidal voltage waveforms generated at the first terminal and the second terminal of the power supply unit is 180°, the tip portions of the driving members of the first group and the second group driven in the Y axis direction draw sinusoidal waveform traces having a phase difference of 180° as shown in (a) and (b) of FIG. 15. At this time, the tip portions of the driving members of the first group come in contact with the rotor when the displacement in the Y axis direction goes over the contact position y1 as indicated by a thick line in (a) of FIG. 15 (see FIGS. 9 to 11). The tip portions of the driving members of the second group similarly come in contact with the rotor as indicated by a thick line in (b) of FIG. 15.

Here, the trace of the driving members of the first group shown in (a) of FIG. 15 and the trace of the driving members of the second group shown in (b) of FIG. 15 have a phase difference of 180°. Accordingly, the tip portions of the driving members of the first group and the tip portions of the driving members of the second group alternately come in contact with the rotor to support the rotor (see FIGS. 9 to 11). At this time, similarly to the above-mentioned embodiment, there is a period of time in which the tip portions of the driving members of both groups are separated from the rotor. However, similarly to the above-mentioned embodiment, the rotor is not deformed in the Y direction in the meantime due to the inertia thereof.

Similarly, when the phase difference between the sinusoidal voltage waveforms generated at the third terminal and the fourth terminal of the power supply unit is 180°, the tip portions of the driving members of the first group and the second group driving the rotor in the X1 axis direction and the X2 axis direction draw sinusoidal wave traces as shown in (c) and (d) of FIG. 15 (see FIGS. 9 to 11).

Here, as shown in (c) of FIG. 15, the tip portions of the driving members of the first group move in the positive X1 axis direction parallel to the rotation direction of the rotor in the meantime (between the thick lines in (a) of FIG. 15) in which the tip portions are in contact with the rotor (see FIGS. 9 to 11). As indicated by a thick line in (d) of FIG. 15, the tip portions of the driving members of the second group similarly move in the positive X2 axis direction parallel to the rotation direction of the rotor in the meantime (between the thick lines in (b) of FIG. 15) in which the tip portions are in contact with the rotor.

Therefore, similarly to the above-mentioned embodiment, the rotor is alternately driven in the rotation direction by the driving members of the first group and the driving members of the second group (see FIGS. 9 to 11).

An example where three groups of a first group to a third group of driving members are provided and sinusoidal waves or a sinusoidal voltage waveforms having a phase difference of 120° are generated at the terminals of the power supply unit will be described below with reference to FIG. 16. In this case, a fifth terminal and a sixth terminal used for supplying voltages to the first piezoelectric elements and the second piezoelectric elements of the driving members of the third group are provided in addition to the first to fourth terminals. Similarly to the X1 direction of the driving members of the first group and the X2 direction of the driving members of the second group (see FIGS. 9 to 11), the width direction of the driving members of the third group (the width direction of the holding portions) perpendicular to the support shaft and parallel to the rotation direction of the rotor is defined as an X3 direction.

Figure 16:
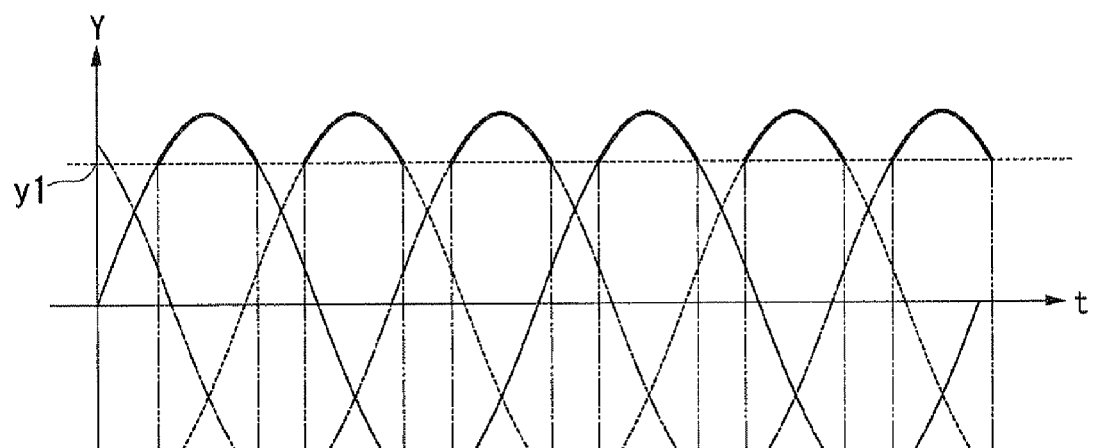
FIG. 16 is a graph illustrating a temporal variation in displacement of a tip portion of a driving member of the driving mechanism shown in FIG. 1.
Figure 16:
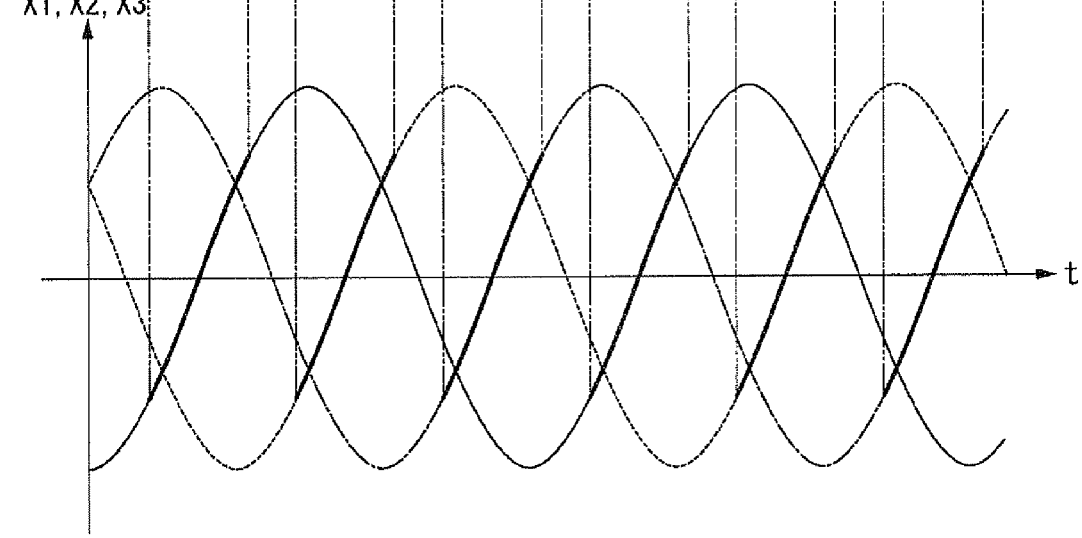

(a) of FIG. 16 shows the displacements of the tip portions of the driving members of the first to third groups in the Y direction. (b) of FIG. 16 shows the displacements of the tip portions of the driving members of the first to third groups in the X1 to X3 directions. In (a) and (b) of FIG. 16, the trace of the tip portions of the driving members of the first group is indicated by a solid line, the trace of the tip portions of the driving members of the second group is indicated by a dotted line, and the trace of the driving members of the third group is indicated by a one-dot chained line.

When the voltage waveforms supplied to the first piezoelectric elements of the groups from the power supply unit have a phase difference of 120°, the tip portions of the driving members of the groups driven in the Y axis direction draw sinusoidal waveform traces having a phase difference of 120° as shown in (a) of FIG. 16. At this time, the tip portions of the driving members of the groups come in contact with the rotor when the displacement in the Y axis direction goes over the contact position y1 as indicated by a thick line in (a) of FIG. 16 (see FIGS. 9 to 11).

Here, the traces of the driving members of the groups shown in (a) of FIG. 16 have a phase difference of 120°. Accordingly, the tip portions of the driving members of the groups sequentially come in contact with the rotor to support the rotor (see FIGS. 9 to 11). At this time, similarly to the above-mentioned embodiment, there is a period of time in which the tip portions of the driving members of the groups are separated from the rotor. However, similarly to the above-mentioned embodiment, the rotor is hardly deformed in the Y axis direction due to the inertia thereof.

Similarly, when the voltage waveforms supplied to the second piezoelectric elements of the groups from the power supply unit have a phase difference of 120°, the tip portions of the driving members of the groups driven in the X1 to X3 directions draw sinusoidal waveform traces as shown in (b) of FIG. 15 (see FIGS. 9 to 11).

Here, as indicated by a thick line in (b) of FIG. 16, the tip portions of the driving members of the groups move in the positive X1 to X3 directions parallel to the rotation direction of the rotor in the meantime (between the thick lines shown in (a) of FIG. 16) in which the tip portions are in contact with the rotor (see FIGS. 9 to 11).

Therefore, similarly to the above-mentioned embodiment, the rotor is driven in the rotation direction sequentially through the use of the driving members of the groups (see FIGS. 9 to 11).

(2) Second Embodiment

Hereinafter, a driving mechanism according to a second embodiment of the invention will be described with reference to the accompanying drawings. A driving mechanism 201 according to this embodiment performs a relative driving operation of displacing a second member such as a rotor and a first member such as a driving member relative to each other to drive an optical device or an electronic device such as a lens barrel of a camera.

Figure 17:
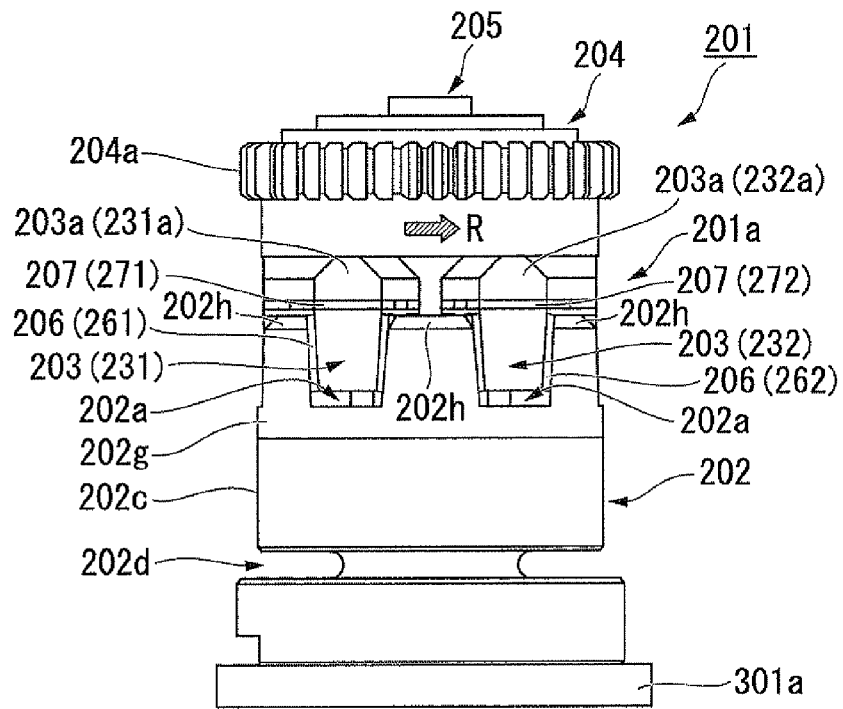
FIG. 17 is a front view illustrating a driving mechanism according to a second embodiment of the invention.
Figure 18:
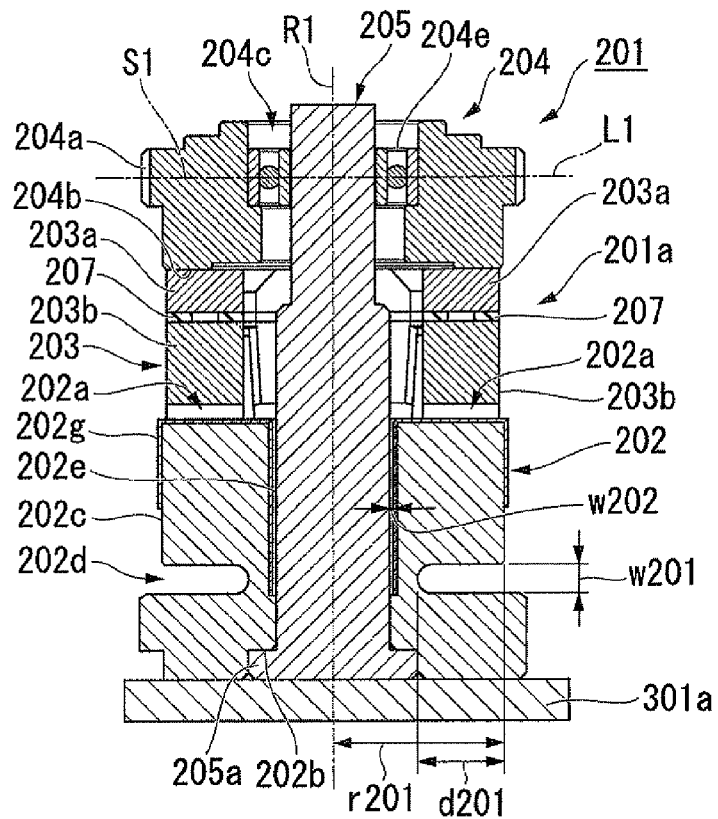
FIG. 18 is a sectional view of the driving mechanism.

FIG. 17 is a front view of the driving mechanism 201 according to this embodiment and FIG. 18 is a sectional view thereof.

As shown in FIGS. 17 and 18, the driving mechanism 201 includes a base member (the base member) 202 having plural holding portions 202a formed therein, driving members (the first member) 203 held in the respective holding portions 202a, a rotor (the second member) 204 disposed adjacent to the driving members 203, and a support shaft 205 inserted into the base member 202.

A gear 204a used for driving a camera lens barrel or the like is formed on the outer circumferential surface of the rotor 204. The supporting surface 204b of the rotor 204 facing the base member 202 is supported by plural driving members 203. The rotor 204 is axially supported by the support shaft 205 with a bearing assembly 204c having bearings 204e interposed therebetween and is disposed to be rotatable about the support shaft 205. That is, the support shaft 205 is disposed along the rotation axis R1 of the rotor 204.

The base member 202 is a conductive elastic body, is formed in a hollow cylindrical shape out of a metal material such as stainless steel, and surrounds the support shaft 205 by inserting the support shaft 205 therethrough. An end of the base member 202 is fixed to a mounting section 301a, for example, by the use of bolts not shown in the drawings. A concave portion 202b is formed at the center of the surface of the base member 202 facing the mounting section 301a. A large-diameter portion 205a formed at the base end of the support shaft 205 is inserted into the concave portion 202b. The support shaft 205 is fixed to the base member 202 and the mounting section 301a by fixing the base member 202 to the mounting section 301a in this state.

Plural holding portions 202a having a concave shape are disposed at an end of the base member 202 in the circumferential direction of the base member 202, that is, in the rotation direction R of the rotor 204. Each holding portion 202a supports the corresponding driving member 203 from both sides in the direction (the first direction) perpendicular to the support shaft 205 and parallel to the rotation direction R of the rotor 204 and holds the corresponding driving member 203 so as to drive the driving member in the direction (the second direction) parallel to the support shaft 205. As shown in FIG. 17, chamfred portions (exposing portions) 202h are formed at the formed at the corners of the base member 202 close to the rotor 204. The chamfred potions 202h are formed over the entire circumference of the base member 202 at both the outer circumferential corners and the inner circumferential corners of the end of the base member 202 close to the rotor 204.

As shown in FIG. 18, the side surface 202c of the base member 202 is disposed to be substantially parallel to the support shaft 205. A groove 202d as a vibration-suppressing portion suppressing the transmission of the vibration from the mounting section 301a to the holding portions 202a is formed in the side surface 202c between the holding portions 202a and an end of the mounting section 301a. That is, the groove 202d is disposed in the side surface 202c of the base member 202 so as to intersect the direction (the first direction) parallel to the rotation direction R of the rotor 204 and substantially perpendicular to the support shaft 205. The groove 202d is continuously formed in the circumferential direction of the base member 202 and is located at a position closer to the end of the mounting section 301a than the middle between the holding portions 202a and the end of the mounting section 301a.

The depth d201 of the groove 202d is, for example, in the range of 40% to 80% of the radius r201 of the base member 202. This numerical range is only an example and the invention is not limited to the range. The depth d201 of the groove 202d can be set, for example, to 10%, 20%, 30%, 40%, 50%, 60%, 70%, 80%, or 90% of the radius r201 of the base member 202. The width w201 of the groove 202d in the direction (the second direction) parallel to the support shaft 205 is set to be greater than the amplitude of the vibration of the base member 202 and greater than the amplitude of the resonant vibration of a supporting and driving section (structure) 201a, which is described later, including the first piezoelectric elements 206, the second piezoelectric elements (the second piezoelectric elements) 207, the driving members 203, and the base member 202. For example, the width w201 of the groove 202d can be set to be smaller than the radius of the base member 202.

As shown in FIG. 18, a gap (vibration-suppressing portion) 202e serving to suppress the vibration from the mounting section 301a to the holding portions 202a is formed between the base member 202 and the support shaft 205. The gap 202e is formed from the end of the base member 202 close to the holding portions 202a to the same position as the edge of the groove 202d close to the mounting section 301a in the direction parallel to the support shaft 205. The width w202 of the gap 202e is set to be greater than the amplitude of the vibration of the base member 202 and greater than the amplitude of the resonant vibration of the supporting and driving section 201a to be described later, similarly to the width w201 of the groove 202d.

An insulating film 202g is formed on the surface of the base member 202 as insulating treatment. The insulating film 202g is formed by applying an insulating material such as acryls or epoxys to the surface of the base member 202. The insulating film 202g is continuously formed on the side surface of the base member 202 facing the driving members 203 from the groove 202d, the holding portions 202a, and the surface facing the gap 202e. The insulation resistance value of the base member 202 in which the insulating film 202g is formed is about several MΩ in terms of a creepage value of insulation.

The insulating film 202g has a high hardness of 2H or higher in pencil hardness and hardly has a damper component. For example, the withstanding voltage of the insulating film 202g is preferably equal to or higher than about 200 VDC. The thickness of the insulating film 202g is preferably as small as possible, as long as the above-mentioned withstanding voltage can be maintained. Preferably, the thickness is in the range of about 10 μm to 20 μm. The deviation of the thickness is set to be equal to or less than an average thickness±50% and preferably to be equal to or less than an average thickness±30%.

In this embodiment, the insulating film 202g is formed of, for example, an insulating material including a silica composition and has a hardness of 311 or higher, a thickness of about 15 μm±3 μm, and a withstanding voltage of about 270 VDC.

Figure 19:
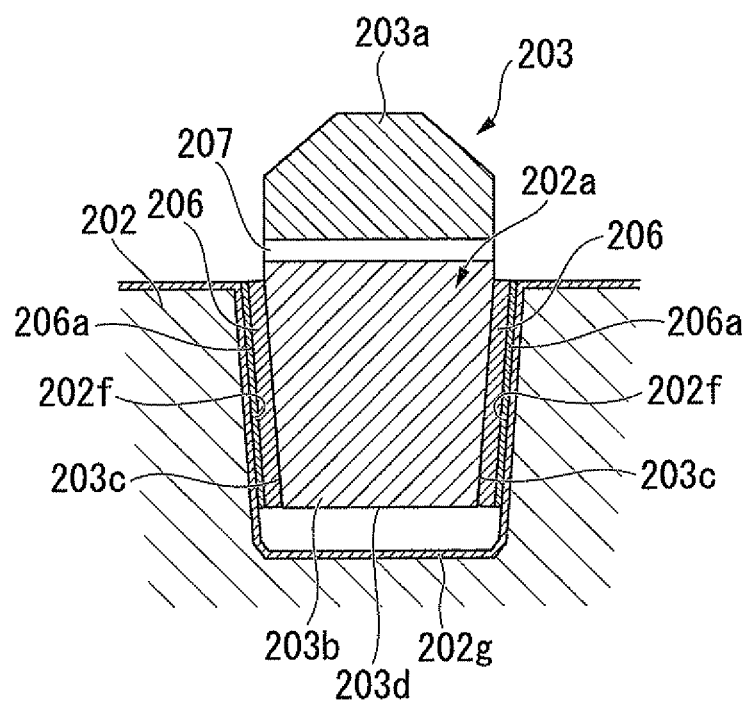
FIG. 19 is an enlarged sectional view illustrating a driving member and a base member of the driving mechanism shown in FIG. 17.

FIG. 19 is an enlarged sectional view of a driving member 203 and a holding portion 202a in a section parallel to the support shaft 205 and taken along the rotation direction R of the rotor 204.

As shown in FIG. 19, the insulating film 202g is formed on the entire holding portion 202a including the support faces 202f and 202f supporting the driving member 203 with a uniform thickness. The first piezoelectric elements 206 are fixed to the side surface 203c of the driving member 203 and the support faces 202f of the holding portion 202a having the insulating film 202g formed thereon with a conductive adhesive.

An adhesive including the same type of material as the insulating film 202g is preferably used as the adhesive used for adhering the first piezoelectric elements 206 to the insulating film 202g. For example, when the insulating film 202g is formed of an acryl material, an adhesive including the acryl material is used. When the insulating film 202g is formed of an epoxy material, an adhesive including the epoxy material is used.

In this embodiment, the insulating film 202g is disposed between all the first piezoelectric elements 206 and the base member 202. The surface of the first piezoelectric element 206 in contact with the insulating film 202g is provided with an electrode portion 206a.

Figure 20A:
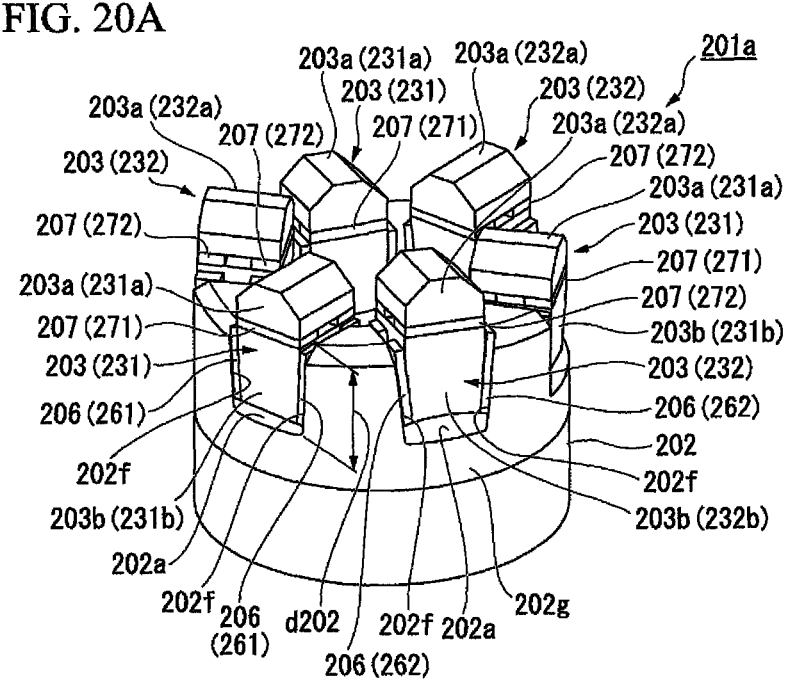
FIG. 20A is a perspective view illustrating a supporting and driving section of the driving mechanism shown in FIG. 17.
Figure 20B:
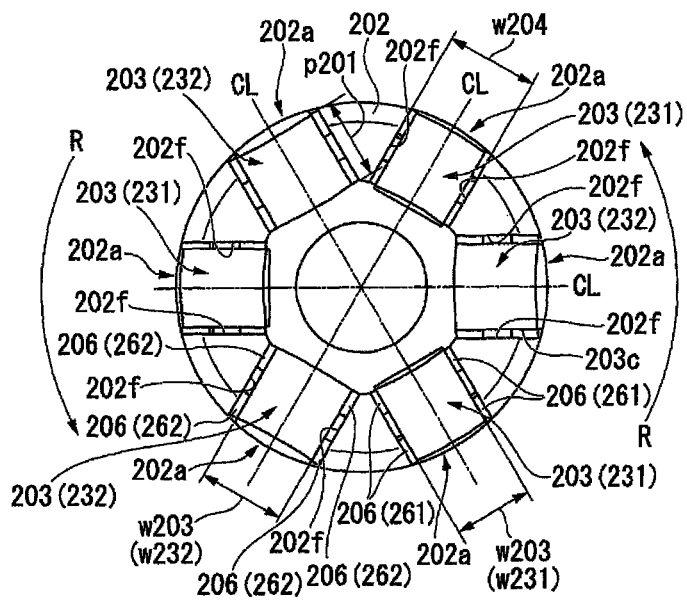
FIG. 20B is a plan view illustrating the supporting and driving section of the driving mechanism shown in FIG. 17.

As shown in FIGS. 20A and 20B, each driving member 203 includes a tip portion 203a having a hexagonal prism shape with a mountain-like section, a base portion 203b having a substantially rectangular parallelepiped shape, and a bottom surface 203d. The tip portion 203a is formed of, for example, stainless steel. The base portion 203b is formed of, for example, light metal alloy. Both portions have conductivity. The base portion 203b is supported by the corresponding holding portion 202a so as to be driven in the direction parallel to the support shaft 205. The tip portion 203a protrudes from the corresponding holding portion 202a so as to support the rotor 204. The tip portion 203a has a tapered shape in which the area of the top surface coming in contact with the rotor 204 is smaller than the area of the bottom surface of the base portion 203b.

As shown in FIG. 20B, two pairs of first piezoelectric elements 206 and 206 of which each pair interposes the base portion 203b of the driving member 203 from both sides in the width w203 direction are disposed in the width w203 direction (the first direction) of the driving member 203. The width w203 direction of the driving member 203 is a direction perpendicular to the support shaft 205 and parallel to the rotation direction R of the rotor 204 and is a direction substantially perpendicular to the center lines CL of the base member 202 in a plan view. Each first piezoelectric element 206 is formed in a long and narrow rectangular shape extending in the depth d202 direction of the corresponding holding portion 202a and is interposed between the base portion 203b and the holding portion 202a. Accordingly, the first piezoelectric elements 206 are disposed between the groove 202d (see FIGS. 17 and 18) formed in the base member 202 and the rotor 204.

The first piezoelectric elements 206 are bonded to the base portion 203b of each driving member 203 and the corresponding holding portion 202a having the insulating film 202g formed thereon, for example, by the use of a conductive adhesive. Two first piezoelectric elements 206 and 206 arranged in the depth p201 direction of each driving member 203 substantially parallel to the center line CL passing through the center of the base member 202 are substantially parallel to each other. The shapes and sizes of the first piezoelectric elements 206 are substantially the same.

As shown in FIG. 20A, a pair of second piezoelectric elements 207 and 207 is disposed between the base portion 203b and the tip portion 203a of each driving member 203 so as to be substantially parallel to each other. Each second piezoelectric element 207 is formed in a long and narrow rectangular shape extending in the width w203 direction of the corresponding driving member 203. The second piezoelectric elements 207 are interposed between the bottom surface of the tip portion 203a and the top surface of the base portion 203b and are bonded to the bottom surface of the tip portion 203a and the top surface of the base portion 203b, for example, by the use of a conductive adhesive. The shapes and sizes of the second piezoelectric elements 207 are substantially the same.

The first piezoelectric elements 206 and the second piezoelectric elements 207 are formed of, for example, piezoelectric zirconate titanate (PZT) and the vibration mode thereof is a thickness-shear vibration mode. That is, the first piezoelectric elements 206 drive the corresponding driving member 203 relative to the base member 202 in the depth d202 direction of the holding portion 202a substantially parallel to the support shaft 205. The second piezoelectric elements 207 drive the tip portion 203a of the corresponding driving member 203 relative to the base portion 203b and the base member 202 in the width w203 (the third direction) of the driving member 203. That is, in this embodiment, the direction (the first direction) in which the first piezoelectric elements 206 interpose the corresponding driving member 203 and the direction (the third direction) in which the second piezoelectric elements 207 drive the tip portion 203a of the corresponding driving member 203 are substantially parallel to each other.

The first piezoelectric elements 206, the second piezoelectric elements 207, the driving members 203, and the base member 202 constitute the supporting and driving section 201a supporting the rotor 204 and driving the rotor 204 relative to the driving members 203 and the base member 202.

As shown in FIG. 20A, the holding portions 202a are formed at an end of the base member 202 so as to form a crown-like unevenness in the base member 202. As shown in FIG. 20B, the holding portions 202a are uniformly formed substantially every 60° in the circumferential direction of the base member 202. Each holding portion 202a has a pair of support faces 202f and 202f disposed substantially parallel to the center line CL passing through the center of the base member 202 in a plan view. The support faces 202f hold the base portion 203b of the corresponding driving member 203 so as to interpose the base portion from both ends in the width w204 direction (the first direction) of the holding portion 202a substantially perpendicular to the center line CL of the base member 202 with a pair of first piezoelectric elements 206 and 206 interposed therebetween.

In this embodiment, each driving member 203 includes a pair of second piezoelectric elements 207 and 207 between the tip portion 203a and the base portion 203b and includes two pairs of first piezoelectric elements 206 and 206 on the side faces of the base portion 203b. The driving mechanism 201 includes two groups of a first group and a second group, each group having three sets of a driving member 203 and two pairs of first piezoelectric elements 206. The driving members 231 of the first group and the driving members 232 of the second group are arranged in the same circumference. The driving members 231 and 232 of the respective groups are uniformly arranged in the rotation direction R of the rotor 204 and the driving members 231 and 232 of different groups are alternately (sequentially) arranged in the rotation direction R.

Figure 21A:
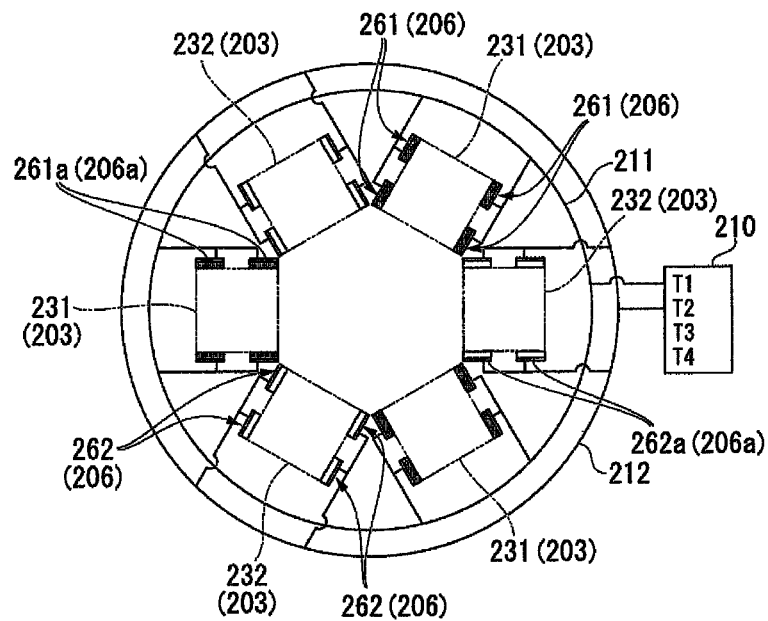
FIG. 21A is a circuit diagram illustrating the driving mechanism shown in FIG. 17.
Figure 21B:
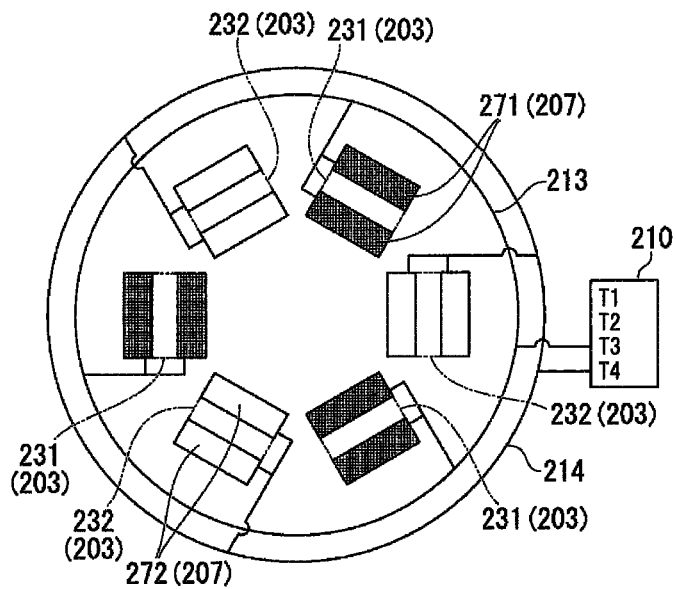
FIG. 21B is a circuit diagram of the driving mechanism shown in FIG. 17.

FIG. 21A is a schematic wired diagram of the first piezoelectric elements 206 and FIG. 21B is a schematic wired diagram of the second piezoelectric elements 207.

As shown in FIGS. 21A and 21B, the driving mechanism 201 according to this embodiment includes a power supply unit 210 supplying voltages to electrodes 206a of the first piezoelectric elements 206 and electrodes (not shown) of the second piezoelectric elements 207. The power supply unit 210 supplies the voltages to the first piezoelectric elements 206 and the second piezoelectric elements 207 so that the tip portions 231a and 232a of the driving members 231 and 232 of the first group and the second group shown in FIGS. 20A and 20B repeatedly perform the contact with the rotor 204 shown in FIGS. 17 and 18, the feed in the rotation direction R of the rotor 204, the separation from the rotor 204, and the return in the opposite direction of the rotation direction R of the rotor 204.

As shown in FIG. 21A, the first electrodes 261a of the first piezoelectric elements 261 of the driving members 231 of the first group are connected to a first terminal T1 of the power supply unit 210 via the first line 211. The first electrodes 262a of the first piezoelectric elements 262 of the driving members 232 of the second group are connected to a second terminal T2 of the power supply unit 210 via the second line 212.

As shown in FIG. 21B, the electrodes of the second piezoelectric elements 271 of the driving members 231 of the first group are connected to a third terminal T3 of the power supply unit 210 via the third line 213 connected to the tip portions 231a of the driving members 231. The electrodes of the second piezoelectric elements 272 of the driving members 232 of the second group are connected to a fourth terminal T4 of the power supply unit 210 via the fourth line 214 connected to the tip portions 232a of the driving members 232.

Although not shown in FIGS. 21A and 21B, the base portions 231b and 232b of the driving members 231 and 232 are grounded.

According to this configuration, a predetermined driving voltage for driving the first piezoelectric elements 206 is applied between the electrodes 206a of the first piezoelectric elements 206 and the base portions 203b of the driving members 203. A predetermined driving voltage for driving the second piezoelectric elements 207 is applied between the tip portions 203a and the base portions 203b of the driving members 203.

Figure 22:
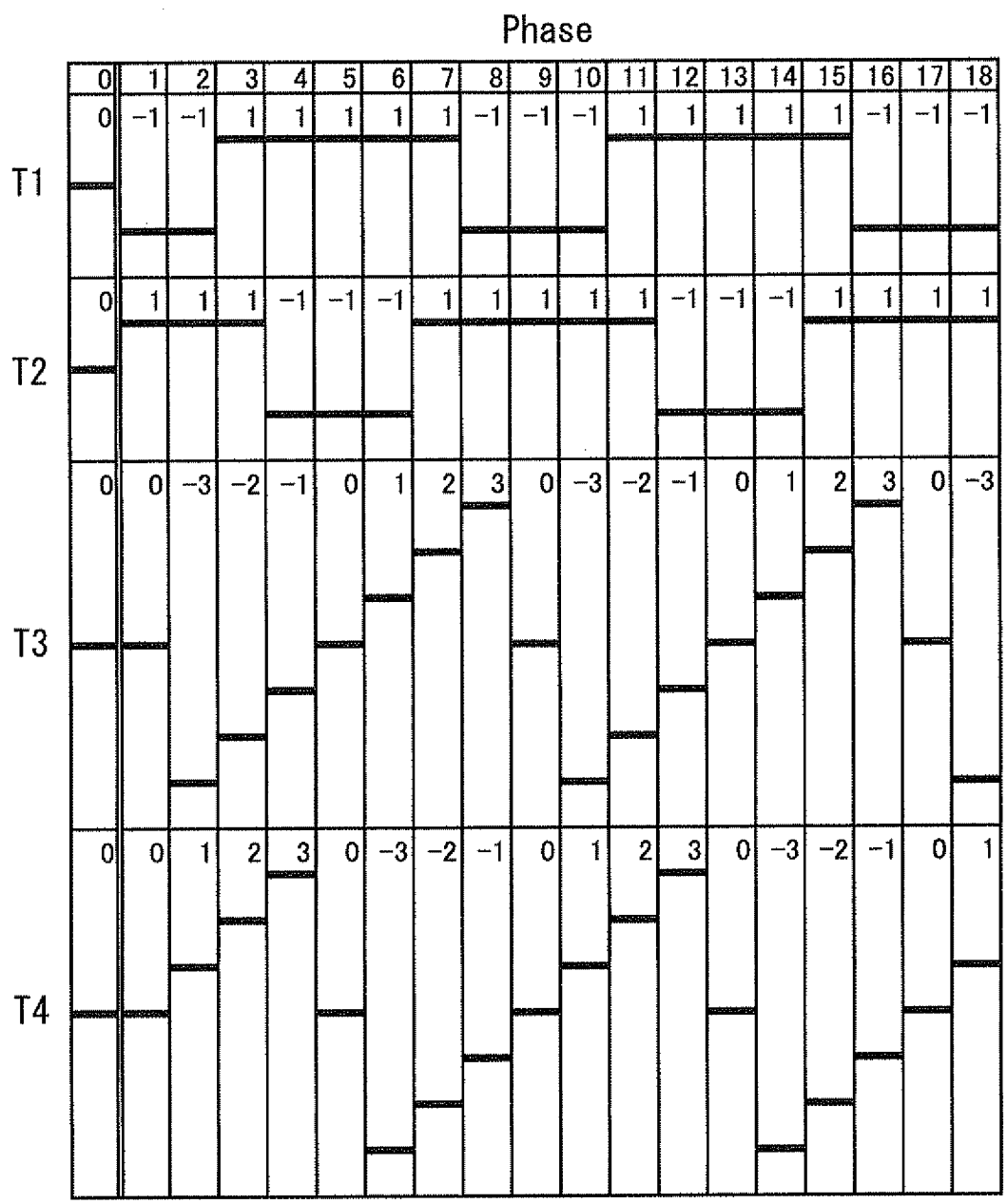
FIG. 22 is a timing diagram illustrating voltages supplied from a power supply unit of the driving mechanism shown in FIG. 17.

FIG. 22 is a timing diagram illustrating the voltages generated at the terminals T1, T2, T3, and T4 by the power supply unit 210.

As shown in FIG. 22, the power supply unit 210 generates a voltage of −1.0 V at the first terminal T1 in Phase 1 to Phase 2, generates a voltage of 1.0 V in five phases of Phase 3 to Phase 7, and generates a voltage of −1.0 V in three phases of Phase 8 to Phase 10. In the subsequent phases, the generation of the voltage of 1.0 V in five phases and the generation of the voltage of −1.0 V in three phases are repeated. That is, the power supply unit 210 generates a voltage having eight phases as a cycle at the first terminal.

The power supply unit 210 generates a voltage, which has a phase difference of 180° from the voltage generated at the first terminal T1 and has eight phases as a cycle similarly to the voltage generated at the first terminal T1, at the second terminal T2. That is, the voltage generated at the first terminal and the voltage generated at the second terminal have a phase difference of four phases corresponding to a half cycle.

The power supply unit 210 maintains the voltage of 0 V at the third terminal T3 in Phase 1, generates a voltage of −3.0 V in Phase 2, and raises the voltage by 1.0 V in the phases of Phase 3 to Phase 8. In the subsequent phases, this voltage generation pattern in Phase 1 to Phase 8 is repeated. That is, the power supply unit 210 generates a voltage having eight phases as a cycle at the third terminal T3.

The power supply unit 210 generates a voltage, which has a phase difference of 180° from the voltage generated at the third terminal T3 and has eight phases as a cycle similarly to the voltage generated at the third terminal T3, at the fourth terminal T4. That is, the voltage generated at the third terminal and the voltage generated at the fourth terminal have a phase difference of four phases corresponding to a half cycle.

In this embodiment, the frequencies of the voltages supplied to the first piezoelectric elements 206 and the second piezoelectric elements 207 from the power supply unit 210 are subsequently equal to the frequency of the resonant vibration of the supporting and driving section (structure) 201a including the first piezoelectric elements 206, the second piezoelectric elements 207, the driving members 203, and the base member 202.

The operation of the driving mechanism 201 according to this embodiment will be described with reference to FIGS. 23 to 26.

Figure 23:
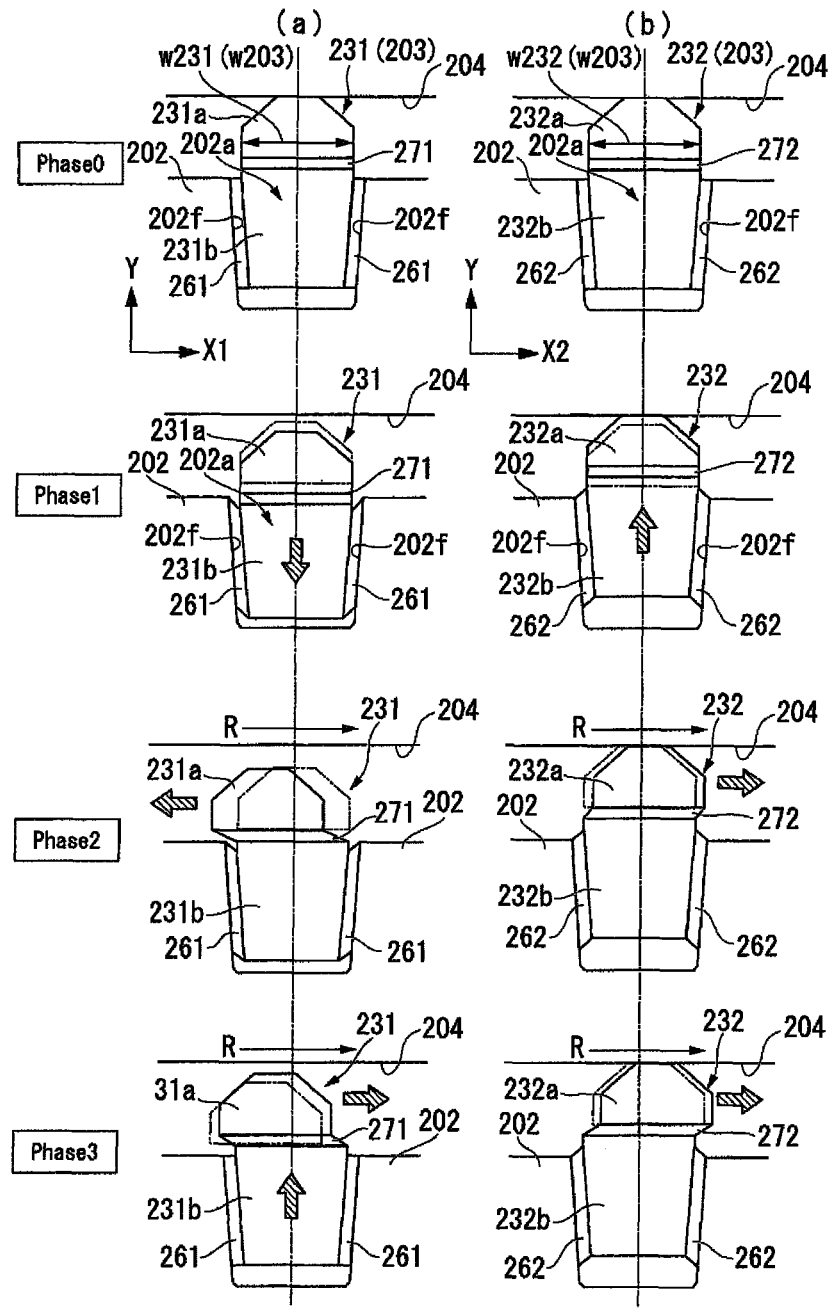
FIG. 23 is a front view illustrating the operation of a driving member of the driving mechanism shown in FIG. 17.
Figure 24:
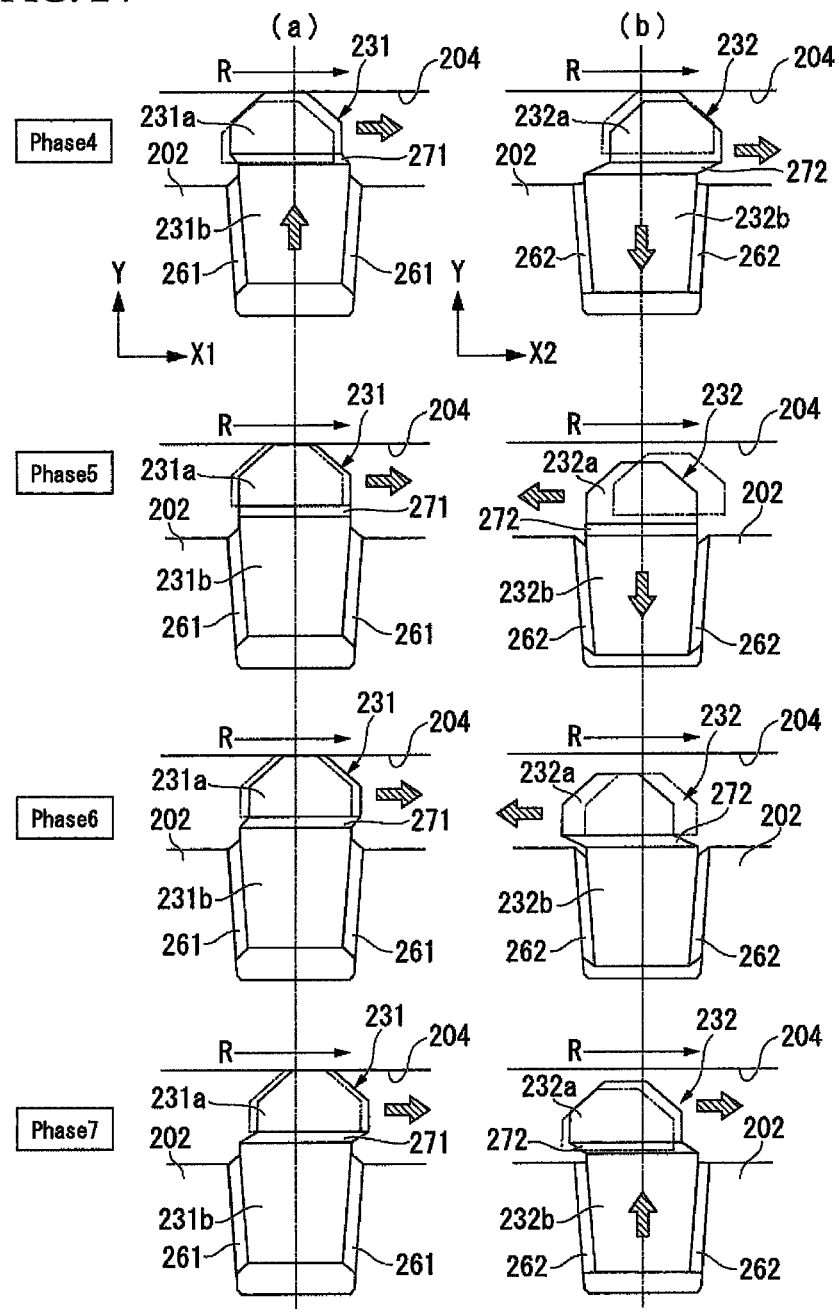
FIG. 24 is a front view of a driving member of the driving mechanism.
Figure 25:
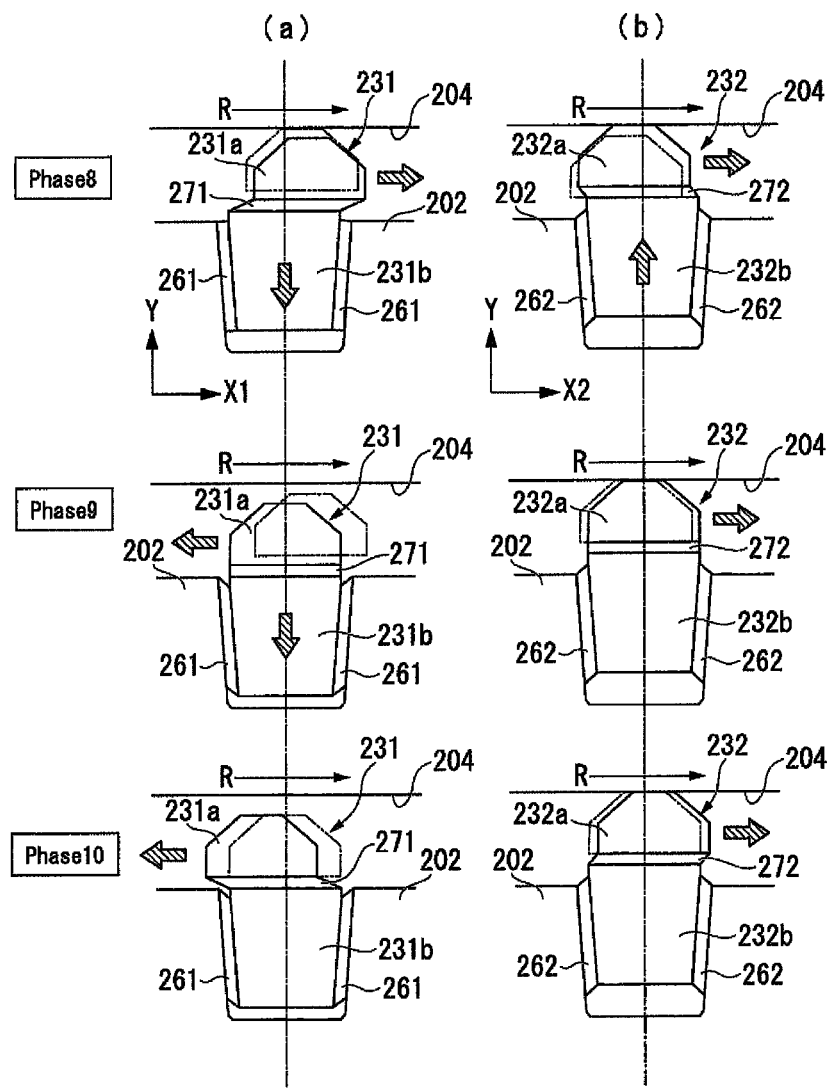
FIG. 25 is a front view of a driving member of the driving mechanism.

FIGS. 23 to 25 are enlarged front views illustrating the operation of the driving members 231 and 232 of the first group and the second group and the operation of the rotor 204.

Figure 26:
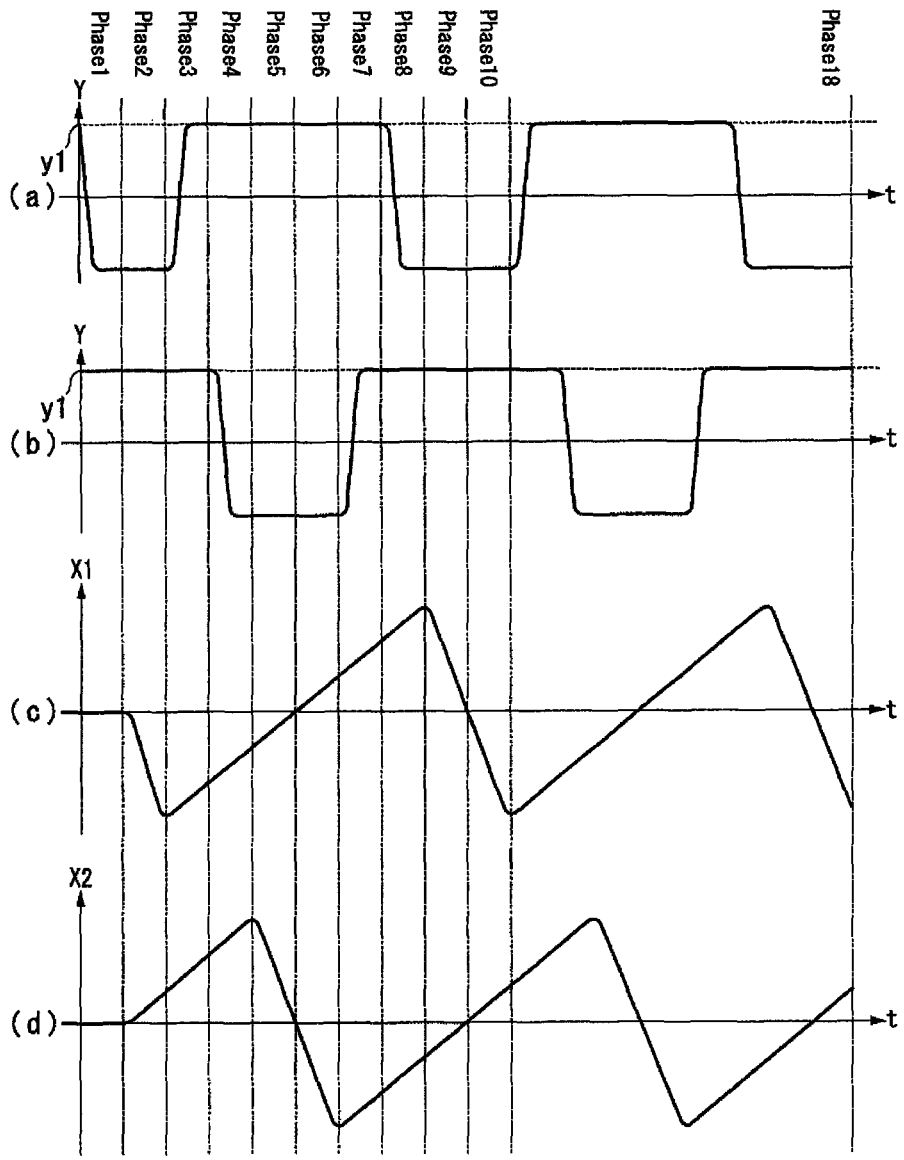
FIG. 26 is a graph illustrating a temporal variation in displacement of a tip portion of a driving member of the driving mechanism shown in FIG. 17.

FIG. 26 is a graph illustrating the relationship between the displacements in the axis directions of the tip portions 231a and 232a of the driving members 231 and 232 of the first group and the second group and the time t. In (a) and (b) of FIG. 26, the contact position y1 with the rotor 204 in the Y axis direction is indicated by a dotted line.

In (a) of FIG. 23 to (a) of FIG. 25, the operations will be described using an orthogonal coordinate system in which the width w231 direction (the first direction) of each driving member 231 of the first group along the rotation direction R (see FIG. 20B) of the rotor 204 is defined as an X1 direction and the direction (the second direction) parallel to the support shaft 205 (see FIG. 18) is defined as the Y direction. In (b) of FIG. 23 to (b) of FIG. 25, the operations will be described using an orthogonal coordinate system in which the width w232 direction (the first direction) of each driving member 232 of the second group along the rotation direction R of the rotor 204 is defined as an X2 direction and the direction (the second direction) parallel to the support shaft 205 is defined as the Y direction.

Phase 0

In Phase 0, as shown in FIG. 22, the power supply unit 210 does not generate a voltage at the terminals T1, T2, T3, and T4 (0 V) and supplies a voltage of 0 V (supplies no voltage) to the first piezoelectric elements 206 and the second piezoelectric elements 207 shown in FIGS. 21A and 21B.

As shown in (a) and (b) of FIG. 23, in Phase 0, the driving members 231 of the first group and the driving members 232 of the second group are stopped in the state where the top surfaces of the top portions 231a and 232a are in contact with the rotor 204. The rotor 204 is stopped in the state where it is supported by the tip portions 231a and 232a of the driving members 231 and 232.

Phase 1

In Phase 1, as shown in FIG. 22, the power supply unit 210 generates a voltage of −1.0 V at the first terminal T1 and supplies the voltage to the electrodes 261a of the first piezoelectric elements 261 of the driving members 231 of the first group shown in FIG. 21A via the first line 211. In Phase 1, as shown in FIG. 22, the power supply unit 210 maintains the voltage of 0 V at the third terminal T3 and supplies the voltage of 0 V to the second piezoelectric elements 271 of the driving members 231 of the first group shown in FIG. 21B via the third line 213.

Then, in Phase 1, as shown in (a) of FIG. 23, the first piezoelectric elements 261 driving the driving members 231 of the first group are deformed in a thickness-shear vibration mode and cause the base portions 231b of the driving members 231 to move toward the base member 202 in the Y direction (in the negative Y axis direction) relative to the support faces 22f of the holding portions 202a (see Phase 1 in (a) of FIG. 26). In Phase 1, as shown in (a) of FIG. 23, the second piezoelectric elements 271 are not deformed and the tip portion 231a does not move in the X1 direction (see Phase 1 in (c) of FIG. 26). Accordingly, the tip portions 231a of the driving members 231 move in the negative Y axis direction and are separated from the rotor 204.

In Phase 1, as shown in FIG. 22, the power supply unit 210 generates a voltage of 1.0 V at the second terminal T2 and supplies the voltage to the electrodes 262a of the first piezoelectric elements 262 of the driving members 232 of the second group shown in FIG. 21A via the second line 212. In Phase 1, as shown in FIG. 22, the power supply unit 210 maintains the voltage of 0 V at the fourth terminal T4 and supplies the voltage of 0 V to the second piezoelectric elements 272 of the driving members 232 of the second group shown in FIG. 21B via the fourth line 214.

Then, in Phase 1, as shown in (b) of FIG. 23, the first piezoelectric elements 262 driving the driving members 232 of the second group are deformed in a thickness-shear vibration mode and cause the base portion 232b of the driving members 232 to move toward the rotor 4 in the Y direction (in the positive Y axis direction) relative to the support faces 202f of the holding portions 202a (see Phase 1 in (b) of FIG. 26). In Phase 1, as shown in FIG. 21B, the second piezoelectric elements 272 are not deformed and the tip portion 232a does not move in the X2 direction (see Phase 1 in (d) of FIG. 26). Accordingly, the driving members 232 move in the positive Y axis direction) and the tip portion 232a pushes up the rotor 204 in the positive Y axis direction.

That is, in Phase 1, as shown in (a) of FIG. 23, the tip portions 231a of the driving members 231 of the first group move in the negative Y axis direction and are thus separated from the rotor 204. At the same time, as shown in (b) of FIG. 23, the tip portions 232a of the driving members 232 of the second group come in contact with the rotor 204 to support the rotor 204 and push up the rotor 204 in the positive Y axis direction.

Phase 2

In Phase 2, as shown in FIG. 22, the power supply unit 210 maintains the voltage of −1.0 V at the first terminal T1 and maintains the voltage supplied to the electrodes 261a of the first piezoelectric elements 261 of the driving members 231 of the first group shown in FIG. 21A via the first line 211. In Phase 2, as shown in FIG. 22, the power supply unit 210 generates a voltage of −3.0 V at the third terminal T3 and supplies the voltage to the second piezoelectric elements 271 of the driving members 231 of the first group shown in FIG. 21B via the third line 213.

Then, in Phase 2, as shown in (a) of FIG. 23, the deformation of the first piezoelectric elements 261 driving the driving members 231 of the first group in the Y axis direction is maintained and the state where the tip portions 231a are separated from the rotor 204 is maintained (see Phase 2 in (a) of FIG. 26). In Phase 2, as shown in (a) of FIG. 23, the second piezoelectric elements 271 in this state are deformed in the thickness-shear vibration mode and the tip portions 231a move in the negative X1 axis direction relative to the base portions 231b and the base member 202 (see (c) of FIG. 26). The movement of the tip portions 231a at this time is proportional to the absolute value of the voltage supplied to the second piezoelectric elements 271.

In Phase 2, as shown in FIG. 22, the power supply unit 210 maintains the voltage of 1.0 V at the second terminal T2 and maintains the voltage supplied to the electrodes 262a of the first piezoelectric elements 262 of the driving members 232 of the second group shown in FIG. 21A via the second line 212. In Phase 2, as shown in FIG. 22, the power supply unit 210 generates a voltage of 1.0 V at the fourth terminal T4 and supplies the voltage to the second piezoelectric elements 272 of the driving members 232 of the second group shown in FIG. 21B via the fourth line 214.

Then, in Phase 2, as shown in (b) of FIG. 23, the deformation of the first piezoelectric elements 262 driving the driving members 232 of the second group in the Y axis direction is maintained and the state where the tip portions 232a come in contact with the rotor 204 is maintained (see Phase 2 in (b) of FIG. 26). In Phase 2, as shown in (b) of FIG. 23, the second piezoelectric elements 272 in this state are deformed in the thickness-shear vibration mode and the tip portions 232a move in the positive X2 axis direction relative to the base portions 232b and the base member 202 (see Phase 2 in (d) of FIG. 26). Since the movement of the tip portions 232a at this time is proportional to the absolute value of the voltage, the movement is smaller than the movement of the tip portions 231a of the first group in the negative X1 axis direction.

That is, in Phase 2, as shown in (b) of FIG. 23, a frictional force acts on the bottom surface (a non-contact surface 204b) of the rotor 204 from the top surfaces of the tip portions 232a due to the movement of the tip portions 232a of the driving members 232 of the second group in the positive X2 axis direction. Here, as shown in FIGS. 20A and 20B, the driving members 232 of the second group are arranged around the base member 202 in the rotation direction R of the rotor 204. The tip portions 232a are deformed in the width w232 direction of the driving members 232 (in the X2 direction) parallel to the rotation direction R of the rotor 204. Accordingly, the rotor 204 is driven in the rotation direction R by the tip portions 232a of the driving member 232 and starts its rotation about the support shaft 205 shown in FIGS. 17 and 18.

Phase 3

In Phase 3, as shown in FIG. 22, the power supply unit 210 generates a voltage of 1.0 V, which is inverted in plus (+) and minus (−) signs, at the first terminal T1 and supplies the voltage to the electrodes 261a of the first piezoelectric elements 261 of the driving members 231 of the first group shown in FIG. 21A via the first line 211. In Phase 3, as shown in FIG. 22, the power supply unit 210 generates a voltage of −2.0 V at the third terminal T3 and supplies the voltage to the second piezoelectric elements 271 of the driving members 231 of the first group shown in FIG. 21B via the third line 213.

Then, in Phase 3, as shown in (a) of FIG. 23, the first piezoelectric elements 261 driving the driving member 231 of the first group are reversely deformed in the thickness-shear vibration mode and cause the base portions 231b of the driving members 231 to move in the positive Y direction (see Phase 3 in (a) of FIG. 26). At the same time, in Phase 3, as shown in (a) of FIG. 23, the movement of the second piezoelectric elements 271 in the negative X1 axis direction decreases and the tip portions 231a move in the positive X1 direction relative to the base portions 231b and the base member 202 (see Phase 3 in (c) of FIG. 26). The movement at this time is proportional to the voltage difference between −2.0 V newly supplied in Phase 3 and −3.0 V supplied in Phase 2.

In Phase 3, as shown in FIG. 22, the power supply unit 210 maintains the voltage at the second terminal T2 and maintains the voltage supplied to the electrodes 262a of the first piezoelectric elements 262 of the driving members 232 of the second group shown in FIG. 21A via the second line 212. In Phase 3, as shown in FIG. 22, the power supply unit 210 generates a voltage of 2.0 V at the fourth terminal T4 and supplies the voltage to the second piezoelectric elements 272 of the driving members 232 of the second group shown in FIG. 21B via the fourth line 214.

Then, in Phase 3, as shown in (b) of FIG. 23, the deformation of the first piezoelectric elements 262 driving the driving members 232 of the second group is maintained and the state where the tip portions 232a come in contact with the rotor 204 is maintained (see Phase 3 in (b) of FIG. 26). In Phase 3, as shown in (b) of FIG. 23, the second piezoelectric elements 272 in this state are deformed in the thickness-shear vibration mode and the tip portions 232a move in the positive X2 axis direction relative to the base portions 232b and the base member 202 (see Phase 3 in (d) of FIG. 26). The movement at this time is proportional to the absolute value of the voltage difference between 2.0 V newly supplied in Phase 3 and 1.0 V supplied in Phase 2.

That is, in Phase 3, as shown in (a) of FIG. 23, the tip portions 231a of the driving members 231 of the first group move in the positive Y axis direction while moving in the positive X1 axis direction parallel to the rotation direction R of the rotor 204 and get close to and come in contact with the rotor 204. At the same time, as shown in (b) of FIG. 23, the tip portions 232a of the driving members 232 of the second group come in contact with the rotor 204 to support the rotor 204 and drive the rotor 204 in the rotation direction R.

Phase 4

In Phase 4, as shown in FIG. 22, the power supply unit 210 maintains the voltage of 1.0 V at the first terminal T1 and maintains the voltage supplied to the electrodes 261a of the first piezoelectric elements 261 of the driving members 231 of the first group shown in FIG. 21A via the first line 211. In Phase 4, as shown in FIG. 22, the power supply unit 210 generates a voltage of −1.0 V at the third terminal T3 and supplies the voltage to the second piezoelectric elements 271 of the driving members 231 of the first group shown in FIG. 21B via the third line 213.

Then, in Phase 4, as shown in (a) of FIG. 24, the deformation of the first piezoelectric elements 261 driving the driving members 231 of the first group in the positive Y axis direction is maintained and the state where the tip portion 231a is in contact with the rotor 204 is maintained (see Phase 4 in (a) of FIG. 26). At the same time, in Phase 4, as shown in (a) of FIG. 24, the movement of the second piezoelectric elements 271 in the negative X1 axis direction decreases and the tip portions 231a move in the positive X1 axis direction relative to the base portions 231b and the base member 202 (see Phase 4 in (c) of FIG. 26). The movement at this time is proportional to the absolute value of the voltage difference between −1.0 V newly supplied in Phase 4 and −2.0 V supplied in Phase 3.

In Phase 4, as shown in FIG. 22, the power supply unit 210 generates a voltage of −1.0 V, which is inverted in plus (+) and minus (−) signs, at the second terminal T2 and supplies the voltage to the electrodes 262a of the first piezoelectric elements 262 of the driving members 232 of the second group shown in FIG. 21A via the second line 212. In Phase 4, as shown in FIG. 22, the power supply unit 210 generates a voltage of 3.0 V at the fourth terminal T4 and supplies the voltage to the second piezoelectric elements 272 of the driving members 232 of the second group shown in FIG. 21B via the fourth line 214.

Then, in Phase 4, as shown in (b) of FIG. 24, the first piezoelectric elements 262 driving the driving members 232 of the second group are deformed in the thickness-shear vibration mode and the base portions 232b of the driving members 232 are made to move in the negative Y axis direction (see Phase 4 in (b) of FIG. 26). At the same time, in Phase 4, as shown in (b) of FIG. 24, the movement of the second piezoelectric elements 272 in the positive X2 axis direction increases and the tip portions 232a move in the positive X2 axis direction relative to the base portions 232b and the base member 202 (see Phase 4 in (d) of FIG. 26). The movement at this time is proportional to the absolute value of the voltage difference between 3.0 V newly supplied in Phase 4 and 2.0 V supplied in Phase 2.

That is, in Phase 4, as shown in (a) of FIG. 24, the tip portions 231a of the driving members 231 of the first group move in the positive X1 axis direction parallel to the rotation direction R of the rotor 204 in the state where they are in contact with the rotor 204 and support and drive the rotor 204 in the rotation direction R. At the same time, as shown in (b) of FIG. 24, the tip portions 232a of the driving members 232 of the second group move in the negative Y axis direction while moving in the positive X2 axis direction parallel to the rotation direction R of the rotor 204 and are separated from the rotor 204. Accordingly, the rotor 204 is driven in the rotation direction R by the tip portions 231a and 232a of the driving members 231 and 232 of the first and second groups and the rotor 204 is handed over from the tip portions 232a of the driving members 232 of the second group to the tip portions 231a of the driving members 231 of the first group.

At this time, in Phase 4, both driving members 231 and 232 may be separated from the rotor 204 for a very short time. In this case, the rotor 204 is not displaced in the Y direction due to its inertia but stays at the position at which it is supported by the tip portions 232a of the driving members 232 of the second group. Accordingly, in the state where the rotor 204 is maintained at a substantially constant position in the Y direction and is driven in the rotation direction R, the rotor 204 is supported in the Y direction and is driven in the rotation direction R by the tip portions 231a of the driving members 231 of the first group. As a result, the rotor 204 continuously rotates about the support shaft 205 at a substantially constant position in the Y direction.

Phase 5

In Phase 5, as shown in FIG. 22, the power supply unit 210 maintains the voltage of 1.0 V at the first terminal T1 and maintains the voltage supplied to the electrodes 261a of the first piezoelectric elements 261 of the driving members 231 of the first group shown in FIG. 21A via the first line 211. In Phase 5, as shown in FIG. 22, the power supply unit 210 generates a voltage of 0 V at the third terminal T3 and supplies the voltage of 0 V to the second piezoelectric elements 271 of the driving members 231 of the first group shown in FIG. 21B via the third line 213.

Then, in Phase 5, as shown in (a) of FIG. 24, the deformation of the first piezoelectric elements 261 driving the driving members 231 of the first group in the Y axis direction is maintained and the state where the tip portions 231a are in contact with the rotor 204 is maintained (see Phase 5 in (a) of FIG. 26). In Phase 5, as shown in (a) of FIG. 24, the second piezoelectric elements 271 in this state are returned to the original shape and the tip portions 231a move in the positive X1 axis direction relative to the base portions 231b and the base member 202 (see Phase 5 in (c) of FIG. 26). The movement of the tip portions 231a at this time is proportional to the absolute value of the voltage supplied to the second piezoelectric elements 271 in Phase 4.

In Phase 5, as shown in FIG. 22, the power supply unit 210 maintains the voltage of −1.0 V at the second terminal T2 and maintains the voltage supplied to the electrodes 262a of the first piezoelectric elements 262 of the driving members 232 of the second group shown in FIG. 21A via the second line 212. In Phase 5, as shown in FIG. 22, the power supply unit 210 generates the voltage of 0 V at the fourth terminal T4 and supplies the voltage of 0 V to the second piezoelectric elements 272 of the driving members 232 of the second group shown in FIG. 21B via the fourth line 214.

Then, in Phase 5, as shown in (a) of FIG. 24, the deformation of the first piezoelectric elements 262 driving the driving members 232 of the second group in the Y direction is maintained and the state where the tip portions 232a are separated from the rotor 204 is maintained (see Phase 5 in (b) of FIG. 26). At the same time, in Phase 5, as shown in (b) of FIG. 24, the second piezoelectric elements 272 are returned to the original shape and the tip portions 232a move in the negative X2 axis direction relative to the base portions 232b and the base member 202 (see Phase 5 in (d) of FIG. 26). The movement of the tip portions 232a at this time is proportional to the absolute value of the voltage supplied to the second piezoelectric elements 272 in Phase 4.

That is, in Phase 5, as shown in (a) of FIG. 24, the tip portions 231a of the driving members 231 of the first group move in the positive X1 axis direction while maintaining the state where they are in contact with the rotor 204 and supporting the rotor 204 and drive the rotor 204 in the rotation direction R. At the same time, as shown in (b) of FIG. 24, the tip portions 232a of the driving members 232 of the second group move in the negative Y axis direction and move in the negative X2 axis direction which is opposite to the rotation direction R of the rotor 204 relative to the base portions 232b and the base member 202 while maintaining the state where they are separated from the rotor 4.

Phase 6

In Phase 6, as shown in FIG. 22, the power supply unit 210 maintains the voltage of 1.0 V at the first terminal T1 and maintains the voltage supplied to the electrodes 261a of the first piezoelectric elements 261 of the driving members 231 of the first group shown in FIG. 21A via the first line 211. In Phase 6, as shown in FIG. 22, the power supply unit 210 generates a voltage of 1.0 V at the third terminal T3 and supplies the voltage to the second piezoelectric elements 271 of the driving members 231 of the first group shown in FIG. 21B via the third line 213.

Then, in Phase 6, as shown in (a) of FIG. 24, the deformation of the first piezoelectric elements 261 driving the driving members 231 of the first group in the Y direction is maintained and the state where the tip portions 231a are in contact with the rotor 204 is maintained (see Phase 6 in (a) of FIG. 26). In Phase 6, as shown in (a) of FIG. 24, the second piezoelectric elements 271 in this state are deformed in the thickness-shear vibration mode and the tip portions 231a move in the positive X1 axis direction relative to the base portions 231b and the base member 202 (see Phase 6 in (c) of FIG. 26). The movement at this time is proportional to the absolute value of the voltage newly supplied in Phase 6.

In Phase 6, as shown in FIG. 22, the power supply unit 210 maintains the voltage of −1.0 V at the second terminal T2 and maintains the voltage supplied to the electrodes 262a of the first piezoelectric elements 262 of the driving members 232 of the second group shown in FIG. 21A via the second line 212. In Phase 6, as shown in FIG. 22, the power supply unit 210 generates a voltage of −3.0 V at the fourth terminal T4 and supplies the voltage to the second piezoelectric elements 272 of the driving members 232 of the second group shown in FIG. 21B via the fourth line 214.

Then, in Phase 6, as shown in (b) of FIG. 24, the deformation of the first piezoelectric elements 262 driving the driving members 232 of the second group is maintained and the state where the tip portions 232a are separated from the rotor 204 is maintained (see Phase 6 in (b) of FIG. 26). In Phase 6, as shown in (b) of FIG. 24, the second piezoelectric elements 272 in this state are deformed in the thickness-shear vibration mode and the tip portions 232a move in the negative X2 axis direction relative to the base portions 232b and the base member 202 (see Phase 6 in (d) of FIG. 26). The movement of the tip portions 232a at this time is proportional to the absolute value of the voltage supplied to the second piezoelectric elements 272.

That is, in Phase 6, as shown in (a) of FIG. 24, the tip portions 231a of the driving members 231 of the first group move in the positive X1 axis direction while maintaining the state where they are in contact with the rotor 204 and supporting the rotor 204 and drive the rotor 204 in the rotation direction R. At the same time, as shown in (b) of FIG. 24, the tip portions 232a of the driving members 232 of the second group move in the negative X2 axis direction, which is opposite to the rotation direction R of the rotor 204, relative to the base portions 232b and the base member 202 while maintaining the state where they are separated from the rotor 204.

Phase 7

In Phase 7, as shown in FIG. 22, the power supply unit 210 maintains the voltage of 1.0 V at the first terminal T1 and maintains the voltage supplied to the electrodes 261a of the first piezoelectric elements 261 of the driving members 231 of the first group shown in FIG. 21A via the first line 211. In Phase 7, as shown in FIG. 22, the power supply unit 210 generates a voltage of 2.0 V at the third terminal T3 and supplies the voltage to the second piezoelectric elements 271 of the driving members 231 of the first group shown in FIG. 21B via the third line 213.

Then, in Phase 7, as shown in (a) of FIG. 24, the deformation of the first piezoelectric elements 261 driving the driving members 231 of the first group is maintained and the state where the tip portions 231a are in contact with the rotor 204 is maintained (see Phase 7 in (a) of FIG. 26). In Phase 7, as shown in (a) of FIG. 24, the second piezoelectric elements 271 in this state are deformed in the thickness-shear vibration mode and the tip portions 231a move in the positive X1 axis direction relative to the base portions 231b and the base member 202 (see Phase 7 in (c) of FIG. 26). The movement at this time is proportional to the absolute value of the voltage difference between 2.0 V newly supplied in Phase 7 and 1.0 V supplied in Phase 6.

In Phase 7, as shown in FIG. 22, the power supply unit 210 generates the voltage of 1.0 V, which is inverted in plus (+) and minus (−) signs, at the second terminal T2 and supplies the voltage supplied to the electrodes 262a of the first piezoelectric elements 262 of the driving members 232 of the second group shown in FIG. 21A via the second line 212. In Phase 7, as shown in FIG. 22, the power supply unit 210 generates the voltage of −2.0 V at the fourth terminal T4 and supplies the voltage to the second piezoelectric elements 272 of the driving members 232 of the second group shown in FIG. 21B via the fourth line 214.

Then, in Phase 7, as shown in (b) of FIG. 24, the first piezoelectric elements 262 driving the driving members 232 of the second group are deformed in the thickness-shear vibration mode and the base portions 232b of the driving members 232 are made to move in the positive Y axis direction (see Phase 7 in (b) of FIG. 26). At the same time, in Phase 7, as shown in (b) of FIG. 24, the movement of the second piezoelectric elements 272 in the negative X2 axis direction decreases and the tip portions 232a move in the positive X2 axis direction relative to the base portions 232b and the base member 202 (see Phase 7 in (d) of FIG. 26). The movement at this time is proportional to the absolute value of the voltage difference between −2.0 V newly supplied in Phase 7 and −3.0 V supplied in Phase 6.

That is, in Phase 7, as shown in (a) of FIG. 24, the tip portions 231a of the driving members 231 of the first group drive the rotor 204 in the rotation direction R while maintaining the state where they are in contact with the rotor 204 and supporting the rotor 204. At the same time, as shown in (b) of FIG. 24, the tip portions 232a of the driving members 232 of the second group move in the positive Y axis direction while moving in the positive X2 axis direction parallel to the rotation direction R of the rotor 204 and come in contact with the rotor 204.

Phase 8

In Phase 8, as shown in FIG. 22, the power supply unit 210 generates a voltage of −1.0 V, which is inverted in plus (+) and minus (−) signs, at the first terminal T1 and supplies the voltage to the electrodes 261a of the first piezoelectric elements 261 of the driving members 231 of the first group shown in FIG. 21A via the first line 211. In Phase 8, as shown in FIG. 22, the power supply unit 210 generates a voltage of 3.0 V at the third terminal T3 and supplies the voltage to the second piezoelectric elements 271 of the driving members 231 of the first group shown in FIG. 21B via the third line 213.

Then, in Phase 8, as shown in (a) of FIG. 25, the first piezoelectric elements 261 driving the driving member 231 of the first group are reversely deformed in the thickness-shear vibration mode and cause the base portions 203b of the driving members 203 to move in the negative Y direction (see Phase 8 in (a) of FIG. 26). At the same time, in Phase 8, as shown in (a) of FIG. 25, the movement of the second piezoelectric elements 271 in the positive X1 axis direction increases and the tip portions 231a move in the positive X1 direction relative to the base portions 231b and the base member 202 (see Phase 8 in (c) of FIG. 26). The movement at this time is proportional to the voltage difference between 3.0 V newly supplied in Phase 8 and 2.0 V supplied in Phase 7.

In Phase 8, as shown in FIG. 22, the power supply unit 210 maintains the voltage of 1.0 V at the second terminal T2 and maintains the voltage supplied to the electrodes 262a of the first piezoelectric elements 262 of the driving members 232 of the second group shown in FIG. 21A via the second line 212. In Phase 8, as shown in FIG. 22, the power supply unit 210 generates a voltage of −1.0 V at the fourth terminal T4 and supplies the voltage to the second piezoelectric elements 272 of the driving members 232 of the second group shown in FIG. 21B via the fourth line 214.

Then, in Phase 8, as shown in (b) of FIG. 25, the deformation of the first piezoelectric elements 262 driving the driving members 232 of the second group in the Y direction is maintained and the state where the tip portions 232a come in contact with the rotor 204 is maintained (see Phase 8 in (b) of FIG. 26). In Phase 8, as shown in (b) of FIG. 25, the movement of the second piezoelectric elements 272 in the negative X2 axis direction decreases and the tip portions 232a move in the positive X2 axis direction relative to the base portions 232b and the base member 202 (see Phase 8 in (d) of FIG. 26). The movement at this time is proportional to the absolute value of the voltage difference between −1.0 V newly supplied in Phase 8 and −2.0 V supplied in Phase 7.

That is, in Phase 8, as shown in (a) of FIG. 25, the tip portions 231a of the driving members 231 of the first group move in the negative Y axis direction while moving in the positive X1 axis direction parallel to the rotation direction R of the rotor 204 and are separated from the rotor 204. At the same time, as shown in (b) of FIG. 25, the tip portions 232a of the driving members 232 of the second group move in the positive X2 axis direction parallel to the rotation direction R of the rotor 204 in the state where they are in contact with the rotor 204 and support and drive the rotor 204 in the rotation direction R. Accordingly, the rotor 204 is driven in the rotation direction R by the tip portions 231a and 232a of the driving members 231 and 232 of the first and second groups and the rotor 204 is handed over from the tip portions 231a of the driving members 231 of the first group to the tip portions 232a of the driving members 232 of the second group.

At this time, in Phase 8, both driving members 231 and 232 may be separated from the rotor 204 for a very short time. In this case, the rotor 204 is not displaced in the Y direction due to its inertia but stays at the position at which it is supported by the tip portions 231a of the driving members 231 of the first group. Accordingly, in the state where the rotor 204 is maintained at a substantially constant position in the Y direction and is driven in the rotation direction R, the rotor 204 is supported in the Y direction and is driven in the rotation direction R by the tip portions 232a of the driving members 232 of the second group. As a result, the rotor 204 continuously rotates about the support shaft 205 at a substantially constant position in the Y direction.

Phase 9

In Phase 9, as shown in FIG. 22, the power supply unit 210 maintains the voltage of −1.0 V at the first terminal T1 and maintains the voltage supplied to the electrodes 261a of the first piezoelectric elements 261 of the driving members 231 of the first group shown in FIG. 21A via the first line 211. In Phase 9, as shown in FIG. 22, the power supply unit 210 generates a voltage of 0 V at the third terminal T3 and supplies the voltage of 0 V to the second piezoelectric elements 271 of the driving members 231 of the first group shown in FIG. 21B via the third line 213.

Then, in Phase 9, as shown in (a) of FIG. 25, the deformation of the first piezoelectric elements 261 driving the driving members 231 of the first group in the Y axis direction is maintained and the state where the tip portions 231a are separated from the rotor 204 is maintained (see Phase 9 in (a) of FIG. 26). At the same time, in Phase 9, as shown in (a) of FIG. 25, the second piezoelectric elements 271 are returned to the original shape and the tip portions 231a move in the negative X1 axis direction relative to the base portions 231b and the base member 202 (see Phase 9 in (c) of FIG. 26). The movement of the tip portions 231a at this time is proportional to the absolute value of the voltage supplied to the second piezoelectric elements 207 in Phase 8.

In Phase 9, as shown in FIG. 22, the power supply unit 210 maintains the voltage of 1.0 V at the second terminal T2 and maintains the voltage supplied to the electrodes 262a of the first piezoelectric elements 262 of the driving members 232 of the second group shown in FIG. 21A via the second line 212. In Phase 9, as shown in FIG. 22, the power supply unit 210 generates the voltage of 0 V at the fourth terminal T4 and supplies the voltage of 0 V to the second piezoelectric elements 272 of the driving members 232 of the second group shown in FIG. 21B via the fourth line 214.

Then, in Phase 9, as shown in (b) of FIG. 25, the deformation of the first piezoelectric elements 262 driving the driving members 232 of the second group in the Y direction is maintained and the state where the tip portions 232a are in contact with the rotor 204 is maintained (see Phase 9 in (b) of FIG. 26). In Phase 9, as shown in (b) of FIG. 25, the second piezoelectric elements 272 in this state are returned to the original shape and the tip portions 232a move in the positive X2 axis direction relative to the base portions 232b and the base member 202 (see Phase 9 in (d) of FIG. 26). The movement of the tip portions 232a at this time is proportional to the absolute value of the voltage supplied to the second piezoelectric elements 272 in Phase 8.

That is, in Phase 9, as shown in (a) of FIG. 25, the tip portions 231a of the driving members 231 of the first group move in the negative X1 axis direction which is opposite to the rotation direction R of the rotor 204 while maintaining the state where they move in the negative Y axis direction and are separated from the rotor 204. At the same time, as shown in (b) of FIG. 25, the tip portions 232a of the driving members 232 of the second group move in the positive X1 axis direction parallel to the rotation direction R of the rotor 204 and drive the rotor 204 in the rotation direction R while maintaining the state where they are in contact with the rotor 204 and supporting the rotor 204.

Phase 10

In Phase 10, as shown in FIG. 22, the power supply unit 210 maintains the voltage of −1.0 V at the first terminal T1 and maintains the voltage supplied to the electrodes 261a of the first piezoelectric elements 261 of the driving members 231 of the first group shown in FIG. 21A via the first line 211. In Phase 10, as shown in FIG. 22, the power supply unit 210 generates a voltage of −3.0 V at the third terminal T3 and supplies the voltage to the second piezoelectric elements 271 of the driving members 231 of the first group shown in FIG. 21B via the third line 213.

Then, in Phase 10, as shown in (a) of FIG. 25, the deformation of the first piezoelectric elements 261 driving the driving members 231 of the first group in the Y direction is maintained and the state where the tip portions 231a are separated from the rotor 204 is maintained (see Phase 10 in (a) of FIG. 26). In Phase 10, as shown in (a) of FIG. 25, the second piezoelectric elements 271 in this state are deformed in the thickness-shear vibration mode and the tip portions 231a move in the negative X1 axis direction relative to the base portions 231b and the base member 202 (see Phase 10 in (c) of FIG. 26). The movement of the tip portions 231a at this time is proportional to the absolute value of the voltage supplied to the second piezoelectric elements 271.

In Phase 10, as shown in FIG. 22, the power supply unit 210 maintains the voltage of 1.0 V at the second terminal T2 and maintains the voltage supplied to the electrodes 262a of the first piezoelectric elements 262 of the driving members 232 of the second group shown in FIG. 21A via the second line 212. In Phase 10, as shown in FIG. 22, the power supply unit 210 generates a voltage of 1.0 V at the fourth terminal T4 and supplies the voltage to the second piezoelectric elements 272 of the driving members 232 of the second group shown in FIG. 21B via the fourth line 214.

Then, in Phase 10, as shown in (b) of FIG. 25, the deformation of the first piezoelectric elements 262 driving the driving members 232 of the second group is maintained and the state where the tip portions 232a are in contact with the rotor 204 is maintained (see Phase 10 in (b) of FIG. 26). In Phase 10, as shown in (b) of FIG. 25, the second piezoelectric elements 272 in this state are deformed in the thickness-shear vibration mode and the tip portions 232a move in the positive X2 axis direction relative to the base portions 232b and the base member 202 (see Phase 10 in (d) of FIG. 26). The movement at this time is proportional to the absolute value of the voltage newly supplied in Phase 10.

That is, in Phase 10, as shown in (a) of FIG. 25, the tip portions 231a of the driving members 231 of the first group further move in the negative X1 axis direction relative to the base portions 231b and the base member 202 while maintaining the state where they are separated from the rotor 204. At the same time, as shown in (b) of FIG. 25, the tip portions 232a of the driving members 232 of the second group move in the positive X2 axis direction parallel to the rotation direction R of the rotor 204 and drive the rotor 204 in the rotation direction R, while maintaining the state where they are in contact with the rotor 204 and supporting the rotor 204.

In Phase 11 and the phases subsequent thereto, the same operations as the operations of Phase 3 to Phase 10 are repeatedly performed and the rotor 204 continuously rotates. Accordingly, by the tip portions 231a of the driving members 231 of the first group and the tip portions 232a of the driving members 232 of the second group, the rotor 204 is alternately (sequentially) supported in the Y axis direction and is driven in the rotation direction R and the rotor 204 continuously rotates about the support shaft 205.

In the driving mechanism 201 according to this embodiment, the first piezoelectric elements 206 driving the driving members 203 in the direction (the second direction) parallel to the support shaft 205 and the second piezoelectric elements 207 driving the tip portions 203a of the driving members 203 in the width w203 direction (the first direction) of the corresponding driving member 203 parallel to the rotation direction R of the rotor 204 are independently disposed. Accordingly, it is possible to take out the vibrations in the directions as independent vibrations.

Therefore, when causing the rotor 204 to rotate by the use of the driving members 203 and relatively driving the rotor 204 and the driving members 203, it is possible to cause the rotor 204 to rotate more stably. Compared with the case where the first piezoelectric elements 206 interposing the base portion 203b therebetween drive the base portion 203b in different directions, it is difficult to cause the loss and it is possible to improve the energy efficiency, thereby enhancing the output of the driving mechanism 201.

Here, the base member 202 has conductivity. Accordingly, when the first piezoelectric elements 206 are directly bonded to the surface of the base member 202, the base member 202 serves as a common electrode of the first piezoelectric elements 206. Accordingly, the electrodes 261a of the first piezoelectric elements 261 driving the driving members 231 of the first group and the electrodes 262a of the first piezoelectric elements 262 driving the driving members 232 of the second group have a common potential. Then, it is difficult to apply different voltages to the first piezoelectric elements 261 and 262 of the groups and it is thus difficult to independently drive the driving members 231 and 232.

However, in this embodiment, the insulating film 202g is disposed between all the first piezoelectric elements 206 and the base member 202, as shown in FIG. 19. Accordingly, it is possible to easily independently apply different voltages to the first piezoelectric elements 261 and 262 driving the driving members 231 and 232 of the groups. As a result, it is possible to independently drive the driving members 231 and 232 of the groups and thus to cause the rotor 204 to stably and continuously rotate.

As shown in FIG. 19, the surface of each first piezoelectric element 206 in contact with the insulating film 202g formed on the surface of the base member 202 is provided with the electrode 206a and the base portion 203b of the driving member 203 having conductivity is grounded. Accordingly, by connecting the first wire 211 and the second wire 212 shown in FIGS. 21A and 21B to the electrodes 261a and 262a of the first piezoelectric elements 261 and 262 of the driving members 231 and 232 of the first and second groups, it is possible to apply voltages between the electrodes 261a and 262a of the first piezoelectric elements 261 and 262 and the base portions 231b and 232b of the driving members 231 and 232.

Here, when the thickness of the insulating film 202g is greater than, for example, 20 μm, the vibration of the first piezoelectric element 206 typically used with an amplitude of several is damped by the insulating film 202g and is hardly transmitted to the base member 202. For example, when the deviation of the thickness is greater than the average thickness±50%, when the hardness is lower than 2H in pencil hardness, when the density is high, or the like, the vibration damping effect increases and it is difficult to transmit the vibration to the base member 202.

However, in this embodiment, the thickness of the insulating film 202g is in the range of 10 μm to 20 μm. In addition, the deviation in thickness of the insulating film 202g is equal to or less than the average thickness±50%. Similarly, by forming the insulating film 202g with a thickness as small as possible so long as a desired withstanding voltage is maintained, it is possible to minimize the vibration damping effect of the insulating film 202g. Therefore, the vibration of the first piezoelectric element 206 can be satisfactorily transmitted to the base member 202 as an elastic body via the insulating film 202g.

The hardness of the insulating film 202g is equal to or higher than 2H in pencil hardness.

Similarly, by setting the hardness of the insulating film 202g to be equal to or higher than a predetermined value, it is possible to prevent the vibration of the supporting and driving section 201 from being damped by the insulating film 202g. Therefore, it is possible to prevent the lowering of the output of the driving mechanism 201.

When the adhesive used for bonding the electrodes 206a of the first piezoelectric elements 206 to the insulating film 202g on the base member 202 does not include the same type of material as the insulating film 202g, the bonding of the electrodes 206a of the first piezoelectric elements 206 to the insulating film 202g may not be sufficient and a desired bonding strength may not be achieved. In this case, the bonding surface may be peeled and separated due to the shearing force and the peeling force acting between the electrodes 206a of the first piezoelectric elements 206 and the insulating film 202g, and the driving members 203 may be separate from the base member 202.

However, in this embodiment, the adhesives used for fixing the first piezoelectric elements 206 to the insulating film 202g and the insulating film 202g are of the same type of material. Accordingly, the adhesive and the insulating film 202g are incorporated into each other, and the electrodes 206a of the first piezoelectric elements 206 and the insulating film 202g are strongly bonded to each other, thereby retaining the adhesive force of the adhesive. Therefore, it is possible to enhance the resistance to the shearing force and the peeling force acting between the electrodes 206a of the first piezoelectric elements 206 and the insulating film 202g.

The first piezoelectric elements 206 interpose the base portion 203b of the driving member 203 in the width w203 direction and the first piezoelectric elements 206 drive the driving member 203 in the direction different from the width w203 direction and parallel to the support shaft 205. The sizes and shapes of a pair of first piezoelectric elements 206 and 206 interposing the base portion 203b therebetween are substantially the same. Accordingly, it is possible to make the rigidity of the driving member 203 in the width w203 direction uniform. Therefore, it is possible to suppress the vibration of the base portion 203b of the driving member 203 in the width w203 direction. By setting all the first piezoelectric elements 206 and the second piezoelectric elements 207 to the same shape and size, it is possible to facilitate the manufacturing, thereby enhancing the productivity.

The holding portions 202a holding the corresponding driving members 203 so as to move in the direction parallel to the support shaft 205 are formed in the base member 202. The support faces 202f supporting the base portion 203b of the driving member 203 in the width w203 direction of the driving member 203 are formed in the holding portions 202a. Accordingly, it is possible to support the first piezoelectric elements 206 through the use of the support faces 202f and to support the base portion 203h of each driving member 203 in the width w203 direction with the first piezoelectric elements 206 interposed therebetween. As a result, it is possible to raise the rigidity of the driving member 203 in the width w203 direction, thereby suppressing the vibration of the base portion 203b of the driving member 203 in the width w203 direction.

Here, in each first piezoelectric element 206, the ratio of the elastic coefficient in the thickness direction (the longitudinal elastic coefficient) and the elastic coefficient in the deformation direction (the transverse elastic coefficient) is about 3:1. Therefore, it is possible to raise the rigidity of the driving member 203 in the width w203 direction and to lower the rigidity of the base portion 203b in the driving direction. As a result, it is possible to prevent the movement of the base portion 203b in the width w203 direction, thereby suppressing the vibration thereof. It is also possible to facilitate the displacement of the base portion 203b in the driving direction.

The driving member 203 includes the tip portion 203a supporting and driving the rotor 204 in the rotation direction R and the base portion 203b held by the holding portion 202a of the base member 202 in the state where it is interposed between a pair of first piezoelectric elements 206. The driving member 203 includes the second piezoelectric element 207 driving the tip portion 203a in the width w203 direction of the holding portion 202a and the driving member 203 along the rotation direction R of the rotor 204 between the tip portion 203a and the base portion 203b.

Accordingly, by driving the tip portion 203a of the driving member 203 in the width w203 direction, a frictional force in the tangential direction of the rotation direction R acts between the bottom surface of the rotor 204 and the tip portion 203a, whereby it is possible to drive the rotor 204 in the rotation direction R. It is also possible to independently control the first piezoelectric elements 206 and the second piezoelectric elements 207. Accordingly, it is possible to independently control the driving of the tip portion 203a of the driving member 203 in the direction parallel to the support shaft 205 and the driving in the rotation direction R of the rotor 204.

By simultaneously activating the first piezoelectric elements 206 and the second piezoelectric elements 207, it is possible to simultaneously achieve the driving of the tip portions 203a of the driving member 203 in the direction parallel to the support shaft 205 and the driving in the direction along the rotation direction R of the rotor 204.

Therefore, as shown in FIGS. 23 to 25, when the rotor 204 and the tip portions 203a are contacted with and separated from each other, the tip portions 203a of the driving members 203 can be made to move in the rotation direction R of the rotor 204 and the rotor 204 can be handed over from the driving members 231 of the first group to the driving members 232 of the second group without interfering with the rotation of the rotor 204.

Two groups of the first group and the second group are provided, each group of which includes three sets of the driving member 203 and two pairs of first piezoelectric elements 206 and 206 interposing the base portion 203b thereof. Therefore, it is possible to drive the groups at different times. It is also possible to support the rotor 204 at three points by the use of the tip portions 231a and 232a of the driving members 231 and 232 of the groups. Therefore, it is possible to stably support the rotor 204, compared with the case where the rotor is supported at two points or four or more points.

The driving members 231 and 232 of the groups are arranged uniformly in the rotation direction R of the rotor 204. The driving members 231 and the 232 of the first group and the second group are alternately sequentially arranged in the rotation direction R. Therefore, it is possible to support the rotor 204 through the use of the driving members 231 and 232 of the groups with a good balance and thus to efficiently drive the rotor in the rotation direction R.

The direction in which the tip portion 203a of each driving member 203 is driven is the same as the direction in which the base portion 203b of the driving member 203 is interposed between the first piezoelectric elements 206 and the support faces 202f of the holding portion 202a. Therefore, when the tip portions 203a of the driving members 203 perform a feed driving operation and a return driving operation, it is possible to support the base portion 203b of the driving member 203 from the front and rear sides in the driving direction. As a result, it is possible to suppress the departure of the driving member 203 from the direction parallel to the support shaft 205, thereby preventing the detrimental influence on the driving of the rotor 204.

By allowing the power supply unit 210 to supply the voltages having a phase difference to the driving members 231 and 232 of the first group and the second group, it is possible to drive the rotor 204 through the use of the driving members 231 and 232 of the groups.

By setting the phase difference between the voltages to be supplied to the first piezoelectric elements 206 and the second piezoelectric elements 207 of the groups from the power supply unit 210 to 180°, it is possible to drive the rotor 204 alternately and sequentially through the use of the driving members 231 of the first group and the driving members 232 of the second group.

By allowing the power supply unit 210 to supply the voltages to the first piezoelectric elements 206 and the second piezoelectric elements 207 of the groups so that the tip portions 203a of the driving members 203 sequentially and repeatedly perform the contact with the rotor 204, the feed in the width w203 direction of the driving members 203, the separation from the rotor 204, and the return in the width w203 direction of the driving members 203, it is possible to continuously rotationally drive the rotor 204.

As can be seen in Phases 3, 7, 11, and 15 of FIG. 22, the power supply unit 210 causes the voltage supplied to the first terminal T1 and the voltage supplied to the second terminal T2 to overlap with each other. Accordingly, it is possible to continuously and smoothly perform the handover of the rotor 204 from the driving members 231 of the first group to the driving members 232 of the second group.

The frequencies of the voltages supplied to the first piezoelectric elements 206 and the second piezoelectric elements 207 from the power supply unit 210 are substantially equal to the frequency of the resonant vibration of the supporting and driving section 201a constituted by the first piezoelectric element 206, the second piezoelectric elements 207, the driving members 203, and the base member 202. Accordingly, the amplitudes of the feed driving of the rotor 204 through the use of the tip portions 203a of the driving members 203 and the returning driving can be made to be greater. The frequency of the resonant vibration of the supporting and driving section 201a can be adjusted by appropriately selecting the materials of the base member 202, the piezoelectric elements, and the tip portions 203a and the base portions 203b of the driving members 203.

In this embodiment, as shown in FIG. 22, the period of the voltages supplied to the first piezoelectric elements 261 and 262 of the driving members 231 and 232 of the groups from the first terminal T1 and the second terminal T2 are equal to the period of the voltages supplied to the second piezoelectric elements 271 and 272 of the groups from the third terminal T3 and the fourth terminal T4. Therefore, the frequency of the driving of the driving members 231 and 232 in the direction parallel to the support shaft 205 is equal to the frequency of the driving of the tip portions 231a and 232a in two directions of the widths w231 and w232 of the driving members 231 and 232. Accordingly, the amplitude of the driving members 231 and 232 in the direction parallel to the support shaft 205 and the amplitude of the tip portions 231a and 232a in two directions of the widths w231 and w232 of the driving members 231 and 232 can be set to the maximum amplitude.

The tip portion 203a of each driving member 203 is formed in a tapered shape so that the sectional area along the rotation direction R of the rotor 204 becomes smaller as it gets closer to the rotor 204. Therefore, compared with the case where the tip portion 203a is formed in a rectangular parallelepiped shape, it is possible to reduce the contact area between the tip portion 203a and the rotor 204 and to reduce the volume variation of the tip portion 203a due to the abrasion of the tip portion 203a. Accordingly, it is possible to reduce the weight variation of the tip portion 203a due to the abrasion of the tip portion 203a and to reduce the variation in resonance frequency of the driving member 203. By forming the tip portion 203a in the hexagonal prism shape, it is possible to raise the rigidity of the tip portion 203a, compared with other shapes.

The groove 202d is formed in the side surface 202c of the base member 202 substantially parallel to the support shaft 205 and substantially perpendicular to the width w203 direction of the driving members 203. That is, the groove 202d is formed to substantially perpendicularly intersect the vibration transmitted in the base member 202 in the direction substantially parallel to the support shaft 205. Accordingly, it is possible to absorb the vibration through the use of the groove 202d and thus to reduce the transmission of the vibration in the base member 202.

The first piezoelectric elements 206 are disposed between the rotor 204 and the groove 202d. Therefore, it is possible to reduce the vibration transmitted over the groove 202d from the side of the base member 202 opposite to the rotor 204.

The opposite end of the holding portion 202a, which holds the driving member 203, of the base member 202 is fixed to the mounting section 301a and the groove 202d is disposed at the position closer to the mounting section 301a than the driving members 203. Accordingly, even when the vibration of the mounting section 301a is transmitted to the base member 202, it is possible to reduce the vibration at the position relatively apart from the driving members 203 and thus to prevent the vibration of the mounting section 301a from detrimentally influencing the driving of the driving members 203.

The width w201 of the groove 202d in the direction parallel to the support shaft 205 is greater than the amplitude of the vibration of the base member 202. Accordingly, it is possible to prevent both sides of the base member 202 about the groove 202d from colliding with each other.

The width w201 of the groove 202d in the direction parallel to the support shaft 205 is greater than the amplitude of the resonant vibration of the supporting and driving section 201a constituted by the base member 202, the driving members 203, the first piezoelectric elements 206, and the second piezoelectric elements 207. Therefore, even when the supporting and driving section 201a vibrates in a resonant state, it is possible to prevent both sides of the base member 202 about the groove 202d from colliding with each other.

By setting the depth d201 of the groove 202d to the range of 40% to 80% of the radius of the base member 202, it is possible to satisfactorily guarantee the strength of the base member 202 and to satisfactorily suppress the transmission of the vibration.

Since the gap 202e is formed between the base member 202 and the support shaft 205, it is possible to reduce the vibration transmitted from the base member 202 of the support shaft 205. It is also possible to reduce the vibration transmitted from the support shaft 205 to the base member 202. Therefore, it is possible to prevent the driving of the driving members 203 and the rotor 204 from being detrimentally influenced.

An example of a lens barrel and a camera including the driving mechanism 201 according to this embodiment will be described below. An interchangeable lens according to this example forms a camera system along with a camera body. The interchangeable lens can be switched between an AF (Auto Focus) mode in which a focusing operation is performed under a known AF control and an MF (Manual Focus) mode in which the focusing operation is performed in response to a manual input from a photographer.

Figure 27:
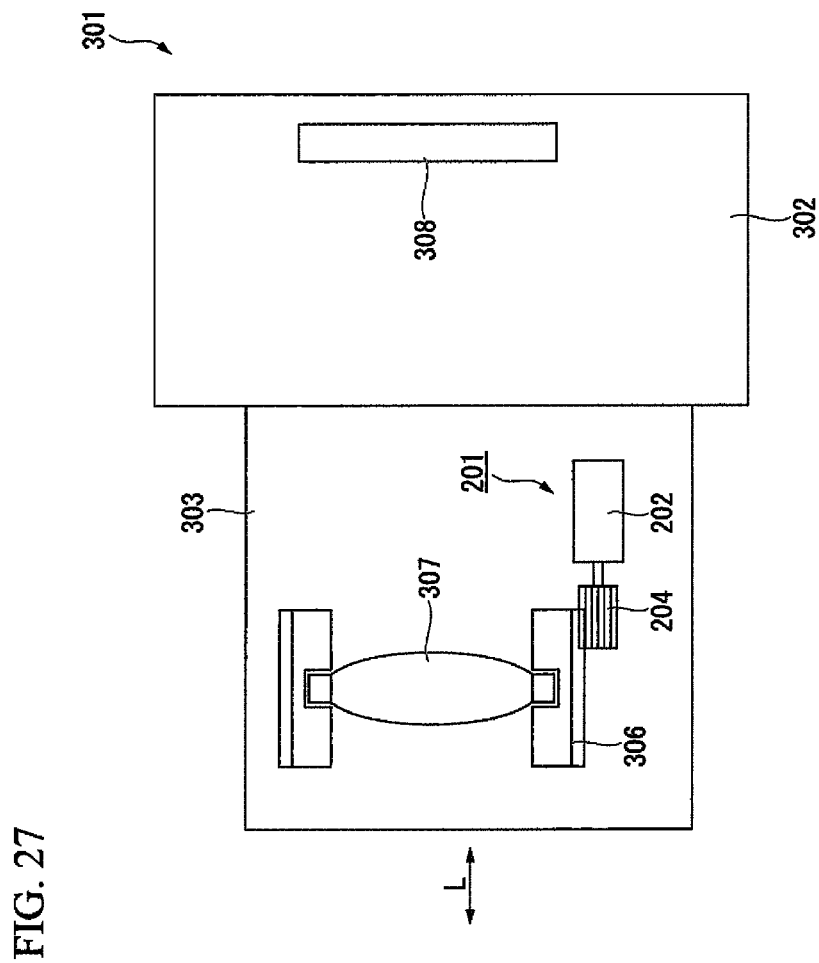
FIG. 27 is a diagram schematically illustrating the configuration of a lens barrel and a camera having the driving mechanism shown in FIG. 17.

FIG. 27 is a diagram schematically illustrating the configurations of a camera 301 according to this embodiment.

As shown in FIG. 27, the camera 301 includes a camera body 302 having an imaging device 308 built therein and a lens barrel 303 having a lens 307.

The lens barrel 303 is an interchangeable lens that can be attached to and detached from the camera body 302. The lens barrel 303 includes the lens 307, a cam box 306, and the driving mechanism 201. The driving mechanism 201 is used as a drive source driving the lens 307 in the focusing operation of the camera 301. The driving force acquired from the rotor 204 of the driving mechanism 201 is transmitted directly to the cam box 306. The lens 307 is held in the cam box 306 and is a focusing lens that moves substantially in parallel to the optical axis direction L to adjust the focus through the use of the driving force of the driving mechanism 201.

When using the camera 301, a subject image is formed on the imaging plane of the imaging device 308 through the use of a lens group (including the lens 307) disposed in the lens barrel 303. The formed subject image is converted into an electrical signal by the imaging device 308 and image data is acquired by A/D converting the electric signal.

As described above, the camera 301 and the lens barrel 303 according to this embodiment include the driving mechanism 201 according to this embodiment. Accordingly, it is possible to cause the rotor 204 to more stably rotate and thus to directly drive the cam box 306 by the use of the driving mechanism 201 with an enhanced output. Therefore, it is possible to reduce the energy loss and to save the energy. It is also possible to reduce the number of components.

Although it has been stated in this embodiment that the lens barrel 303 is an interchangeable lens, the invention is not limited to this example and the lens barrel may be incorporated into a camera body.

The above-mentioned embodiment can be modified in various forms. For example, the configuration in which the insulating film is disposed between all the first piezoelectric elements and the base member has been stated in the above-mentioned embodiment, but the insulating film may be disposed between the first piezoelectric elements of the driving members of at least one of the first group and the second group and the base member.

Although it base been stated in the above-mentioned embodiment that the first piezoelectric elements and the second piezoelectric elements are deformed in the thickness-shear vibration mode, the piezoelectric element may be deformed in the thickness direction. In this case, the driving member is made to move in the width direction (the first direction) of the holding portion by the first piezoelectric elements and the tip portion of the driving member is made to move in the direction (the second direction) parallel to the rotation axis by the second piezoelectric elements.

As long as it is formed to surround the support shaft, the base member may be divided into plural parts or may not completely surround the support shaft. For example, the base member may be disposed in only a half of the circumference surrounding the support shaft or may be disposed to interpose the support shaft from both sides.

Although it has been stated in the above-mentioned embodiment that a pair of first piezoelectric elements driving the driving member in the direction parallel to the support shaft are provided to interpose the driving member, the first piezoelectric element may be disposed on only one side surface of the driving member. A piezoelectric element that is deformed in the thickness direction may be used as the first piezoelectric element and the first piezoelectric element may be disposed between the bottom of the holding portion of the base member and the bottom surface of the driving member. In this case, the base portion is directly supported by the support faces of the holding portion formed in the base member without the piezoelectric element being interposed therebetween from both sides in the width direction of the holding portion parallel to the rotation direction of the rotor. The support faces may be made to serve as a guide portion holding the base portion so as to be slidable in the direction parallel to the support shaft.

Although it has been stated in the above-mentioned embodiment that two groups of driving members each having the first piezoelectric elements and the second piezoelectric elements are provided, the number of groups of the driving members may be three or more. The number of driving members of each group may be one, two, four, or more. For example, in the above-mentioned embodiment, three groups of driving members each including two driving members disposed in the diagonal of the base member as a group may be constituted. In this case, the phase difference between the voltages of the groups may be set, for example, to 120 degrees. Accordingly, it is possible to always support and cause the rotor to rotate through the use of two groups of driving members. The phase difference between the voltages of the groups of driving members may be set to a value (that is, 180 degrees in case of two groups and 120 degrees in case of three groups) obtained by dividing 360 degrees by the number of groups.

Although it has been stated in the above-mentioned embodiment that the direction (the first direction) in which the first piezoelectric elements interpose the base portion of the driving member and the direction (the third direction) in which the tip portion of the driving member is driven by the second piezoelectric elements are equal to each other, the directions may be different from each other. For example, by setting the third direction to the direction intersecting the width w203 direction of the driving member and parallel to the rotation direction, the rotor may be made to easily rotate.

The support faces of the base member may not be tilted about the direction (the second direction) parallel to the support shaft. For example, a protrusion-like locking portion locking an end of the first piezoelectric element facing the bottom of the holding portion may be disposed in the holding portion. The positioning may be carried out by causing the end of the first piezoelectric element facing the bottom of the holding portion to protrude from the bottom surface of the base portion and to serve as a positioning portion and causing the positioning portion to collide with the bottom of the holding portion.

The gap between the base member and the support shaft may be formed up to the edge of the groove facing the holding portion, in view of the rigidity of the base member.

The voltages supplied to the first piezoelectric elements and the second piezoelectric elements from the terminals of the power supply unit may be a sinusoidal wave or a sinusoidal voltage waveform.

Description of the Reference Symbols
  1: DRIVING MECHANISM
  2: BASE MEMBER (BASE MEMBER)
  2h: CHAMFERED PORTION (EXPOSING PORTION)
  3: DRIVING MEMBER (FIRST MEMBER)
  3a: TIP PORTION
  3b: BASE PORTION
  4: ROTOR (SECOND MEMBER)
  5: SUPPORT SHAFT (ROTATION SHAFT)
  6: FIRST PIEZOELECTRIC ELEMENT (PIEZOELECTRIC ELEMENT)
  6a: ELECTRODE PORTION
  6b: EXPOSED PORTION
  7: SECOND PIEZOELECTRIC ELEMENT (SECOND PIEZOELECTRIC ELEMENT)
  101: CAMERA
  103: LENS BARREL
  201: DRIVING MECHANISM
  202: BASE MEMBER (BASE MEMBER)
  202g: INSULATING FILM
  203: DRIVING MEMBER (FIRST MEMBER)
  203a: TIP PORTION
  203b: BASE PORTION
  204: ROTOR (SECOND MEMBER)
  206: FIRST PIEZOELECTRIC ELEMENT (PIEZOELECTRIC ELEMENT)
  206a: ELECTRODE
  207: SECOND PIEZOELECTRIC ELEMENT (PIEZOELECTRIC ELEMENT, SECOND PIEZOELECTRIC ELEMENT)
  210: POWER SUPPLY UNIT
  301: CAMERA
  303: LENS BARREL

The invention claimed is:

1. A driving mechanism driving a first member and a second member relative to each other, comprising:
a piezoelectric element that drives the first member;
a base member that movably supports the first member with the piezoelectric element interposed therebetween; and
an electrode portion that is supplied with a driving voltage of the piezoelectric element,
wherein the electrode portion includes an exposed portion exposed from the base member, and
wherein the first member includes a tip portion that supports the second member, a base portion that is interposed between a pair of the piezoelectric elements in a first direction, and a second piezoelectric element that is disposed between the tip portion and the base portion.

2. The driving mechanism according to claim 1, wherein the electrode portion is disposed on the face of the piezoelectric element facing the base member.

3. The driving mechanism according to claim 1, wherein an exposing portion exposing the exposed portion is formed in the base member.

4. The driving mechanism according to claim 3, wherein the exposing portion is formed at a corner of an end of the base member close to the second member.

5. The driving mechanism according to claim 3, wherein the exposing portion is a chamfered portion of the base member.

6. The driving mechanism according to claim 1, wherein the piezoelectric element drives the first member in a second direction different from the first direction, and
wherein the second piezoelectric element drives the tip portion in a third direction different from the second direction.

7. The driving mechanism according to claim 1, further comprising
a power supply unit that supplies a voltage to the electrode portion,
wherein the exposed portion is electrically connected to the power supply unit.

8. The driving mechanism according to claim 1, wherein the voltage is applied between the electrode portion and the first member.

9. A lens barrel comprising the driving mechanism according to claim 1.

10. A camera comprising:
the lens barrel according to claim 9; and
an imaging device.

11. A driving mechanism comprising:
a piezoelectric element;
a first member that is driven by the piezoelectric element;
a second member that is disposed in contact with the first member and that moves relatively to the first member with the driving of the first member; and
a base member that is conductive and that movably supports the first member with the piezoelectric element,
wherein the driving mechanism includes a plurality of sets each having the first member and the piezoelectric element,
wherein an insulating film is disposed between the piezoelectric element of at least one set and the base member, and
wherein the first member includes a base portion that is supported by the base member with the piezoelectric element interposed therebetween, a tip portion that is disposed to be contactable with the second member, and a second piezoelectric element that is disposed between the tip portion and the base portion.

12. The driving mechanism according to claim 11, wherein an electrode is formed on a face of the piezoelectric element in contact with the insulating film.

13. The driving mechanism according to claim 12, further comprising
a power supply unit that supplies a voltage to the electrode of the piezoelectric element.

14. The driving mechanism according to claim 13, wherein the power supply unit supplies the sets with the voltage having a phase difference.

15. The driving mechanism according to claim 11, wherein the insulating film is disposed between all the piezoelectric elements of the plurality of sets and the base member.

16. The driving mechanism according to claim 11, wherein the insulating film is formed on the base member.

17. The driving mechanism according to claim 11, wherein the base portion is grounded.

18. The driving mechanism according to claim 11, wherein the hardness of the insulating film is equal to or higher than 2H in pencil hardness.

19. The driving mechanism according to claim 11, wherein the thickness of the insulating film is in the range of 10 μm to 20 μm.

20. The driving mechanism according to claim 11, wherein an adhesive used for fixing the piezoelectric element to the insulating film, and the insulating film contain the same type of material.

21. A lens barrel comprising the driving mechanism according to claim 11.

22. A camera comprising the driving mechanism according to claim 11.

* * * * *